(12) United States Patent
Mori et al.

(10) Patent No.: US 8,675,962 B2
(45) Date of Patent: Mar. 18, 2014

(54) IMAGE CORRECTION PROCESSING CIRCUIT, SEMICONDUCTOR DEVICE, AND IMAGE CORRECTION PROCESSING DEVICE

(75) Inventors: Tatsuya Mori, Kyoto (JP); Kyoji Marumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 211 days.

(21) Appl. No.: 13/141,130

(22) PCT Filed: Dec. 21, 2009

(86) PCT No.: PCT/JP2009/071201
§ 371 (c)(1),
(2), (4) Date: Jun. 21, 2011

(87) PCT Pub. No.: WO2010/074012
PCT Pub. Date: Jul. 1, 2010

(65) Prior Publication Data
US 2011/0261261 A1    Oct. 27, 2011

(30) Foreign Application Priority Data

Dec. 22, 2008  (JP) .................................. 2008-325166
Nov. 27, 2009  (JP) .................................. 2009-269840

(51) Int. Cl.
*G06K 9/00* (2006.01)

(52) U.S. Cl.
USPC ........................................................ 382/168

(58) Field of Classification Search
USPC ............ 382/162, 168; 348/235, 221.1–224.1, 348/362, 672; 358/448, 461, 516, 518, 520; 345/589
See application file for complete search history.

(56) References Cited

U.S. PATENT DOCUMENTS

| 6,014,128 | A | 1/2000 | Doherty et al. |
| 6,753,910 | B1 | 6/2004 | Ogata et al. |
| 7,167,597 | B2 * | 1/2007 | Matsushima .................. 382/274 |
| 7,460,168 | B2 * | 12/2008 | Horiuchi ....................... 348/362 |
| 7,583,297 | B2 * | 9/2009 | Yamada ...................... 348/224.1 |
| 8,295,346 | B2 * | 10/2012 | Zhou et al. ............... 375/240.03 |
| 2003/0099407 | A1 | 5/2003 | Matsushima |
| 2004/0196381 | A1 | 10/2004 | Matsuzaka |
| 2007/0025635 | A1 | 2/2007 | Miyazawa |

FOREIGN PATENT DOCUMENTS

| JP | 07-281633 | 10/1995 |
| JP | 09-46546 | 2/1997 |
| JP | 2000-156797 | 6/2000 |
| JP | 2003-169231 | 6/2003 |
| JP | 2004-64710 | 2/2004 |
| JP | 2004-120589 | 4/2004 |
| JP | 2004-304712 | 10/2004 |

(Continued)

*Primary Examiner* — Jose Couso
(74) *Attorney, Agent, or Firm* — Fish & Richardson P.C.

(57) ABSTRACT

The image correction processing device (100) disclosed in the description is configured by integrating a first external terminal (CAMDI) [7:0] to which digital input image data is inputted from outside of the device, an image correction processing circuit (200) applying predetermined image correction processing on the digital input image to create digital output image data, a second external terminal (CAMDO) [7:0] outputting the digital output image data to the outside of the device, an encoder circuit (300) converting the digital output image data to analog composite video-type output image data, and a third external terminal (VOUT) outputting the analog composite video-type data to the outside of the device.

16 Claims, 43 Drawing Sheets

(56) References Cited

FOREIGN PATENT DOCUMENTS

| JP | 2006-157469 | 6/2006 |
| JP | 2007-36946 | 2/2007 |
| JP | 2007-184888 | 7/2007 |
| JP | 3981260 | 9/2007 |

* cited by examiner

FIG.9

| PIN No. | PIN Name | In/Out | Active Level | Init | FUNCTION DESCRIPTION | POWER-SUPPLY SYSTEM |
|---|---|---|---|---|---|---|
| 1 | SDI | In | DATA | - | SPI-bus DATA INPUT | 1 |
| 2 | CAMDI7 | In | DATA | - | DATA INPUT BIT 7 | 1 |
| 3 | CAMDI6 | In | DATA | - | DATA INPUT BIT 6 | 1 |
| 4 | CAMDI5 | In | DATA | - | DATA INPUT BIT 5 | 1 |
| 5 | CAMDI4 | In | DATA | - | DATA INPUT BIT 4 | 1 |
| 6 | GND | - | GND | - | COMMON GROUND | 1,2,4 |
| 7 | VDD | - | PWR | - | CORE POWER SUPPLY | 4 |
| 8 | CAMDI3 | In | DATA | - | DATA INPUT BIT 3 | 1 |
| 9 | CAMDI2 | In | DATA | - | DATA INPUT BIT 2 | 1 |
| 10 | CAMDI1 | In | DATA | - | DATA INPUT BIT 1 | 1 |
| 11 | CAMDI0 | In | DATA | - | DATA INPUT BIT 0 | 1 |
| 12 | CAMHSI | In | * | - | HORIZONTAL TIMING INPUT | 1 |
| 13 | CAMVSI | In | * | - | VERTICAL TIMING INPUT | 1 |
| 14 | CAMCKI | In | CLK | - | CLOCK INPUT | 1 |
| 15 | GND | - | GND | - | COMMON GROUND | 1,2,4 |
| 16 | VDDIO | - | PWR | - | DIGITAL I/O POWER SUPPLY | 1 |
| 17 | CAMDO0 | Out | DATA | Low | DATA OUTPUT BIT 0 | 1 |
| 18 | CAMDO1 | Out | DATA | Low | DATA OUTPUT BIT 1 | 1 |
| 19 | CAMDO2 | Out | DATA | Low | DATA OUTPUT BIT 2 | 1 |
| 20 | CAMDO3 | Out | DATA | Low | DATA OUTPUT BIT 3 | 1 |
| 21 | CAMDO4 | Out | DATA | Low | DATA OUTPUT BIT 4 | 1 |
| 22 | CAMDO5 | Out | DATA | Low | DATA OUTPUT BIT 5 | 1 |
| 23 | CAMDO6 | Out | DATA | Low | DATA OUTPUT BIT 6 | 1 |
| 24 | CAMDO7 | Out | DATA | Low | DATA OUTPUT BIT 7 | 1 |
| 25 | CAMHSO | Out | * | Low | HORIZONTAL TIMING OUTPUT | 1 |
| 26 | CAMVSO | Out | * | Low | VERTICAL TIMING OUTPUT | 1 |
| 27 | CAMCKO | Out | CLK | Low | CLOCK OUTPUT | 1 |
| 28 | GND | - | GND | - | COMMON GROUND | 1,2,4 |
| 29 | VDD | - | PWR | - | CORE POWER SUPPLY | 4 |
| 30 | AUTO | In | High | PD *1 | AUTOMATIC REGISTER SETTING FUNCTION VALID TERMINAL | 1 |
| 31 | MODE0 | In | DATA | PD *1 | MODE SELECTION TERMINAL 0 | 1 |
| 32 | MODE1 | In | DATA | PD *1 | MODE SELECTION TERMINAL 1 | 1 |
| 33 | VOUT | Out | Analog | - | ANALOG COMPOSITE VIDEO OUTPUT | 3 |
| 34 | AVSS | - | GND | - | DAC ANALOG GROUND | 3 |
| 35 | IREF | Out | Analog | - | DAC REFERENCE VOLTAGE OUTPUT | 3 |
| 36 | AVDD | - | PWR | - | DAC ANALOG POWER SUPPLY | 3 |
| 37 | GND | - | GND | - | COMMON GROUND | 1,2,4 |
| 38 | VDDI2C | - | PWR | - | DUAL-LINE TYPE SERIAL INTERFACE DIGITAL I/O POWER SUPPLY | 2 |
| 39 | SDA | In/Out | DATA | In | DUAL-LINE TYPE SERIAL INTERFACE INPUT/OUTPUT DATA | 2 |
| 40 | SDC | In/Out | CLK | In | DUAL-LINE TYPE SERIAL INTERFACE INPUT/OUTPUT CLOCK | 2 |
| 41 | RESETB | In | Low | - | SYSTEM RESET SIGNAL | 1 |
| 42 | TEST | In | High | PD *1 | TEST MODE TERMINAL(CONNECT TO GND) | 1 |
| 43 | GND | - | GND | - | COMMON GROUND | 1,2,4 |
| 44 | VDDIO | - | PWR | - | DIGITAL I/O POWER SUPPLY | 1 |
| 45 | WPB | Out | Low | Low | EEPROM WRITE PROTECT | 1 |
| 46 | SCEB | Out | Low | High | EEPROM CHIP SELECT | 1 |
| 47 | SCK | Out | CLK | Low | SPI-bus CLOCK | 1 |
| 48 | SDO | Out | DATA | Low | SPI-bus DATA OUTPUT | 1 |

AT 100IRE SETTING

AT 108IRE SETTING

FIG.11A

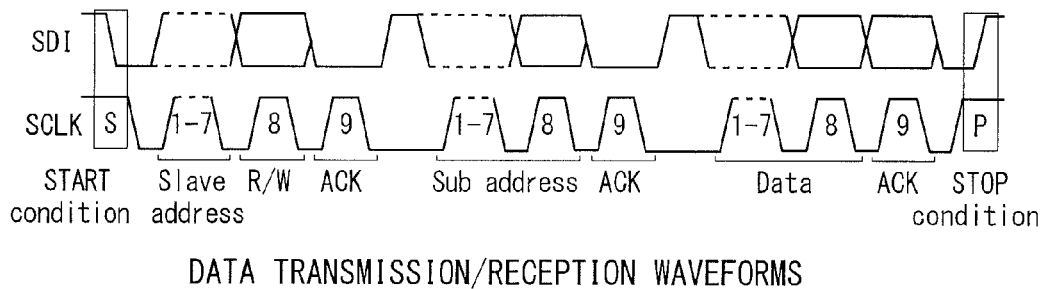

DATA TRANSMISSION/RECEPTION WAVEFORMS

FIG.11B

WRITE SEQUENCE

| S | SLAVE ADDRESS (70h) | W (0) | A (S) | SUB- ADDRESS | A (S) | WRITE DATA | A (S) | WRITE DATA | A (S) | WRITE DATA | A(S)/ NA(S) | P |
|---|---|---|---|---|---|---|---|---|---|---|---|---|

READ SEQUENCE

| S | SLAVE ADDRESS (70h) | W (0) | A (S) | SUB- ADDRESS | A (S) | S | SLAVE ADDRESS (70h) | R (1) | A (S) | READ DATA | A (M) | READ DATA | A(M)/ NA(M) | P |
|---|---|---|---|---|---|---|---|---|---|---|---|---|---|---|

S=START CONDITION  A(S)=ACKNOWLEDGEMENT BY SLAVE
P=STOP CONDITION  A(M)=ACKNOWLEDGEMENT BY MASTER

NA(S)=NOT-ACKNOWLEDGEMENT BY SLAVE
NA(M)=NOT-ACKNOWLEDGEMENT BY MASTER

FIG.14
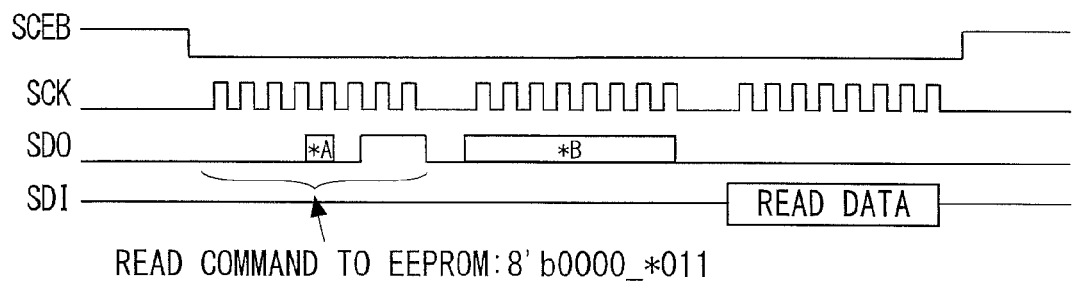
READ COMMAND TO EEPROM: 8'b0000_*011
FIG.15A
FIG.15B
| {P-CODE[3:0], PER[3:0]} |
|---|

FIG.16

| INDEX# | REGISTER NAME | | | | | | |
|---|---|---|---|---|---|---|---|
| 00h-07h | Empty | | | | | | uv_str_at |
| 08h-0Fh | acvrcth1 | acvrcth2 | acvrcth3 | acavgth1 | acavgth2 | acscv1 | acscv2 | acscv3 |
| 10h-17h | pol | paramset | mode | yuvifset | dxsize_l | dxsize_h | dysize_l | dysize_h |
| 18h-1Fh | icxst_l | icxst_h | icyst_l | icyst_h | icxsize_l | icxsize_h | icysize_l | icysize_h |
| 20h-27h | pregamma | strength | uv_strength | noise_sup | edg_cnt | resp_set | pflt_en | poflt0 |
| 28h-2Fh | poflt1 | poflt2 | poflt3 | poflt4 | poflt5 | poflt6 | poflt7 | poflt8 |
| 30h-37h | frctl | scrvadj | gcrvadj | Reserved | | | havglum | hstdvrc |
| 38h-3Fh | Reserved | | | | | | fr_lpf_cnt | Empty |
| 40h-47h | Empty | pwd | Reserved | disp | data | video | cvbs | bgcol |
| 48h-4Fh | colbar | Empty | | | | | | |
| 50h-57h | setup2 | Reserved | | | | setup | Reserved | |
| 58h-BFh | Reserved | | | | | | | |
| C0h-C7h | Reserved | Reserved | fr_lpf_coef0 | fr_lpf_coef1 | fr_lpf_coef2 | fr_lpf_coef3 | fr_lpf_coef4 | Reserved |
| C8h-CFh | Reserved | | | | | | | |
| D0h-D7h | gm_a0 | gm_a1 | gm_a2 | gm_x0 | gm_x1 | gm_x2 | gm_x3 | gm_y0 |
| D8h-DFh | gm_y1 | gm_y2 | gm_y3 | Empty | | | | |
| E0h-E7h | ofs_h | ofs_l | wid_vd_h | wid_vd_l | ht_vd | h_pos | v_pos | v_ofs |
| E8h-EFh | Empty | | Reserved | Empty | | | | |
| F0h-F7h | spicnt | spidiv | spiwdata | spirdata | spiadr0 | spiadr1 | spiad2 | spiadr3 |
| F8h-FFh | spiadr_h | Empty | | | | | | srst |

FIG.17
| Bit No. | 7 | 6 | 5 | 4 | 3 | 2 | 1 | 0 |
|---|---|---|---|---|---|---|---|---|
| Name | VSPOL | HSPOL | CKPOL | -- | -- | -- | -- | RESERVED |
| INITIAL VALUE | 0[R/W] | 0[R/W] | 0[R/W] | -- | -- | -- | -- | 0 |
FIG.18A
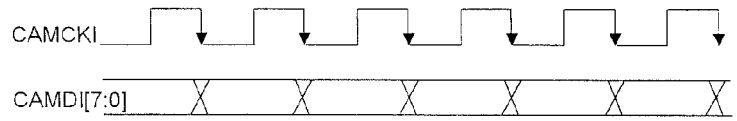
FIG.18B
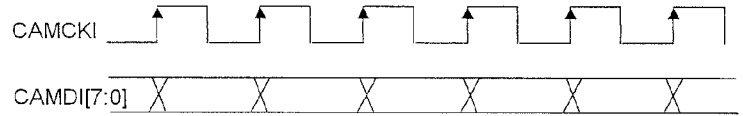
FIG.19
| Bit No. | 7 | 6 | 5 | 4 | 3 | 2 | 1 | 0 |
|---|---|---|---|---|---|---|---|---|
| Name | - | - | - | PARAM_SET_FR | - | - | RESERVED | PARAM_SET |
| INITIAL VALUE | - | - | - | 0[R/W] | - | - | 0 | 0[R/W] |
FIG.20
| Bit No. | 7 | 6 | 5 | 4 | 3 | 2 | 1 | 0 |
|---|---|---|---|---|---|---|---|---|
| Name | FR_OUT_SEL | - | DOUT_OFF | PD_OFF | SUSP | TH_TYPE | MODE[1:0] | |
| INITIAL VALUE | 0[R/W] | - | 1[R/W] | 0[R/W] | 1[R/W] | 0[R/W] | 00b[R/W] | |

FIG.21

| MODE[1:0] | | OPERATION MODE | DESCRIPTION |
|---|---|---|---|
| 0 | 0 | SLEEP MODE | SLEEP MODE OBTAINED |
| 0 | 1 | THROUGH MODE | IMAGE CORRECTION FUNCTION DOES NOT OPERATE. INPUT DATA ARE OUTPUT AS THEY ARE |
| 1 | 0 | | SETTING PROHIBITED |
| 1 | 1 | ENHANCE MODE | RESULT OF APPLYING IMAGE CORRECTION TO INPUT DATA IS OUTPUT |

FIG.22

| Bit No. | 7 | 6 | 5 | 4 | 3 | 2 | 1 | 0 |
|---|---|---|---|---|---|---|---|---|
| Name | YUV_XST [1:0] | | YUVORD [1:0] | | ITU601R | | ITU656EN | - |
| INITIAL VALUE | 00b[R/W] | | 00b[R/W] | | 00b[R/W] | | 0[R/W] | - |

FIG.23

| Bit No. | 7 | 6 | 5 | 4 | 3 | 2 | 1 | 0 |
|---|---|---|---|---|---|---|---|---|
| Name | - | - | - | RESERVE | - | - | RESERVE | TRAN_LIM |
| INITIAL VALUE | - | - | - | 0 | - | - | 0 | 0[R/W] |

FIG.24

| Bit No. | 7 | 6 | 5 | 4 | 3 | 2 | 1 | 0 |
|---|---|---|---|---|---|---|---|---|
| Name | XSIZE [7:0] | | | | | | | |
| INITIAL VALUE | 1000_0000b[R/W] | | | | | | | |

| Bit No. | 7 | 6 | 5 | 4 | 3 | 2 | 1 | 0 |
|---|---|---|---|---|---|---|---|---|
| Name | - | - | - | - | - | XSIZE [10:8] | | |
| INITIAL VALUE | - | - | - | - | - | 010b[R/W] | | |

FIG.25

| Bit No. | 7 | 6 | 5 | 4 | 3 | 2 | 1 | 0 |
|---|---|---|---|---|---|---|---|---|
| Name | YSIZE [7:0] | | | | | | | |
| INITIAL VALUE | 1110_0000b[R/W] | | | | | | | |

| Bit No. | 7 | 6 | 5 | 4 | 3 | 2 | 1 | 0 |
|---|---|---|---|---|---|---|---|---|
| Name | - | - | - | - | - | YSIZE [10:8] | | |
| INITIAL VALUE | - | - | - | - | - | 001b[R/W] | | |

FIG.26

| Bit No. | 7 | 6 | 5 | 4 | 3 | 2 | 1 | 0 |
|---|---|---|---|---|---|---|---|---|
| Name | ICXST [7:0] | | | | | | | |
| INITIAL VALUE | 0000_0000b[R/W] | | | | | | | |

| Bit No. | 7 | 6 | 5 | 4 | 3 | 2 | 1 | 0 |
|---|---|---|---|---|---|---|---|---|
| Name | - | - | - | - | - | - | ICXST[9:8] | |
| INITIAL VALUE | - | - | - | - | - | - | 00b[R/W] | |

FIG.27

| Bit No. | 7 | 6 | 5 | 4 | 3 | 2 | 1 | 0 |
|---|---|---|---|---|---|---|---|---|
| Name | ICYST [7:0] | | | | | | | |
| INITIAL VALUE | 0000_0000b[R/W] | | | | | | | |

| Bit No. | 7 | 6 | 5 | 4 | 3 | 2 | 1 | 0 |
|---|---|---|---|---|---|---|---|---|
| Name | - | - | - | - | - | - | ICYST [9:8] | |
| INITIAL VALUE | - | - | - | - | - | - | 00b[R/W] | |

| Bit No. | 7 | 6 | 5 | 4 | 3 | 2 | 1 | 0 |
|---|---|---|---|---|---|---|---|---|
| Name | ICXSIZE [7:0] | | | | | | | |
| INITIAL VALUE | 1000_0000b[R/W] | | | | | | | |

| Bit No. | 7 | 6 | 5 | 4 | 3 | 2 | 1 | 0 |
|---|---|---|---|---|---|---|---|---|
| Name | - | - | - | - | - | ICXSIZE [10:8] | | |
| INITIAL VALUE | - | - | - | - | - | 010b[R/W] | | |

| Bit No. | 7 | 6 | 5 | 4 | 3 | 2 | 1 | 0 |
|---|---|---|---|---|---|---|---|---|
| Name | ICYSIZE [7:0] | | | | | | | |
| INITIAL VALUE | 1110_0000b[R/W] | | | | | | | |

| Bit No. | 7 | 6 | 5 | 4 | 3 | 2 | 1 | 0 |
|---|---|---|---|---|---|---|---|---|
| Name | - | - | - | - | - | ICYSIZE [10:8] | | |
| INITIAL VALUE | - | - | - | - | - | 001b[R/W] | | |

FIG.31

| Bit No. | 7 | 6 | 5 | 4 | 3 | 2 | 1 | 0 |
|---|---|---|---|---|---|---|---|---|
| Name | - | - | - | - | PREG [3:0] | | | |
| INITIAL VALUE | - | - | - | - | 0110b[R/W] | | | |

FIG.32

| Bit No. | 7 | 6 | 5 | 4 | 3 | 2 | 1 | 0 |
|---|---|---|---|---|---|---|---|---|
| Name | - | STR [6:0] | | | | | | |
| INITIAL VALUE | - | 110_0000b[R/W] | | | | | | |

FIG.33

| Bit No. | 7 | 6 | 5 | 4 | 3 | 2 | 1 | 0 |
|---|---|---|---|---|---|---|---|---|
| Name | V_ENHANCE [3:0] | | | | UV_STR [3:0] | | | |
| INITIAL VALUE | 0000b[R/W] | | | | 0110b[R/W] | | | |

FIG.34

| Bit No. | 7 | 6 | 5 | 4 | 3 | 2 | 1 | 0 |
|---|---|---|---|---|---|---|---|---|
| Name | - | NOISE_SUP [6:0] | | | | | | |
| INITIAL VALUE | - | 110_0000b[R/W] | | | | | | |

FIG.35

| Bit No. | 7 | 6 | 5 | 4 | 3 | 2 | 1 | 0 |
|---|---|---|---|---|---|---|---|---|
| Name | EDG_EN | - | - | - | EDG_ST[3:0] | | | |
| INITIAL VALUE | 0[R/W] | - | - | - | 0000b[R/W] | | | |

FIG.36

| Bit No. | 7 | 6 | 5 | 4 | 3 | 2 | 1 | 0 |
|---|---|---|---|---|---|---|---|---|
| Name | - | - | - | - | RESP_SET [3:0] | | | |
| INITIAL VALUE | - | - | - | - | 0000b[R/W] | | | |

FIG.37

| Bit No. | 7 | 6 | 5 | 4 | 3 | 2 | 1 | 0 |
|---|---|---|---|---|---|---|---|---|
| Name | - | - | - | - | - | - | - | POFLT_EN |
| INITIAL VALUE | - | - | - | - | - | - | - | 0[R/W] |

FIG.38

| Bit No. | 7 | 6 | 5 | 4 | 3 | 2 | 1 | 0 |
|---|---|---|---|---|---|---|---|---|
| Name | POFLT0[7:0] | | | | | | | |
| INITIAL VALUE | colspan 0000_0000b[R/W] | | | | | | | |

| Bit No. | 7 | 6 | 5 | 4 | 3 | 2 | 1 | 0 |
|---|---|---|---|---|---|---|---|---|
| Name | POFLT1 [7:0] | | | | | | | |
| INITIAL VALUE | colspan 0001_1111b[R/W] | | | | | | | |

| Bit No. | 7 | 6 | 5 | 4 | 3 | 2 | 1 | 0 |
|---|---|---|---|---|---|---|---|---|
| Name | POFLT2 [7:0] | | | | | | | |
| INITIAL VALUE | colspan 0011_1111b[R/W] | | | | | | | |

| Bit No. | 7 | 6 | 5 | 4 | 3 | 2 | 1 | 0 |
|---|---|---|---|---|---|---|---|---|
| Name | POFLT3 [7:0] | | | | | | | |
| INITIAL VALUE | colspan 0101_1111b[R/W] | | | | | | | |

| Bit No. | 7 | 6 | 5 | 4 | 3 | 2 | 1 | 0 |
|---|---|---|---|---|---|---|---|---|
| Name | POFLT4 [7:0] | | | | | | | |
| INITIAL VALUE | colspan 0111_1111b[R/W] | | | | | | | |

| Bit No. | 7 | 6 | 5 | 4 | 3 | 2 | 1 | 0 |
|---|---|---|---|---|---|---|---|---|
| Name | POFLT5 [7:0] | | | | | | | |
| INITIAL VALUE | colspan 1001_1111b[R/W] | | | | | | | |

| Bit No. | 7 | 6 | 5 | 4 | 3 | 2 | 1 | 0 |
|---|---|---|---|---|---|---|---|---|
| Name | POFLT6 [7:0] | | | | | | | |
| INITIAL VALUE | colspan 1011_1111b[R/W] | | | | | | | |

| Bit No. | 7 | 6 | 5 | 4 | 3 | 2 | 1 | 0 |
|---|---|---|---|---|---|---|---|---|
| Name | POFLT7 [7:0] | | | | | | | |
| INITIAL VALUE | colspan 1101_1111b[R/W] | | | | | | | |

| Bit No. | 7 | 6 | 5 | 4 | 3 | 2 | 1 | 0 |
|---|---|---|---|---|---|---|---|---|
| Name | POFLT8 [7:0] | | | | | | | |
| INITIAL VALUE | colspan 1111_1111b[R/W] | | | | | | | |

FIG.40

| Bit No. | 7 | 6 | 5 | 4 | 3 | 2 | 1 | 0 |
|---|---|---|---|---|---|---|---|---|
| Name | FRCLK_EN | RESERVED | FR_SLOP | FR_AT | UV_STR_AT_EN | REP_REQ | FR_TH | FR_EN |
| INITIAL VALUE | 0[R/W] | 0 | 0[R/W] | 0[R/W] | 0[R/W] | 0[R/W] | 0[R/W] | 0[R/W] |

FIG.41

| Bit No. | 7 | 6 | 5 | 4 | 3 | 2 | 1 | 0 |
|---|---|---|---|---|---|---|---|---|
| Name | - | - | - | - | SCRVADJ[3:0] | | | |
| INITIAL VALUE | - | - | - | - | 0100b[R/W] | | | |

FIG.42

| SET VALUE | STRENGTH | SET VALUE | STRENGTH | SET VALUE | STRENGTH | SET VALUE | STRENGTH |
|---|---|---|---|---|---|---|---|
| 0 | 0.6 | 4 | 1.0 | 8 | 1.4 | 12 | 1.8 |
| 1 | 0.7 | 5 | 1.1 | 9 | 1.5 | 13 | 1.9 |
| 2 | 0.8 | 6 | 1.2 | 10 | 1.6 | 14 | 2.0 |
| 3 | 0.9 | 7 | 1.3 | 11 | 1.7 | 15 | 2.1 |

FIG.43

| Bit No. | 7 | 6 | 5 | 4 | 3 | 2 | 1 | 0 |
|---|---|---|---|---|---|---|---|---|
| Name | - | - | - | - | GCRVADJ[3:0] | | | |
| INITIAL VALUE | - | - | - | - | 1000b[R/W] | | | |

FIG.44

| SET VALUE | OFFSET | SET VALUE | OFFSET | SET VALUE | OFFSET | SET VALUE | OFFSET |
|---|---|---|---|---|---|---|---|
| 0 | +8 | 4 | +4 | 8 | 0 | 12 | -4 |
| 1 | +7 | 5 | +3 | 9 | -1 | 13 | -5 |
| 2 | +6 | 6 | +2 | 10 | -2 | 14 | -6 |
| 3 | +5 | 7 | +1 | 11 | -3 | 15 | -7 |

FIG.45

| Bit No. | 7 | 6 | 5 | 4 | 3 | 2 | 1 | 0 |
|---|---|---|---|---|---|---|---|---|
| Name | \multicolumn{8}{c}{HAVGLUM[7:0]} |
| INITIAL VALUE | \multicolumn{8}{c}{00h[R]} |

FIG.46

| Bit No. | 7 | 6 | 5 | 4 | 3 | 2 | 1 | 0 |
|---|---|---|---|---|---|---|---|---|
| Name | \multicolumn{8}{c}{HSTDVRC[7:0]} |
| INITIAL VALUE | \multicolumn{8}{c}{00h[R]} |

FIG.47

| Bit No. | 7 | 6 | 5 | 4 | 3 | 2 | 1 | 0 |
|---|---|---|---|---|---|---|---|---|
| Name | - | - | - | RESERVED | RESERVED | RESERVED | RESERVED | FR_LPF_EN |
| INITIAL VALUE | - | - | - | 0 | 0 | 0 | 0 | 0[R/W] |

FIG.48

| Bit No. | 7 | 6 | 5 | 4 | 3 | 2 | 1 | 0 |
|---|---|---|---|---|---|---|---|---|
| Name | \multicolumn{8}{c}{FR_LPF_COEF0[7:0]} |
| INITIAL VALUE | \multicolumn{8}{c}{0001_0000b[R/W]} |

| Bit No. | 7 | 6 | 5 | 4 | 3 | 2 | 1 | 0 |
|---|---|---|---|---|---|---|---|---|
| Name | \multicolumn{8}{c}{FR_LPF_COEF1[7:0]} |
| INITIAL VALUE | \multicolumn{8}{c}{0010_0000b[R/W]} |

| Bit No. | 7 | 6 | 5 | 4 | 3 | 2 | 1 | 0 |
|---|---|---|---|---|---|---|---|---|
| Name | \multicolumn{8}{c}{FR_LPF_COEF2[7:0]} |
| INITIAL VALUE | \multicolumn{8}{c}{0010_0000b[R/W]} |

| Bit No. | 7 | 6 | 5 | 4 | 3 | 2 | 1 | 0 |
|---|---|---|---|---|---|---|---|---|
| Name | \multicolumn{8}{c}{FR_LPF_COEF3[7:0]} |
| INITIAL VALUE | \multicolumn{8}{c}{0010_0000b[R/W]} |

| Bit No. | 7 | 6 | 5 | 4 | 3 | 2 | 1 | 0 |
|---|---|---|---|---|---|---|---|---|
| Name | \multicolumn{8}{c}{FR_LPF_COEF4[7:0]} |
| INITIAL VALUE | \multicolumn{8}{c}{0001_0000b[R/W]} |

FIG.49

| Bit No. | 7 | 6 | 5 | 4 | 3 | 2 | 1 | 0 |
|---|---|---|---|---|---|---|---|---|
| Name | - | - | - | - | \multicolumn{4}{c}{UV_STR_AT[3:0]} |
| INITIAL VALUE | - | - | - | - | \multicolumn{4}{c}{06h[R/W]} |

FIG.50

| Bit No. | 7 | 6 | 5 | 4 | 3 | 2 | 1 | 0 |
|---|---|---|---|---|---|---|---|---|
| Name | \multicolumn{8}{c}{ACVRCTH1[7:0]} |
| INITIAL VALUE | \multicolumn{8}{c}{10h[R/W]} |

| Bit No. | 7 | 6 | 5 | 4 | 3 | 2 | 1 | 0 |
|---|---|---|---|---|---|---|---|---|
| Name | \multicolumn{8}{c}{ACVRCTH2[7:0]} |
| INITIAL VALUE | \multicolumn{8}{c}{30h[R/W]} |

| Bit No. | 7 | 6 | 5 | 4 | 3 | 2 | 1 | 0 |
|---|---|---|---|---|---|---|---|---|
| Name | \multicolumn{8}{c}{ACVRCTH3[7:0]} |
| INITIAL VALUE | \multicolumn{8}{c}{50h[R/W]} |

FIG.51

| Bit No. | 7 | 6 | 5 | 4 | 3 | 2 | 1 | 0 |
|---|---|---|---|---|---|---|---|---|
| Name | ACAVGTH1[7:0] | | | | | | | |
| INITIAL VALUE | 70h[R/W] | | | | | | | |

| Bit No. | 7 | 6 | 5 | 4 | 3 | 2 | 1 | 0 |
|---|---|---|---|---|---|---|---|---|
| Name | ACAVGTH2[7:0] | | | | | | | |
| INITIAL VALUE | 60h[R/W] | | | | | | | |

FIG.52

| Bit No. | 7 | 6 | 5 | 4 | 3 | 2 | 1 | 0 |
|---|---|---|---|---|---|---|---|---|
| Name | ACSCV_ULIM[3:0] | | | | ACSCV_MH[3:0] | | | |
| INITIAL VALUE | 1000b[R/W] | | | | 0110b[R/W] | | | |

| Bit No. | 7 | 6 | 5 | 4 | 3 | 2 | 1 | 0 |
|---|---|---|---|---|---|---|---|---|
| Name | ACSCV_MM[3:0] | | | | ACSCV_ML[3:0] | | | |
| INITIAL VALUE | 0100b[R/W] | | | | 0010b[R/W] | | | |

| Bit No. | 7 | 6 | 5 | 4 | 3 | 2 | 1 | 0 |
|---|---|---|---|---|---|---|---|---|
| Name | | | FR_SLOP_CNT[1:0] | | | ACSCV_LLIM[3:0] | | |
| INITIAL VALUE | | | 00b[R/W] | | | 0000b[R/W] | | |

| Bit No. | 7 | 6 | 5 | 4 | 3 | 2 | 1 | 0 |
|---|---|---|---|---|---|---|---|---|
| Name | - | - | - | - | - | LOGIC_POW | | DAC_POW |
| INITIAL VALUE | - | - | - | - | - | 0[R/W] | | 0[R/W] |

| Bit No. | 7 | 6 | 5 | 4 | 3 | 2 | 1 | 0 |
|---|---|---|---|---|---|---|---|---|
| Name | - | - | - | LEVEL | - | - | - | DISP0 |
| INITIAL VALUE | - | - | - | 0[R/W] | - | - | - | 1[R/W] |

FIG.57

| Bit No. | 7 | 6 | 5 | 4 | 3 | 2 | 1 | 0 |
|---|---|---|---|---|---|---|---|---|
| Name | C_OFF | RESERVED | - | 510H | RESERVED | PAL28 | Q_FSC | NTPAL |
| INITIAL VALUE | 0[R/W] | 0 | - | 0[R/W] | 0 | 0[R/W] | 0[R/W] | 0[R/W] |

FIG.58

| NTPAL | Q_FSC | PAL28 | 510H | DESCRIPTION |
|---|---|---|---|---|
| 0 | 0 | 0 | 0 | NTSC 27MHz |
| 0 | 1 | 0 | 0 | NTSC 28.63636MHz(8Fsc) |
| 1 | 0 | 0 | 0 | PAL 27MHz |
| 1 | 1 | 0 | 0 | PAL 35.46895MHz(8Fsc) |
| 1 | 0 | 1 | 0 | PAL 28.375MHz |
| 0 | 0 | 0 | 1 | NTSC 510H 19.06993MHz |
| 1 | 0 | 0 | 1 | PAL 510H 18.9375MHz |

FIG.59

| Bit No. | 7 | 6 | 5 | 4 | 3 | 2 | 1 | 0 |
|---|---|---|---|---|---|---|---|---|
| Name | - | - | - | - | - | CVBS_OUT | IMAGE_OUT [1:0] | |
| INITIAL VALUE | - | - | - | - | - | 0[R/W] | 01b[R/W] | |

FIG.60

| Bit No. | 7 | 6 | 5 | 4 | 3 | 2 | 1 | 0 |
|---|---|---|---|---|---|---|---|---|
| Name | - | - | - | - | BGCOL [3:0] | | | |
| INITIAL VALUE | - | - | - | - | 0000b[R/W] | | | |

FIG.61

| Bit No. | 7 | 6 | 5 | 4 | 3 | 2 | 1 | 0 |
|---|---|---|---|---|---|---|---|---|
| Name | - | - | - | - | - | - | - | COLBAR |
| INITIAL VALUE | - | - | - | - | - | - | - | 0[R/W] |

FIG.62

| Bit No. | 7 | 6 | 5 | 4 | 3 | 2 | 1 | 0 |
|---|---|---|---|---|---|---|---|---|
| Name | BURST_LVL | - | - | - | - | - | - | SETUP |
| INITIAL VALUE | 0[R/W] | - | - | - | - | - | - | 0[R/W] |

FIG.63

| Bit No. | 7 | 6 | 5 | 4 | 3 | 2 | 1 | 0 |
|---|---|---|---|---|---|---|---|---|
| Name | - | - | - | - | - | SETUP2 | | |
| INITIAL VALUE | - | - | - | - | - | 000b[R/W] | | |

FIG.64

| Bit No. | 7 | 6 | 5 | 4 | 3 | 2 | 1 | 0 |
|---|---|---|---|---|---|---|---|---|
| Name | GM_A0 [7:0] | | | | | | | |
| INITIAL VALUE | colspan 0001_0000b[R/W] | | | | | | | |

| Bit No. | 7 | 6 | 5 | 4 | 3 | 2 | 1 | 0 |
|---|---|---|---|---|---|---|---|---|
| Name | GM_A1 [7:0] | | | | | | | |
| INITIAL VALUE | 0001_0000b[R/W] | | | | | | | |

| Bit No. | 7 | 6 | 5 | 4 | 3 | 2 | 1 | 0 |
|---|---|---|---|---|---|---|---|---|
| Name | GM_A2 [7:0] | | | | | | | |
| INITIAL VALUE | 00010000b[R/W] | | | | | | | |

| Bit No. | 7 | 6 | 5 | 4 | 3 | 2 | 1 | 0 |
|---|---|---|---|---|---|---|---|---|
| Name | GM_X0 [7:0] | | | | | | | |
| INITIAL VALUE | 00010000b[R/W] | | | | | | | |

| Bit No. | 7 | 6 | 5 | 4 | 3 | 2 | 1 | 0 |
|---|---|---|---|---|---|---|---|---|
| Name | GM_X1 [7:0] | | | | | | | |
| INITIAL VALUE | 01000000b[R/W] | | | | | | | |

| Bit No. | 7 | 6 | 5 | 4 | 3 | 2 | 1 | 0 |
|---|---|---|---|---|---|---|---|---|
| Name | GM_X2 [7:0] | | | | | | | |
| INITIAL VALUE | 1000000b[R/W] | | | | | | | |

| Bit No. | 7 | 6 | 5 | 4 | 3 | 2 | 1 | 0 |
|---|---|---|---|---|---|---|---|---|
| Name | GM_X3 [7:0] | | | | | | | |
| INITIAL VALUE | 11101011b[R/W] | | | | | | | |

| Bit No. | 7 | 6 | 5 | 4 | 3 | 2 | 1 | 0 |
|---|---|---|---|---|---|---|---|---|
| Name | GM_Y0 [7:0] | | | | | | | |
| INITIAL VALUE | 00010000b[R/W] | | | | | | | |

| Bit No. | 7 | 6 | 5 | 4 | 3 | 2 | 1 | 0 |
|---|---|---|---|---|---|---|---|---|
| Name | GM_Y1 [7:0] | | | | | | | |
| INITIAL VALUE | 01000000b[R/W] | | | | | | | |

| Bit No. | 7 | 6 | 5 | 4 | 3 | 2 | 1 | 0 |
|---|---|---|---|---|---|---|---|---|
| Name | GM_Y2 [7:0] | | | | | | | |
| INITIAL VALUE | 10000000b[R/W] | | | | | | | |

| Bit No. | 7 | 6 | 5 | 4 | 3 | 2 | 1 | 0 |
|---|---|---|---|---|---|---|---|---|
| Name | GM_Y3 [7:0] | | | | | | | |
| INITIAL VALUE | 11101011b[R/W] | | | | | | | |

FIG.66

| Parameter | Register | Equivalent to γ=1 | Equivalent to γ=1.2 |
|---|---|---|---|
| a0 | GM_A0 | 10h | 1Dh |
| a1 | GM_A1 | 10h | 12h |
| a2 | GM_A2 | 10h | 0Eh |
| x0 | GM_X0 | 10h | 10h |
| x1 | GM_X1 | 40h | 1Eh |
| x2 | GM_X2 | 80h | 56h |
| x3 | GM_X3 | EBh | EBh |
| y0 | GM_Y0 | 10h | 10h |
| y1 | GM_Y1 | 40h | 29h |
| y2 | GM_Y2 | 80h | 68h |
| y3 | GM_Y3 | EBh | EBh |

FIG.67

| Bit No. | 7 | 6 | 5 | 4 | 3 | 2 | 1 | 0 |
|---|---|---|---|---|---|---|---|---|
| Name | - | - | - | - | - | - | OFS [9:8] | |
| INITIAL VALUE | - | - | - | - | - | - | 00b[R/W] | |

| Bit No. | 7 | 6 | 5 | 4 | 3 | 2 | 1 | 0 |
|---|---|---|---|---|---|---|---|---|
| Name | OFS [7:0] | | | | | | | |
| INITIAL VALUE | 00001001b[R/W] | | | | | | | |

FIG.68

| Bit No. | 7 | 6 | 5 | 4 | 3 | 2 | 1 | 0 |
|---|---|---|---|---|---|---|---|---|
| Name | - | - | - | - | - | - | WID_VD [9:8] | |
| INITIAL VALUE | - | - | - | - | - | - | 01b[R/W] | |

| Bit No. | 7 | 6 | 5 | 4 | 3 | 2 | 1 | 0 |
|---|---|---|---|---|---|---|---|---|
| Name | WID_VD [7:0] | | | | | | | |
| INITIAL VALUE | 01000000b[R/W] | | | | | | | |

FIG.69

| Bit No. | 7 | 6 | 5 | 4 | 3 | 2 | 1 | 0 |
|---|---|---|---|---|---|---|---|---|
| Name | \multicolumn{8}{c|}{HT_VD [7:0]} |
| INITIAL VALUE | \multicolumn{8}{c|}{11110000b[R/W]} |

FIG.70

| Bit No. | 7 | 6 | 5 | 4 | 3 | 2 | 1 | 0 |
|---|---|---|---|---|---|---|---|---|
| Name | | | | H_POS [7:0] | | | | |
| INITIAL VALUE | | | | 00000000b[R/W] | | | | |

FIG.71

| Bit No. | 7 | 6 | 5 | 4 | 3 | 2 | 1 | 0 |
|---|---|---|---|---|---|---|---|---|
| Name | | | | V_POS [7:0] | | | | |
| INITIAL VALUE | | | | 00000000b[R/W] | | | | |

FIG.72

| Bit No. | 7 | 6 | 5 | 4 | 3 | 2 | 1 | 0 |
|---|---|---|---|---|---|---|---|---|
| Name | | | | V_OFS [7:0] | | | | |
| INITIAL VALUE | | | | 00000000b[R/W] | | | | |

| Bit No. | 7 | 6 | 5 | 4 | 3 | 2 | 1 | 0 |
|---|---|---|---|---|---|---|---|---|
| Name | REG_WPB | REG_SCEB | REG_SCK | REG_SDO | - | SWRITE | SBUSY | SACT |
| INITIAL VALUE | 0[R/W] | 1[R/W] | 0[R/W] | 0[R/W] | - | 0[R/W] | 0[R] | 0[W] |

| Bit No. | 7 | 6 | 5 | 4 | 3 | 2 | 1 | 0 |
|---|---|---|---|---|---|---|---|---|
| Name | SPIPREDIV [2:0] | | | SPIDIV [4:0] | | | | |
| INITIAL VALUE | 100b[R/W] | | | 10110b[R/W] | | | | |

| Bit No. | 7 | 6 | 5 | 4 | 3 | 2 | 1 | 0 |
|---|---|---|---|---|---|---|---|---|
| Name | SWDATA [7:0] | | | | | | | |
| INITIAL VALUE | 00000000b[R/W] | | | | | | | |

FIG.77

| Bit No. | 7 | 6 | 5 | 4 | 3 | 2 | 1 | 0 |
|---|---|---|---|---|---|---|---|---|
| Name | \multicolumn{8}{c|}{SRDATA [7:0]} |
| INITIAL VALUE | \multicolumn{8}{c|}{00000000b[R]} |

FIG.78

| Bit No. | 7 | 6 | 5 | 4 | 3 | 2 | 1 | 0 |
|---|---|---|---|---|---|---|---|---|
| Name | | | | SPIADR0 [7:0] | | | | |
| INITIAL VALUE | | | | 00000000b[R/W] | | | | |

FIG.79

| Bit No. | 7 | 6 | 5 | 4 | 3 | 2 | 1 | 0 |
|---|---|---|---|---|---|---|---|---|
| Name | | | | SPIADR1 [7:0] | | | | |
| INITIAL VALUE | | | | 00000000b[R/W] | | | | |

FIG.80

| Bit No. | 7 | 6 | 5 | 4 | 3 | 2 | 1 | 0 |
|---|---|---|---|---|---|---|---|---|
| Name | | | | SPIADR2 [7:0] | | | | |
| INITIAL VALUE | | | | 00000000b[R/W] | | | | |

FIG.81

| Bit No. | 7 | 6 | 5 | 4 | 3 | 2 | 1 | 0 |
|---|---|---|---|---|---|---|---|---|
| Name | | | | SPIADR3[7:0] | | | | |
| INITIAL VALUE | | | | 00000000b[R/W] | | | | |

FIG.82

| Bit No. | 7 | 6 | 5 | 4 | 3 | 2 | 1 | 0 |
|---|---|---|---|---|---|---|---|---|
| Name | - | - | - | - | SPIADR3H | SPIADR2H | SPIADR1H | SPIADR0H |
| INITIAL VALUE | - | - | - | - | 1[R/W] | 1[R/W] | 0[R/W] | 0[R/W] |

FIG.83

| Bit No. | 7 | 6 | 5 | 4 | 3 | 2 | 1 | 0 |
|---|---|---|---|---|---|---|---|---|
| Name | - | - | - | SRST_NR | SRST_FOG | SRST_REG | SRST_TVE | SRST_AIE |
| INITIAL VALUE | - | - | - | 0[R/W] | 0[R/W] | 0[R/W] | 0[R/W] | 0[R/W] |

IMAGE CORRECTION PROCESSING CIRCUIT, SEMICONDUCTOR DEVICE, AND IMAGE CORRECTION PROCESSING DEVICE

TECHNICAL FIELD

The present invention relates to an image correction process circuit that applies various image correction processes to an input image to generate a desired output image; and to a semiconductor device (image correction process device) that integrates the image correction process circuit.

BACKGROUND ART (First Background Art)
Conventionally, in the field of devices and systems (indoor/outdoor monitor cameras, network cameras (IP cameras), Web cameras, intercoms, and the like), an image correction process circuit, which applies various image correction processes (fog erasure correction process, against-the-light correction process, brightness correction process, and the like) to an input image to generate a desired output image, is used.

Here, the above conventional image correction process circuit, generally, has a structure in which one field of an input image is divided into a plurality of areas; based on a luminance histogram obtained for every area, determines what kind of scene (e.g., foggy, in an against-the-light condition, or the like) the input image is; and applies the optimum image correction process to the input image.

As an example of a conventional technology related to the above description, it is possible to list a patent document 1.

(Second Background Art)
FIG. 93A and FIG. 93B both are block diagrams that show examples of electronic devices (indoor-outdoor monitor cameras, network cameras (IP cameras), Web cameras, vehicle cameras, intercoms, and the like) that process image data.

An electronic device 900 as the conventional example includes a camera DSP [Digital Signal Processor] 903 that applies various digital signal processes to input image data which are input via an AFE [Analog Front End] 902 from a camera 901, thereby generating digital output image data.

Here, as an example of a conventional technology related to the above description, it is possible to list a patent document 2.

CITATION LIST

Patent Literature

PLT1: U.S. Pat. No. 3,981,260
PLT2: JP-A-2004-304712

SUMMARY OF INVENTION

Technical Problem (First Problem)
Indeed, by using an image correction process circuit, it becomes possible to convert a foggy input image and an against-the-light input image into an output image that has high visibility; and to output the output image to a display device.

However, by means of a scene determination method that is employed in the conventional image correction process circuit, there is a case where a suitable scene determination result is not invariably obtained, so that there is room for further improvement.

A first technical means disclosed in the present specification, in light of the above problems, has a first object to provide an image correction process circuit that is able to apply a suitable image correction process to an input image to generate a desired output image; and a semiconductor device that integrates the image correction process circuit.

(Second Problem)
However, the conventional electronic device 900 is not provided with a means that in a case where input image data that are foggy or misty and has poor visibility are obtained by the camera 901, applies a suitable image correction process (fog erasure process) to the input image data.

Here, to execute the above image correction process (fog erasure process) by using the camera DSP 903, it needs to unnecessarily increase the process capability of the camera DSP 903, so that there is a problem that brings increase in the power consumption and high cost of the electronic device 900.

Besides, because the camera DSP 903 outputs the digital output image data which the camera DSP 903 itself generates to later-stage circuits (semiconductor memory and the like), so as to display the output image data from the camera DSP 903 by means of an image display device (television broadcast receiver and the like that include an analog composite video input terminal only) that interacts with only an analog composite video input, it is necessary to additionally dispose an encoder IC that converts the digital output image data output from the camera DSP 903 into output image data in the analog composite video form, so that there is a problem that brings size increase and high cost of the electronic device 900.

A second technical means disclosed in the present specification, in light of the above problems, has a second object to provide an image correction process device that is able to apply a suitable image correction process to input image data to generates desired output image data.

Solution to Problem (First Solution Means)
To achieve the first object, an image correction process circuit disclosed in the present specification is so structured (1-1 structure) as to include:
an image correction portion that applies a predetermined image correction process to an input image to generate an output image;
a calculation portion that obtains a luminance histogram for every one field of the input image and calculates two values or all three values of an average luminance value, a standard deviation value and an intermediate value; and
a correction control portion that based on two values or all the three values of the average luminance value, the standard deviation value and the intermediate value of the luminance histogram which are calculated by the calculation portion, determines whether the image correction process is necessary or not for the input image and a correction amount for the image correction process, and performs control of the image correction portion.

Here, the image correction process circuit having the above 1-1 structure may have a structure (1-2 structure) in which the image correction portion applies a foggy-image correction process to the input image; and
the correction control portion, based on the average luminance value and the standard deviation value of the luminance histogram, determines whether the foggy-image correction process is necessary or not for the input image and the correction amount for the image correction process.

Besides, in the image correction process circuit having the above 1-2 structure, the correction control portion may be so structured (1-3 structure) as to determine that the foggy-image correction process is necessary when the average luminance value of the luminance histogram is larger than a first threshold value and the standard deviation value of the luminance histogram is smaller than a second threshold value.

Besides, in the image correction process circuit having the above 1-3 structure, the correction control portion may have a structure (1-4 structure) in which when the correction control portion determines that the foggy-image correction process is necessary, the correction control portion sets a larger correction amount for the foggy-image correction process in a stepwise way or a continuous way when the standard deviation value of the luminance histogram is smaller.

Besides, the image correction process circuit having the above 1-3 or 1-4 structure may have a structure (1-5 structure) in which a hysteresis width is set in at least one of the first threshold value and the second threshold value.

Besides, the image correction process circuit having any one the above 1-1 to 1-5 structures may be so structured (1-6 structure) as to include a register for externally setting various parameters that are referred to by the correction control portion when the correction control portion determines whether the image correction process is necessary or not for the input image and the correction amount.

Besides, a semiconductor device disclosed in the present specification is so structured (1-7 structure) as to integrate the image correction process circuit having any one of the above 1-1 to 1-6 structures.

(Second Solution Means)

To achieve the second object, an image correction process device disclosed in the present specification is so structured (2-1 structure) as to integrate and include:

a first external terminal into which digital input image data are input from outside of the device;

an image correction process circuit that applies a predetermined image correction process to the digital input image data to generate digital output image data;

a second external terminal from which the digital output image data are output to the outside of the device;

an encoder circuit that converts the digital output image into output image data in an analog composite video form; and a third external terminal from which the output image data in the analog composite video form are output to the outside of the device.

Here, in the image correction process device having the above 2-1 structure, the image correction process circuit may be so structured (2-2 structure) as to include:

a first image correction process portion that applies a first image correction process, which is an image correction process based on a luminance histogram, and besides an original purpose, is likely to bring a color-component imbalance or a luminance dynamic range shortage, to the digital input image data to generate digital intermediate image data; and a second image correction process portion that applies a second image correction process, which eliminates a color-component imbalance or a luminance dynamic range shortage caused by the first image correction process, to the digital intermediate image data, thereby generating the digital output image data.

Further, the image correction process device having the above 2-2 structure may have a structure (2-3 structure) in which the first image correction process is a foggy-image correction process, and the second image correction process is a color correction process or a luminance dynamic range correction process.

Besides, the image correction process device having the above 2-2 or 2-3 structure may have a structure (2-4 structure) in which in the first image correction process portion, a valid luminance range of the luminance histogram, which is referred to during a time of calculating a correction coefficient, is variably set.

Further, the image correction process device having the above 2-4 structure may have a structure (2-5 structure) in which the first image correction process portion, when deciding a correction coefficient of a frame, uses the correction coefficient of the frame and a correction coefficient of at least one of frames which are input before and after the frame, to apply a low pass filter process to the correction coefficient of the frame.

Advantageous Effects of Invention

According to the first and second technical means disclosed in the present specification, it becomes possible to apply a suitable image correction process to input image data to generate desired output image data.

BRIEF DESCRIPTION OF DRAWINGS

FIG. 9 is a terminal-function description table of the image process IC 100.

FIG. 11A is a data transmission/reception waveform view of a dual-line type serial interface.

FIG. 11B is a format view of a dual-line type serial interface.

FIG. 14 is a waveform view for describing a flow of reading data from an EEPROM.

FIG. 15A is a view showing a data format (during a set time) inside of an EEPROM.

FIG. 15B is a view showing a data format (during a stop time) inside of an EEPROM.

FIG. 16 is a register map of the image process IC 100.

FIG. 17 is a detailed table of a polarity set register POL.

FIG. 18A is a timing chart showing a way of setting polarity of CAMCKI for CAMDI [7:0] (when CKPOL=0).

FIG. 18B is a timing chart showing a way of setting polarity of CAMCKI for CAMDI [7:0] (when CKPOL=1).

FIG. 19 is a detailed table of a parameter update register PARAMSET.

FIG. 20 is a detailed table of a mode register MODE.

FIG. 21 is an operation mode table of MODE [1:0].

FIG. 22 is a detailed table of an input interface format specification register YUVIFSET.

FIG. 23 is a detailed table of an output range conversion register TRAM_LIM.

FIG. 24 is a detailed table of a monitor X-direction pixel size set register DXSIZE.

FIG. 25 is a detailed table of a monitor Y-direction pixel size set register DYSIZE.

FIG. 26 is a detailed table of a foggy-image correction, image enhance valid X-direction start position set register ICXST.

FIG. 27 is a detailed table of a foggy-image correction, image enhance valid Y-direction start position set register ICYST.

FIG. 31 is a detailed table of a pre-gamma set register PREGAMMA.

FIG. 32 is a detailed table of a luminance correction strength set register STRENGTH.

FIG. 33 is a detailed table of a color difference correction strength set register UV_STRENGTH.

FIG. 34 is a detailed table of a noise curb set register NOISE_SUP.

FIG. 35 is a detailed table of an edge enhancement filter set register EDG_CNT.

FIG. 36 is a detailed table of a response time set register RESP_SET.

FIG. 37 is a detailed table of a post-filter enable register PFLT_EN.

FIG. 38 is a detailed table of output gamma characteristic registers POFLT0 to POFLT8.

FIG. 40 is a detailed table of a foggy-image correction control register FRCTL.

FIG. 41 is a detailed table of a foggy-image correction S-curve range adjustment register SCRVADJ.

FIG. 42 is a table showing a relationship between a set value in SCRVADJ and a foggy-image correction strength.

FIG. 43 is a detailed table of a foggy-image correction γ-curve range adjustment register GCRVADJ.

FIG. 44 is a table showing a relationship between a set value in GCRVADJ and an offset of a γ value.

FIG. 45 is a detailed table of a histogram average luminance value register HAVGLUM.

FIG. 46 is a detailed table of a histogram standard dispersion register HSTDVRC.

FIG. 47 is a detailed table of a between-fields low pass filter control register FR_LPF_CNT.

FIG. 48 is a detailed table of a between-fields LPF coefficient register FR_LPF_COEF0-FR_LPF_COEF4.

FIG. 49 is a detailed table of an automatic control UV_STR adjustment register UV_STR_AT.

FIG. 50 is a detailed table of automatic control dispersion value threshold value set registers ACVRCTH1 to ACVRCTH 3.

FIG. 51 is a detailed table of automatic control average value threshold value set registers ACAVGTH1, ACAVGTH2.

FIG. 52 is a detailed table of automatic control S-curve correction region set registers ACSCV11 to ACSCV13.

FIG. 57 is a detailed table of a TV encoder video mode register VIDEO.

FIG. 58 is a list showing usable setting of the TV encoder video mode register VIDEO.

FIG. 59 is a detailed table of a TV encoder video mode register CVBS.

FIG. 60 is a detailed table of a background color register BGCOL.

FIG. 61 is a detailed table of a TV encoder color bar test register COLBAR.

FIG. 62 is a detailed table of a TV encoder setup register SETUP.

FIG. 63 is a detailed table of a TV encoder setup2 register SETUP2.

FIG. 64 is a detailed table of TV encoder gamma correction registers GM_A0 to GM_A2, GM_X0 to GM_X3, and GM_Y0 to GM_Y3.

FIG. 66 is a table showing setting examples of gamma correction registers GM_A0 to GM_A2, GM_X0 to GM_X3, and GM_Y0 to GM_Y3.

FIG. 67 is a detailed table of an input valid start pixel offset set register OFS.

FIG. 68 is a detailed table of a TV encoder valid data width set register WID_VD.

FIG. 69 is a detailed table of a TV encoder valid line width set register HT_VD.

FIG. 70 is a detailed table of a TV encoder horizontal display position offset register H_POS.

FIG. 71 is a detailed table of a TV encoder vertical display position offset register V_POS.

FIG. 72 is a detailed table of an input valid start line offset set register V_OFS.

FIG. 77 is a detailed table of an SPI read data set register SPIRDATA.

FIG. 78 is a detailed table of an SPI EEPROM read address set register 0:SPIADR0L.

FIG. 79 is a detailed table of an SPI EEPROM read address set register 1:SPIADR1L.

FIG. 80 is a detailed table of an SPI EEPROM read address set register 2:SPIADR2L.

FIG. 81 is a detailed table of an SPI EEPROM read address set register 3:SPIADR3L.

FIG. 82 is a detailed table of an SPI EEPROM read address bit 8 set register SPIADR1_H.

FIG. 83 is a detailed table of an initialization register SRST.

DESCRIPTION OF EMBODIMENTS

First, a first embodiment of an image process IC according to the present invention is described.

Figure 1:
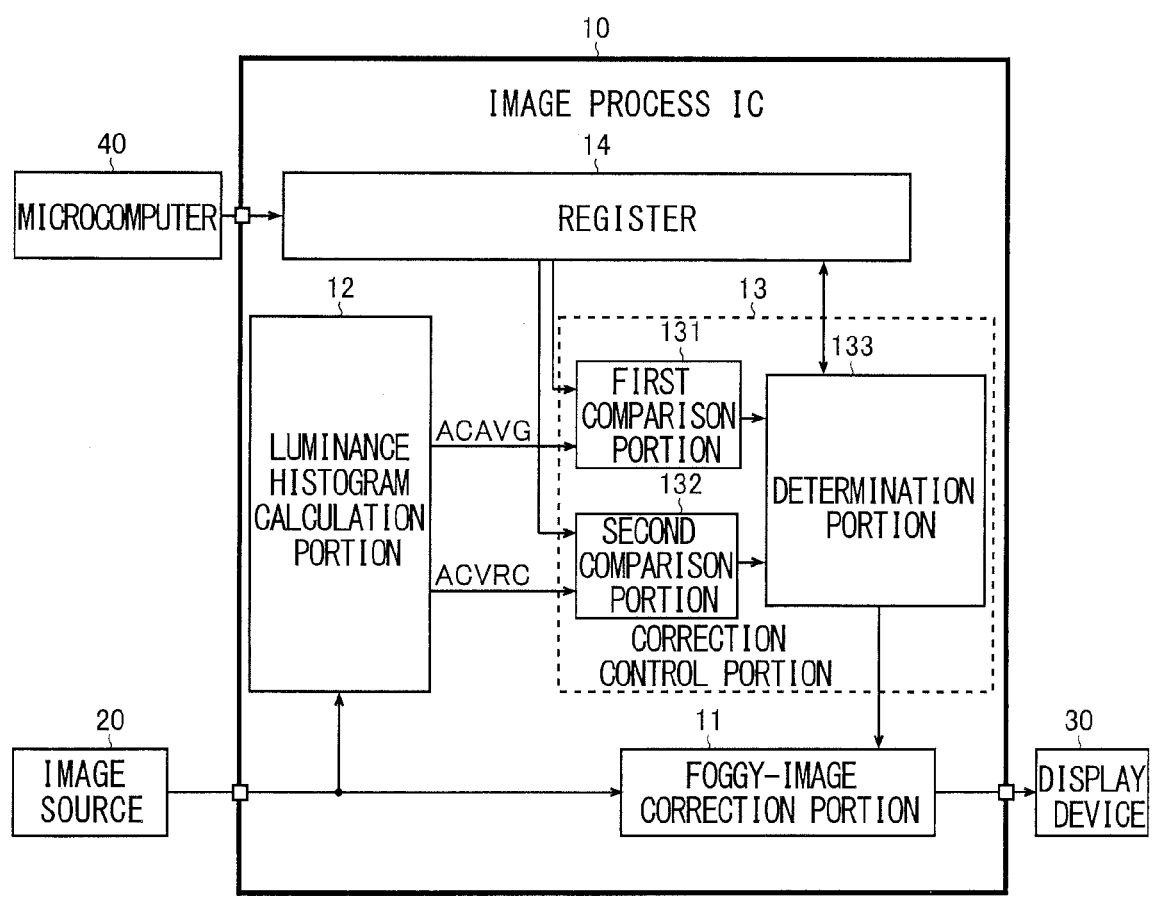
FIG. 1 is a block diagram showing a first embodiment of an image process IC according to the present invention.

FIG. 1 is a block diagram showing a first embodiment of the image process IC according to the present invention. An image process IC 10 according to the present invention is a semiconductor device which integrates an image correction process circuit which includes: a foggy-image correction portion 11; a luminance histogram calculation portion 12; a correction control portion 13; and a register 14. Here, although not shown in FIG. 1, in the image process IC 10, besides the foggy-image correction portion 11, it is possible to contain a circuit block that applies various image processes (luminance dynamic range correction, brightness correction, against-the-light correction and the like) to an input image.

The foggy-image correction portion 11 is a means that generates a desired output image by applying a foggy-image correction process to an input image that is input from an image source 20; and outputs the image to a display device 30. The image source 20 is a means that generates the input image that is input into the image process IC 10, and, for example, as the image source 20, it is possible to use a digital video camera that takes a dynamic image, a digital still camera that takes a still image and the like. Besides, as the image source 20, it is also possible to use broadcast receivers (digital television broadcast receivers and the like) and media players (drive devices such as a video CD, a DVD, a Blu-ray disc, a hard disc, a semiconductor memory and the like that have a play function; besides them, personal computers and the like that have a play function for image contents which are provided via the Internet). The display device 30 is a means that displays the output image which undergoes the foggy-image correction process by the image process IC 10; and as the display device 30, it is possible to use an LCD (Liquid Crystal Display), an organic EL (Electro-Luminescence) display and the like.

The luminance histogram calculation portion 12 is a means that obtains a luminance histogram for every one field (frame) of the input image that is input from the image source 20; and calculates two values or all the three values of an average luminance value, a standard deviation value and an intermediate value of the luminance histograms. Here, in the example of FIG. 1, the luminance histogram calculation portion 12 is so structured as to calculate an average luminance value ACAVG and a standard deviation value ACVRC of the luminance histograms.

The correction control portion 13 is a means that based on two values or all the three values of the average luminance value, the standard deviation value and the intermediate value of the luminance histograms that are calculated by the luminance histogram calculation portion 12, determines a correction amount and whether the foggy-image correction process is necessary or not for the input image; and based on the determination result, performs control of the foggy-image correction portion 11. Here, in the example of FIG. 1, the correction control portion 13 is so structured as to include: a first comparison portion 131 that compares the average luminance value ACAVG of the luminance histograms with first threshold values (ACAVGTH1, ACAVGTH2); a second comparison portion 132 that compares the standard deviation value ACVRC of the luminance histograms with second threshold values (ACVRCTH1 to ACVRCTH3); and a determination portion 133 that based on comparison results from the first comparison portion 131 and the second comparison portion 132, determines the correction amount and whether the foggy-image correction process is necessary or not. Here, control operation of the foggy-image correction portion 11 by the correction control portion 13 is described in detail later.

The register 14 is a parameter storage means that performs external setting, from a microcomputer 40, of various parameters (the above first threshold value and the second threshold value are included) that are referred to by the correction control portion 13 when determining the correction amount and whether the foggy-image correction process is necessary or not for the input image.

Figure 2A:
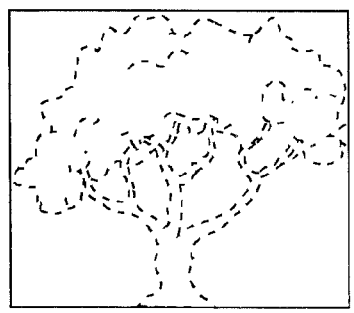
FIG. 2A is a schematic view showing a foggy image.
Figure 2B:
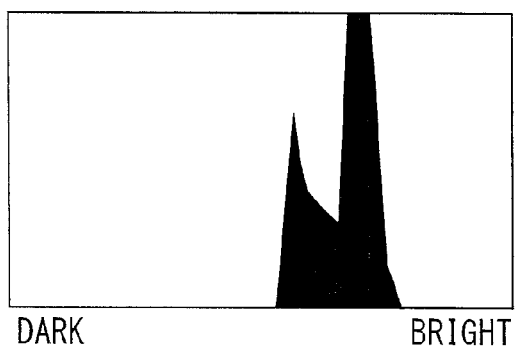
FIG. 2B is a schematic view showing a luminance histogram of a foggy image.
Figure 3A:
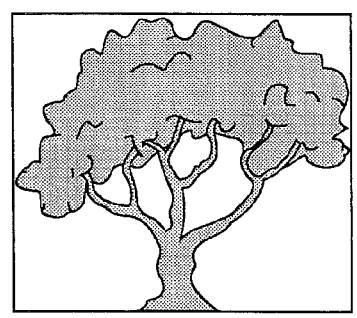
FIG. 3A is a schematic view showing a not-foggy image.
Figure 3B:
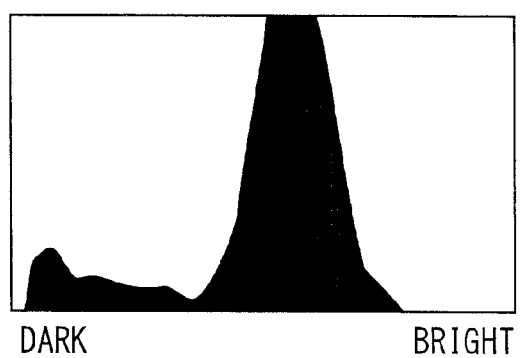
FIG. 3B is a schematic view showing a luminance histogram of a not-foggy image.

Next, before operation description of the correction control portion 13, it is studied what kind of difference occurs in each luminance histogram between a foggy input image and a not-foggy input image. FIG. 2A and FIG. 2B are schematic views that show a foggy image and a luminance histogram of the foggy image, respectively; FIG. 3A and FIG. 3B are schematic views that show a not-foggy image and a luminance histogram of the not-foggy image.

Generally, a foggy input image (FIG. 2A) is an image that is white (bright) as a whole and has a low contrast (narrow luminance dynamic range) compared with a not-foggy input image (FIG. 3A). In other words, the luminance histogram of the foggy input image has a high average luminance value and a small standard deviation value compared with the luminance histogram of the not-foggy input image (FIG. 2B, FIG. 2B).

The correction control portion 13, in light of the above study, has a structure in which the correction control portion 13, based on the average luminance value ACAVG and the standard deviation value ACVRC of the luminance histograms that are calculated by the luminance histogram calculation portion 12, determines the correction amount and whether the foggy-image correction process is necessary or not for the input image; and based on the determination result, performs the control of the foggy-image correction portion 11.

Figure 4:
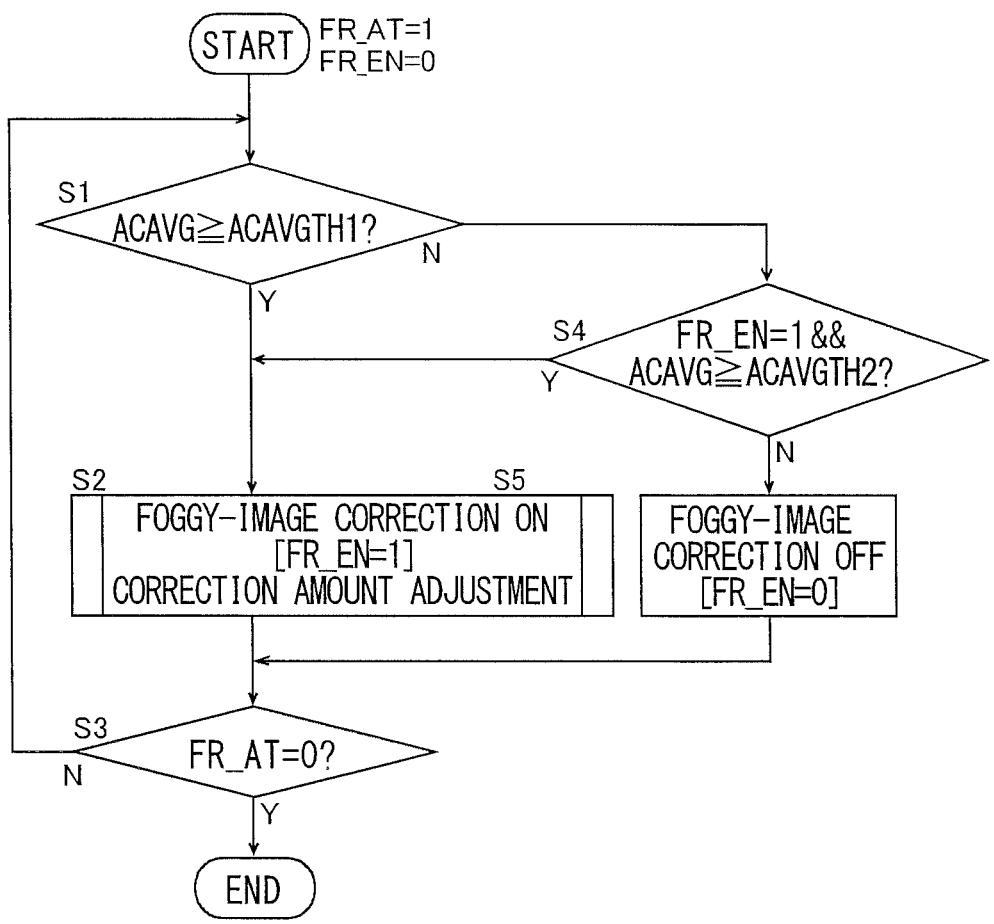
FIG. 4 is a flow chart for describing determination of whether a foggy-image correction process is necessary or not.

FIG. 4 is a flow chart for describing determination, by the correction control portion 13 (especially, the determination portion 133), of whether the foggy-image correction process is necessary or not. Here, at a start time of the flow chart, it is supposed that a register value FR_AT is set at "1 (foggy-image correction process: automatic), and a register value FR_EN is set at "0 (fogy-image correction process: in stop)."

First, before contents description of the flow chart, the above register value FR_AT and the register value FR_EN are described in detail. The register value FR_AT is a register value for setting an execution method of the foggy-image correction process. When the register value FR_AT is set at 0, the foggy-image correction process is manually performed, while when the register value FR_AT is set at 1, the foggy-image correction process is automatically performed. Here, when the register value FR_EN is set at 1, bit control (operation confirmation control of the foggy-image correction process) of the register value FR_EN is also automatically performed.

The register value FR_EN is a register value for performing operation control (enable control) of the foggy-image correction process and operation confirmation of the foggy-image correction process. In a case where the register value FR_AT is set at "0 (foggy-image correction process: manual)", the register value FR_EN is used for the operation control (enable control) of the foggy-image correction process. In other words, when the register value FR_EN is set at 0, the foggy-image correction process is disabled, while when the register value FR_EN is set at 1, the foggy-image correction process is enabled. On the other hand, in a case where the register value FR_AT is set at "1 (foggy-image correction process: automatic)", the register value FR_EN is used for the operation confirmation of the foggy-image correction process. In other words, when the register value FR_EN is set at 0, it is confirmed that the foggy-image correction process is in stop, while when the register value FR_EN is set at 1, it is confirmed that the foggy-image correction process is in operation.

Next, contents of the flow chart shown in FIG. 4 are specifically described. If the present flow chart is started, in a step S1, the average luminance value ACAVG of the luminance histograms and the first threshold value (an upper threshold value ACAVGTH1 in the step S1) are compared and determined. Here, in a case where it is determined ACAVG≥ACAVGTH1, the flow is advanced to a step S2 (correction amount adjustment step). On the other hand, in a case where it is determined that ACAVG≥ACAVGTH1 is not met, the flow is advanced to a step S4.

In the step S1, in the case where it is determined ACAVG≥ACAVGTH1, in the step S2, the foggy-image correction process in the foggy-image correction portion 11 is turned on (basically, the register value=1), an adjustment process of the correction amount (correction strength) is performed. Here, the correction amount adjustment process in the step S2 is described in detail later.

On the other hand, in the step S1, in the case where it is determined that ACAVG≥ACAVGTH1 is not met, in the step S4, it is determined whether the register value FR_SN is set at 1 or not, and the average luminance value ACAVG of the luminance histograms and the first threshold value (in the step S4, a lower threshold value ACAVGTH2 (≤ACAVGTH1)) are compared and determined. Here, in a case where it is determined that the register value FR_SN is set at 1 and it is determined ACAVG≥ACAVGTH2, the flow is advanced to a step S2. On the other hand, in a case where it is determined that the register value FR_EN is not set at 1, or it is determined that ACAVG≥ACAVGTH2 is not met, the flow is advanced to a step S5.

In the step S4, if it is determined that the register value FR_EN is not set at 1, or it is determined that ACAVG≥ACAVGTH2 is not met, in the step S5, the foggy-image correction process in the foggy-image correction portion 11 is turned off (the register value FR_EN=0), and the flow is advanced to the step S3.

After the correction amount adjustment process is completed in the step S2, or after the foggy-image correction process is turned off in the step S5, it is determined whether the register value FR_AT is set at "0 (foggy-image correction process: manual)" in the step S3 or not. Here, in a case where it is determined that the register value FR_AT is not set at 0, the flow is returned to the step S1, where the average luminance value ACAVG of the luminance histograms and the first threshold value (in the step S1, the upper threshold ACAVGTH1) are repeatedly compared and determined. On the other hand, in a case where it is determined that the register value ER_AT is set at 0, so as to change the foggy-image correction process to the manual execution, the series of the flow is ended.

Figure 5:
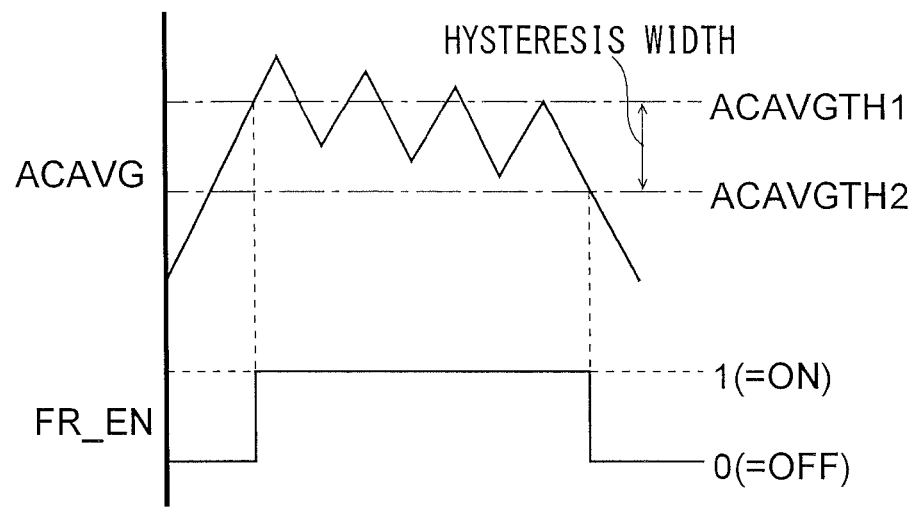
FIG. 5 is a view for describing a comparison determination operation over an average luminance value ACAVG of a luminance histogram and first threshold values (ACAVGTH1 and ACAVGTH2).

Here, as for the first threshold value that is compared with the average luminance value ACAVG of the luminance histograms, as described above, it is desirable that the upper threshold value ACAVGTH1 and the lower threshold value ACAVGTH2 are adjusted to set a predetermined hysteresis width. By setting such a hysteresis width, as shown in FIG. 5, when the foggy-image correction process is in an off state (when the register value FR_EN=0), the foggy-image correction process is not turned on until the average luminance value ACAVG of the luminance histograms reaches the upper threshold value ACAVGTH1, while when the foggy-image correction process is in an on state (when the register value FR_EN=1), the foggy-image correction process is not turned off until the average luminance value ACAVG of the luminance histograms becomes under the lower threshold value ACAVGTH2, so that it becomes possible to curb a flicker in the output image by preventing an on/off oscillation in the foggy-image correction process. Here, it is possible to externally set both of the upper threshold value ACAVGTH1 and the lower threshold value ACAVGTH2 into the register 14 from the microcomputer 40; in a case where the upper threshold value ACAVGTH1 and the lower threshold value ACAVGTH2 are set at the same value, the above hysteresis function is turned off.

Figure 6A:
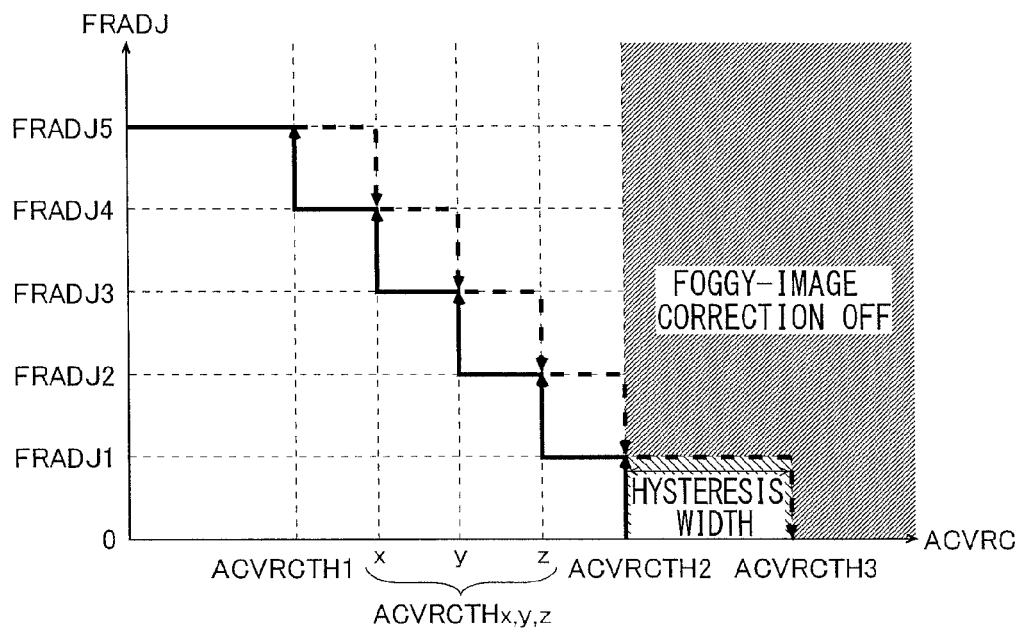
FIG. 6A is a view showing an example of a correction amount adjustment process.

Next, the correction amount adjustment process in the step S2 is described in detail with reference to FIG. 6A. FIG. 6A is a view showing an example of the correction amount adjustment process. Here, a horizontal axis in FIG. 6A indicates the standard deviation value ACVRC of the luminance histograms, and a vertical axis in FIG. 6A indicates the register value FRADJ for setting the correction amount (correction strength) for the foggy-image correction process.

In the correction amount adjustment process in the step S2, the correction control portion 13 performs comparison and determination of the average luminance value ACVRC of the luminance histograms and the second threshold values (ACVRCTH1 to ACVRCTH3, ACVRCTHx to ACVRCTHz), and determines whether it is necessary to apply the foggy-image correction process to the input image or not; and in a case where it is necessary to apply the foggy-image correction process to the input image, determines at which one of the register values FRADJ1 to FRADJ5 the correction value (correction strength) is to be set.

Here, of the second threshold values, three threshold values (ACVRCTH1, ACVRCTH2, ACVRCTH3) are able to be externally set into the register 14 from the microcomputer 40; and the three other threshold values (ACVRCTHx, ACVRCTHy ACVRCTHz) are so internally automatically set as to equally divide a difference between the threshold value ACVRCTH1 and the threshold value ACVRCTH2. Accordingly, of the second threshold values, to externally set the three threshold values (ACVRCTH1, ACVRCTH2, ACVRCTH3), it is necessary to meet a relationship ACVRCTH1+4≤ACVRCTH2≤ACVRCTH3.

Besides, it is possible to externally set the register values FRADJ1 to FRADJ5 which are candidates for the correction amount into the register 14 from the microcomputer 40. Here, when externally setting the register values FRADJ1 to FRADJ5, to set a larger correction amount for the foggy-image correction process when the standard deviation value ACVRC of the luminance histograms becomes smaller, it is necessary to meet a relationship FRADJ5≥FRADJ4≥FRADJ3≥FRADJ2≥FRADJ1 (where FRADJ5>FRADJ1).

Here, like in the above-described first threshold values (ACAVGTH1, ACAVGTH2), also in the second threshold values (ACVRCTH1 to ACVRCTH3, ACVRCTHx to ACVRCTHz), it is desirable to set a predetermined hysteresis width. For example, as shown in FIG. 6A, in a case where the standard deviation value ACVRC of the luminance histograms becomes gradually small (in a case where it is necessary to increase the correction amount), the correction amount adjustment is performed along a route represented by a solid line, while in a case where the standard deviation value ACVRC of the luminance histograms becomes gradually large (in a case where it is necessary to decrease the correction amount), the correction amount adjustment is performed along a route represented by a broken line.

For example, a case is considered, in which it is determined ACVRC=ACVRCTHy in the previous time of comparison and determination; and the current correction amount is set at the register value FRADJ. In this case, the correction amount is not changed to the register value FRADJ4 until the standard deviation value ACVRC of the luminance histograms becomes under the threshold value ACVRCTHx (see the solid line in FIG. 6A), while the correction amount is not changed to the register value FRADJ2 until the standard deviation value ACVRC of the luminance histograms becomes equal to or over the threshold value ACAVGTHz (see the broken line in FIG. 6A). Accordingly, it becomes possible to curb a flicker in the output image by preventing the correction amount for the foggy-image correction process from being frequently changed.

Besides, in a case where the foggy-image correction process is in the off state, at the time the standard deviation value ACVRC of the luminance histograms becomes under the threshold value ACVRCTH2, the foggy-image correction process is turned on, and the correction amount adjustment process is performed in accordance with the standard deviation value ACVRC of the luminance histograms (see the solid line in FIG. 6A). On the other hand, after the foggy-image correction process is turned on, even if the standard deviation value ACVRC of the luminance histograms becomes equal to or over the threshold value ACVRCTH2, the foggy-image correction process is kept in the on state; and at the time the standard deviation value ACVRC becomes equal to or over the threshold value ACVRCTH3, the foggy-image correction process is turned off (see the broken line in FIG. 6A). Accordingly, it becomes possible to curb a flicker in the output image by preventing the on/off oscillation in the foggy-image correction process. Here, in a case where the threshold value ACVRCTH3 is set at the largest possible value that the standard deviation value ACVRC of the luminance histograms is able to have, the foggy-image correction process is always kept in the on state.

As described above, in the image process IC 10 according to the present embodiment, the correction control portion 13 determines that the foggy-image correction process is necessary when the average luminance value ACAVG of the luminance histograms is larger than the first threshold value (in the examples of FIG. 4 and FIG. 5, the threshold value ACAVGTH1 or the threshold value ACAVGTH2) and the standard deviation value ACVRC of the luminance histograms is smaller than the second threshold value (in the example of FIG. 6A, the threshold value ACVRCTH2 or the threshold value ACVRCTH3). As described above, according to the structure in which based on the average luminance value ACAVG and the standard deviation value ACVRC of the luminance histograms, the correction amount and necessity of the foggy-image correction process for the input image are determined, it is possible to perform a suitable scene determination without requiring an area division process of the input image and to perform the optimum foggy-image correction process for every scene, so that it becomes possible to improve the visibility of the output image.

Here, the above-described determination process of the correction amount and necessity of the foggy-image correction process is performed for one field (frame) of the input image; however, the frequency at which the instruction contents for the foggy-image correction portion 11 are updated based on the determination result may not be invariably one field: it is possible to arbitrarily adjust the frequency for every 16 fields, 32 fields, or 64 fields or the like in accordance with the register setting from the microcomputer 40.

Besides, by performing a calculation process by means of software that uses the microcomputer 40, it is possible to perform the above-described foggy-image correction process, the determination of the necessity of the foggy-image correction process and the correction amount adjustment; however, if the calculation process by means of hardware that uses the image process IC 10 according to the present invention, it is possible to reduce the burden on the microcomputer 40, so that it becomes possible to achieve increase in the process speed of the entire system and cost reduction of the entire system.

Here, in the above embodiment, the structure, in which the present invention is applied to the foggy-image correction process circuit, is described as an example; however, the application target of the present invention is not limited to this: the present invention is also widely applicable to other image correction process circuits. For example, in a case where the present invention is applied to an against-the-light image correction process circuit, a structure may be employed, in which in a case where a luminance histogram is obtained for every one frame of the input image, the average luminance value of them is relatively low, the standard deviation value is relatively large and the intermediate value is relatively high, the input image is recognized to be in an against-the-light condition and an against-the-light correction process is performed.

Figure 6B:
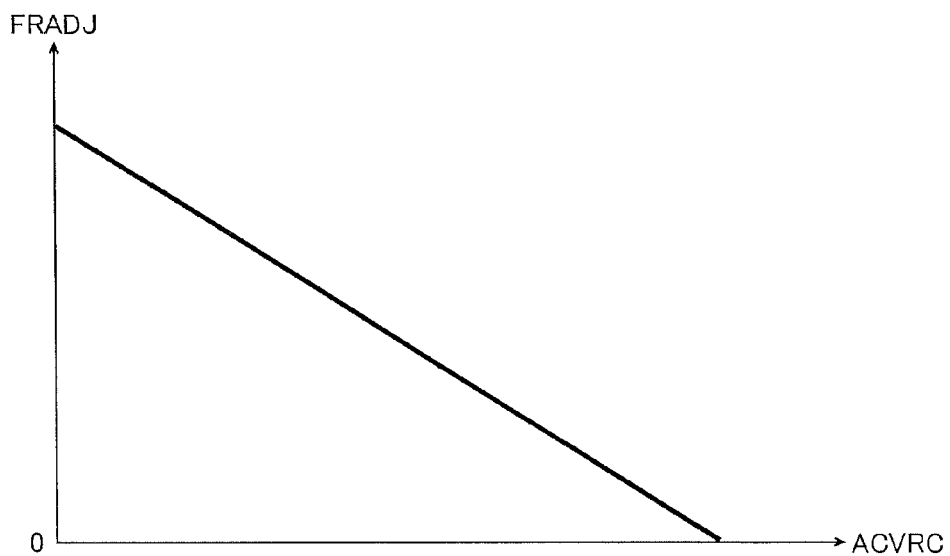
FIG. 6B is a view showing another example of the correction amount adjustment process.

Besides, in the above embodiment, the structure (see FIG. 6A) is described as an example, in which when the correction control portion 13 determines that the foggy-image correction process is necessary, the correction control portion 13 sets a larger correction amount for the foggy-image correction process in a stepwise way when the standard deviation value ACVRC of the luminance histograms is smaller; however, the structure of the present invention is not limited to this; for example, a structure (see FIG. 6B) may be employed, in which when the standard deviation value ACVRC of the luminance histograms is smaller, a larger correction amount for the foggy-image correction process is continuously set.

Next, a second embodiment of the image process IC according to the present invention is described.

Figure 7:
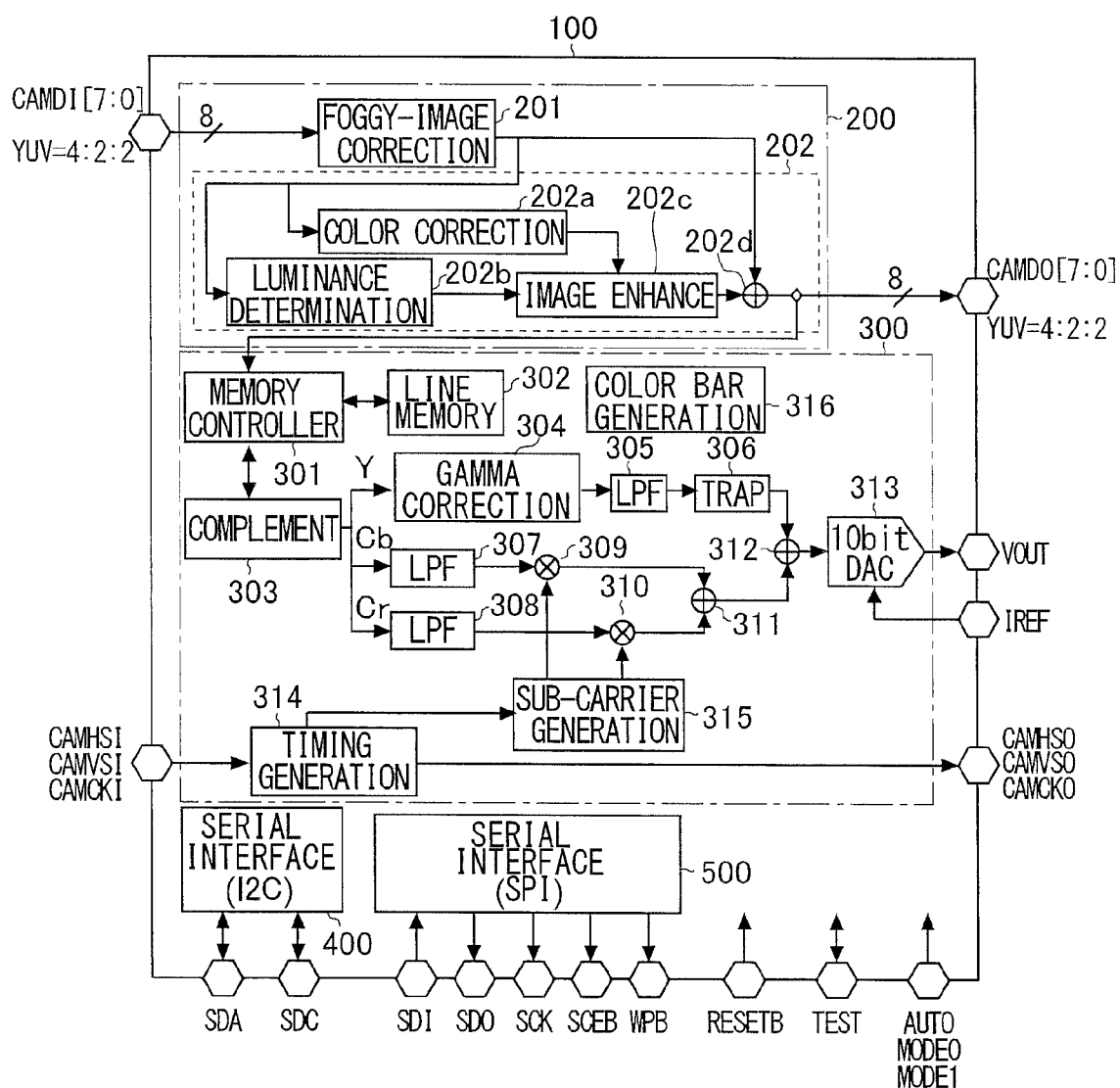
FIG. 7 is a block diagram showing a second embodiment of an image process IC according to the present invention.

FIG. 7 is a block diagram showing a second embodiment of the image process IC according to the present invention. An image process IC 100 in the present embodiment is a semiconductor device (digital video encoder IC with image correction function) that integrates: an image correction process circuit 200; an encoder circuit 300; a first serial interface circuit 400; and a second serial interface circuit 500, and has both of a function as an NTSC/PAL digital video encoder and a function as a fog correction/dynamic range correction image process device. Here, although not shown in FIG. 7, in the image process IC 100 in the present embodiment, registers each of which stores an operation setting parameter for each portion of the IC are integrated.

The image correction process circuit 200 is a circuit block which generates the digital output image data by applying a predetermined image correction process to the digital input image data that are input from outside of the device, and includes: a first image correction process portion 201; and a second image correction process portion 202.

The first image correction process portion 201 is a circuit block which applies the foggy-image correction process to the digital input image data that are input from outside of the device, and to which the foggy-image correction portion 11, the luminance histogram calculation portion 12, and the correction control portion that are shown in the above FIG. 1 correspond.

The second image correction process portion 202 is a circuit block which further applies a color correction process and a luminance dynamic range correction process to the input image data that are input from the first image correction process portion 201 and already undergo the foggy-image correction process, and includes: a color correction portion 202a; a luminance determination portion 202b; an image enhance portion 202c; and a calculation process portion 202d.

The color correction process portion 202a, based on the input image data that are input from the first image correction process portion 201 and already undergo the foggy-image correction process, calculates a color correction coefficient.

The luminance determination portion 202b, based on the input image data that are input from the first image correction process portion 201 and already undergo the foggy-image correction process, calculates a luminance dynamic range correction coefficient.

The image enhance portion 202c, based on the color correction coefficient that is input from the color correction portion 202a and the luminance dynamic range correction coefficient that is input from the luminance determination portion 202b, calculates the final image correction coefficient.

The calculation process portion 202d, based on the final image correction coefficient that is input from the image enhance portion 202c, further applies the color correction process and the luminance dynamic range correction process to the input image data that are input from the first image correction process portion 201 and already undergo the foggy-image correction process.

The encoder circuit 300 is a circuit block which converts the digital output image data generated by the image correction process circuit 200 into output image data in an analog composite type video form, and includes: a memory controller 301; a line memory 302; a complement portion 303; a gamma correction portion 304; a low pass filter portion 305; a trap filter portion 306; low pass filter portions 307, 308; calculation portions 309 to 312; a digital/analog conversion portion 313; a timing signal generation portion 314; a sub-carrier signal generation portion 315; and a color bar signal generation portion 316.

The memory controller 301 uses the line memory 302 to perform line buffer control of the digital output image data that are input from the image correction process circuit 200. The complement portion 303 applies a complementary process (YUV (4:2:2)→YUV (4:4:4)) of missing information to the digital output image data input from the memory controller 301; and performs an over-sampling process (13.5 MHz→27 MHz) of the digital output image data.

The gamma correction portion 304 applies a gamma correction process to a luminance signal Y that is input from the complement portion 303. The low pass filter portion 305 applies a low pass filter process to an output signal from the gamma correction portion 304. The trap filter portion 306 applies a band eliminate filter process to an output signal from the low pass filter portion 305.

The low pass filter portions 307, 308 apply a low pass filter process to color signals Cb, Cr respectively that are input from the complement portion 303. The calculation process portions 309, 310 superimpose a sub-carrier signal onto output signals from the low pass filter portions 307, 308 respectively. The calculation process portion 311 adds an output signal from the calculation process portion 309 and an output signal from the calculation process portion 310 to each other. The calculation process portion 312 adds an output signal from the trap filter portion 305 and an output signal from the calculation process portion 311 to each other. The digital/analog conversion portion 313 converts a digital signal input from the calculation process portion 312 into an analog signal and outputs the analog signal.

The timing signal generation portion 314 through-outputs timing signals (horizontal synchronous signal, vertical synchronous signal, clock signal) input from outside of the device to the outside of the device as they are, while also performing synchronous control of the sub-carrier signal generation portion 315 by using the timing signals. The sub-carrier signal generation portion 315 generates a sub-carrier signal used for burst modulation of the color signals Cb, Cr and supplies the signal to the calculation process portions 309, 310. The color bar signal generation portion 316 generates a color bar signal that is a reference value for the output image data in the analog composite video foam.

The first serial interface circuit 400 collaborates with peripheral devices (CPU (Central Processing Unit and the like) to perform dual-line type serial communication that is in conformity with the I²C (Inter-Integrated Circuit) standard.

The second serial interface circuit 500 collaborates with an EEPROM (Electrically Erasable and Programmable Read Only Memory) to perform serial communication that is in conformity with the SPI (Serial Peripheral Interface) standard.

Figure 8:
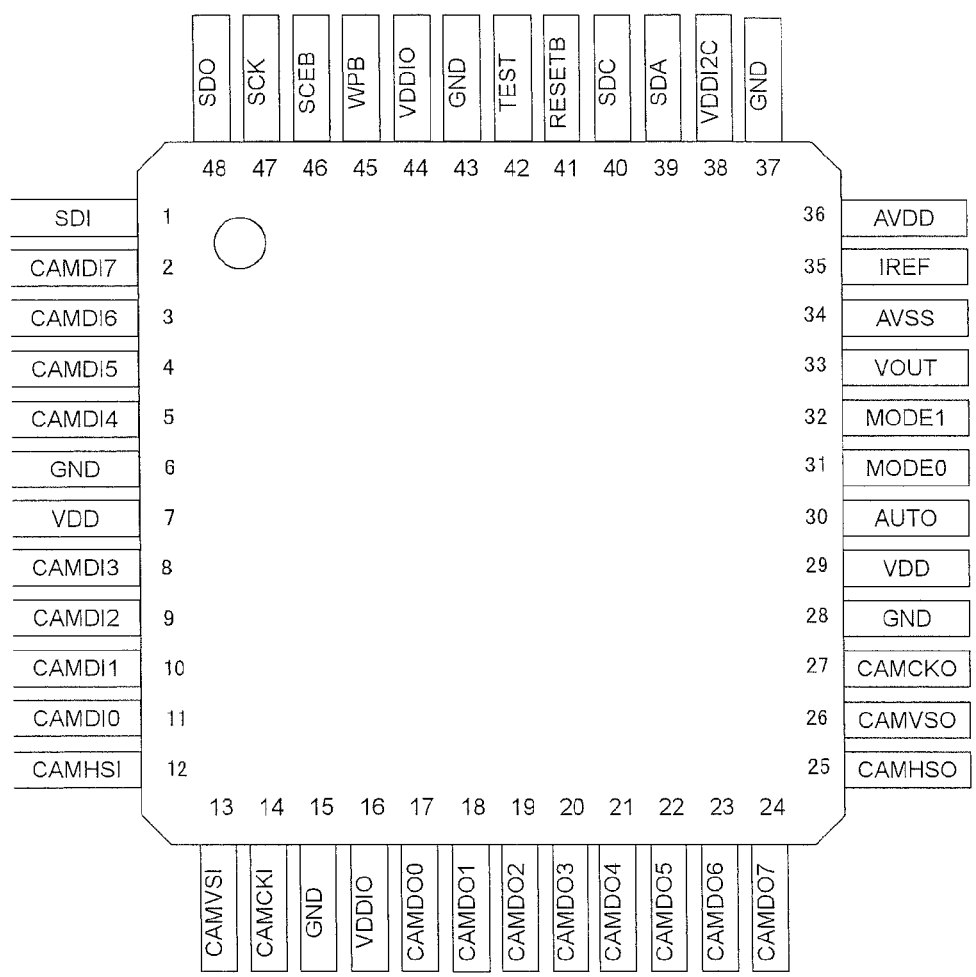
FIG. 8 is a terminal arrangement view of an image process IC 100.

Next, external terminals of the image process IC 100 are described. FIG. 8 is a terminal arrangement view of the image process IC 100; FIG. 9 is a terminal-function description table of the image process IC 100.

A 1st pin (SDI) is an SPI bus data input terminal. A 2nd pin (CAMDI7) to a 5th pin (CAMDI4) each are data input terminals (four leftmost bits [7:4]). A 6th pin (GND) is a common ground terminal. A 7th pin (VDD) is a core power-supply terminal. An 8th pin (CAMDI3) to an 11th pin (CAMDI0) each are data input terminals (four rightmost bits [3:0]). A 12th pin (CAMHSI) is a horizontal timing input terminal. A 13th pin (CAMVSI) is a vertical timing input terminal. A 14th pin (CAMCKI) is a clock input terminal. A 15th pin (GND) is a common ground terminal. A 16th pin (VDDIO) is a digital I/O power-supply terminal. A 17th pin (CAMDO0) to a 24th pin (CAMDO7) each are data output terminals (8 bits in total [7:0]). A 25th pin (CAMHSO) is a horizontal timing output terminal. A 26th pin (CAMVSO) is a vertical timing output terminal. A 27th pin (CAMCKO) is a clock output terminal. A 28th pin (GND) is a common ground terminal. A 29th pin (VDD) is a core power-supply terminal. A 30th pin (AUTO) is a automatic register setting function valid terminal. A 31st pin (MODE0) and a 32nd pin (MODE1) are mode selection terminals. A 33rd pin (VOUT) is an analog composite video output terminal. A 34th pin (AVSS) is a DAC analog ground terminal. A 35th pin (IREF) is a DAC reference voltage output terminal. A 36th pin (AVDD) is a DAC analog power-supply terminal. A 37th pin (GND) is a common ground terminal. A 38th pin (VDDI2C) is a dual-line type serial interface digital I/O power-supply terminal. A 39th pin (SDA) is a dual-line type serial interface digital input/output data terminal. A 40th pin (SDC) is a dual-line type serial interface digital input/output clock terminal. A 41st in (RESETB) is a system reset signal input terminal. A 42nd pin (TEST) is a test mode terminal, and is connected to the ground during a use time. A 43rd pin (GND) is a common ground terminal. A 44th pin (VDDIO) is a digital I/O power-supply terminal. A 45th pin (WPB) is an EEPROM write protect terminal. A 46th pin (SCEB) is an EEPROM chip select terminal. A 47th pin (SCK) is an SPI bus clock output terminal. A 48th pin (SDO) is an SPI bus data output terminal.

Here, as for the terminals indicated by * in an active level section in FIG. 9, it is shown that by setting the registers, it is possible to change the active level. Besides, an Init section in FIG. 9 shows pin states during in a reset release time. Besides, it is shown that the terminals indicated by *1 in the Init section are in a pull-down state. Besides, as for the numbers described in a power-supply system section in FIG. 9, 1 indicates VDDIO, 2 indicates VDDI2C, 3 indicates AVDD, and 4 indicates VDD.

Of the above-described external terminals, the 2nd pin (CAMDI7) to the 5th pin (CAMDI4) and the 8th pin (CAMDI3) to the 11th pin (CAMDI0) correspond to the first external terminals into which the digital input image data are input from outside of the IC. Besides, the 17th pin (CAMDO0) to the 24th pin (CAMDO7) correspond to the second external terminals from which the digital output image data are output to the outside of the IC. Besides, the 33rd pin (VOUT) corresponds to the third external terminal from which the output image data in the analog composite video form are output to the outside of the IC.

Next, an overview of the image process IC 100 having the above structure is described. The image process IC 100 is a video encoder incorporating an image correction function that is able to improve the visibility of the input image (especially, foggy input image, low-brightness input image, or input image in an against-the-light condition) that are input from a camera and the like by comprehensively performing the foggy-image correction, the color correction process, and the luminance dynamic range correction process).

Next, features of the image process IC 100 having the above structure are described. A first feature is that an input data format is compatible with the ITU-R BT.656-4 and the YCbCr with a synchronous signal. Here, as for the ITU-R BT. 656-4, the data bus width is 8 bits and the pixel clock is 27 MHz. Besides, as for the YCbCr with the synchronous signal (the synchronous signal is for slave operation), the data bus width is 8 bits; and the data range is a full range or in conformity with the ITU-R BT. 601. The pixel clock is NTSC (27 MHz, 28.63636 MHz, or 19.06993 MHz), or PAL (27 MHz, 28.375 MHz, 35.46895 MHz, or 18.9375 MHz). A second feature is that an output data format as well, like the input format, is compatible with the ITU-R BT. 656-4, or the YCbCr with the synchronous signal. A third feature is that an output video format is compatible with an NTSC/PAL SD-TV composite video output (CVBS). A fourth feature is that the image process IC 100 incorporates the image correction functions (foggy-image correction function, color correction function, luminance dynamic range correction function), an edge enhancement filter, and a gamma filter. A fifth feature is that the image process IC 100 incorporates one channel of a 10-bit digital/analog converter. A sixth feature is that the image process IC 100 incorporates a slave function which uses the dual-line type serial interface, and is ale to set the registers in the inside of the IC from outside. A seventh feature is that that the image process IC 100 incorporates an SPI bus master function, and is able to automatically read the register set values stored in an external EEEPROM at reset release and mode change times and to set the values into the registers in the inside of the IC. An eighth feature is that the image process IC 100 is compatible with four-system power-supply voltages (VDD=1.50 V, VDDI0=3.30 V, VDDI2C=3.30 V, AVDD=3.30 V). A ninth feature is that the image process IC 100 employs a 48-pin VQFP package (0.5 mm pin pitch).

Figure 10A:
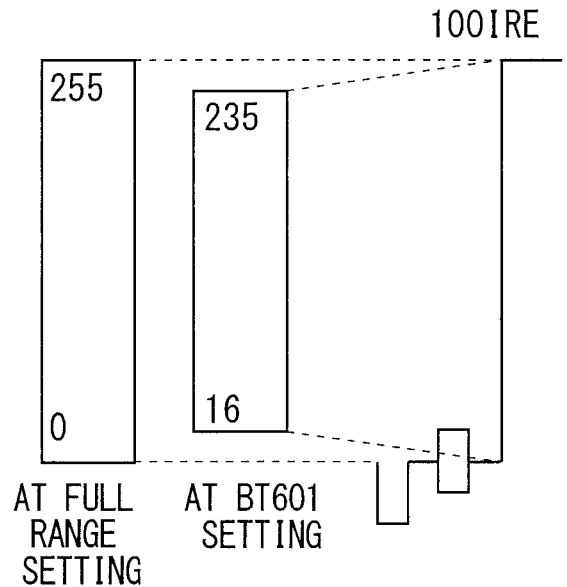
FIG. 10A is a view showing a level relationship between digital data and CVBS output for every setting (during a time of 100IRE setting).
Figure 10B:
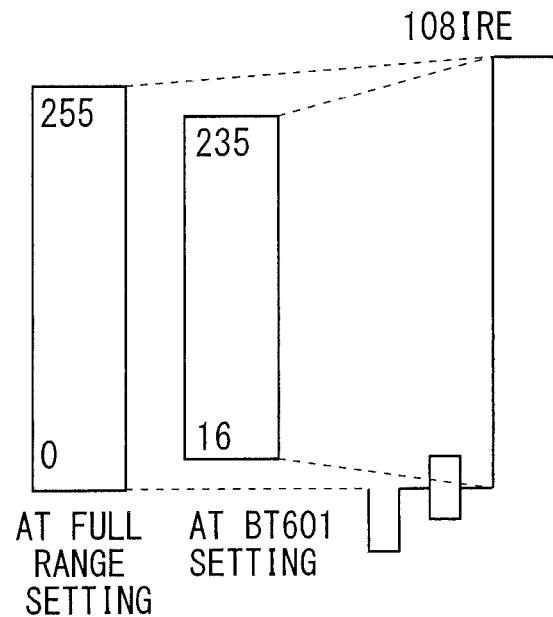
FIG. 10B is a view showing a level relationship between digital data and CVBS output for every setting (during a time of 108IRE setting).

Next, a level relationship between the digital data and the CVBS output is described. By means of an ITU601R_I register, it is possible to set an input digital data range. Besides, by means of a LEVEL register, it is possible to set an analog signal level when performing the CVBS output of the digital data. Relationships between the digital data range by the ITU601R_I register and the CVBS output level by the LEVEL register are as shown in FIG. 10A and FIG. 10B. FIG. 10A and FIG. 10B each are views showing a level relationship between the digital data and the CVBS output for every setting. Here, FIG. 10A shows a state in a 100 [IRE] setting time, while FIG. 10B shows a state in a 108 [IRE] setting time.

Next, the dual-line type serial interface is described. FIG. 11A is a data transmission/reception waveform view of the dual-line type serial interface; FIG. 11B is a format view of the dual-line type serial interface. A slave address of the dual-line type serial interface is 70h. In a case where two or more consecutive accesses are performed for both of the write/read, a sub-address is automatically augmented.

Figure 12:
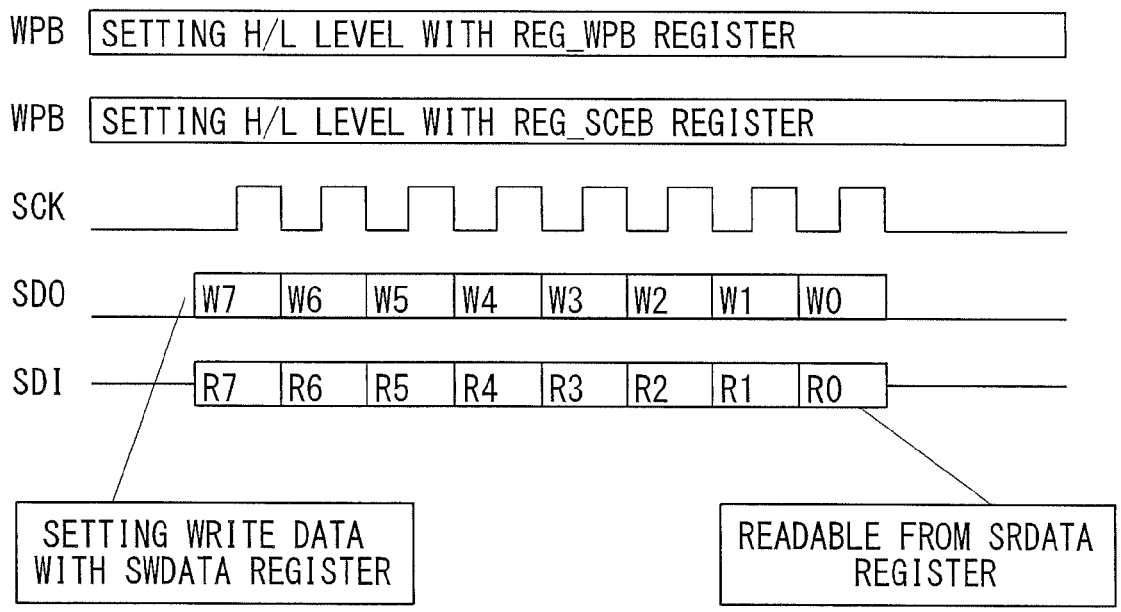
FIG. 12 is a data transmission/reception waveform view of an SPI bus interface.

Next, the SPI bus format is described. FIG. 12 is a data transmission/reception waveform view of the SPI bus interface. Here, REG_WPB, REG_SCEB, SWDATA, and SRDATA in FIG. 12 are register names, and the respective functions are as follows.

REG_WPB: specifies logic of a WP pin. The register value is output to the WP pin as it is.

REG_SCEB: specifies logic of an SCEB pin. The register value is output to the SCEB pin as it is.

SWADA [7:0]: specifies written data into an EEPROM. The data are transferred with MSB first.

SRDATA [7:0]: reads data from the EEPROM. The data are converted with MSB first.

Here, it is possible to calculate the SCK clock frequency by a numerical formula: the SCK frequency=the CAMCKI frequency÷2(SPIPREDIV+1)÷(SPIDIV+1). Here, SPIPREDIV, SPIDIV are SCK frequency set register values that are able to be set in ranges of SPIPREDIV=0 to 7, and SPIDIV=0 to 31. When CAMCKI is 27 MHz, SCK is 13.5 MHz to 3.3 kHz.

Next, a function to automatically read data from the EEPROM by means of the SPI bus is described in detail. In the image process IC 100, by fixing an AUTO pin at a high level, it is possible to automatically read data from the EEPROM and set the data into a register in the IC.

Figure 13:
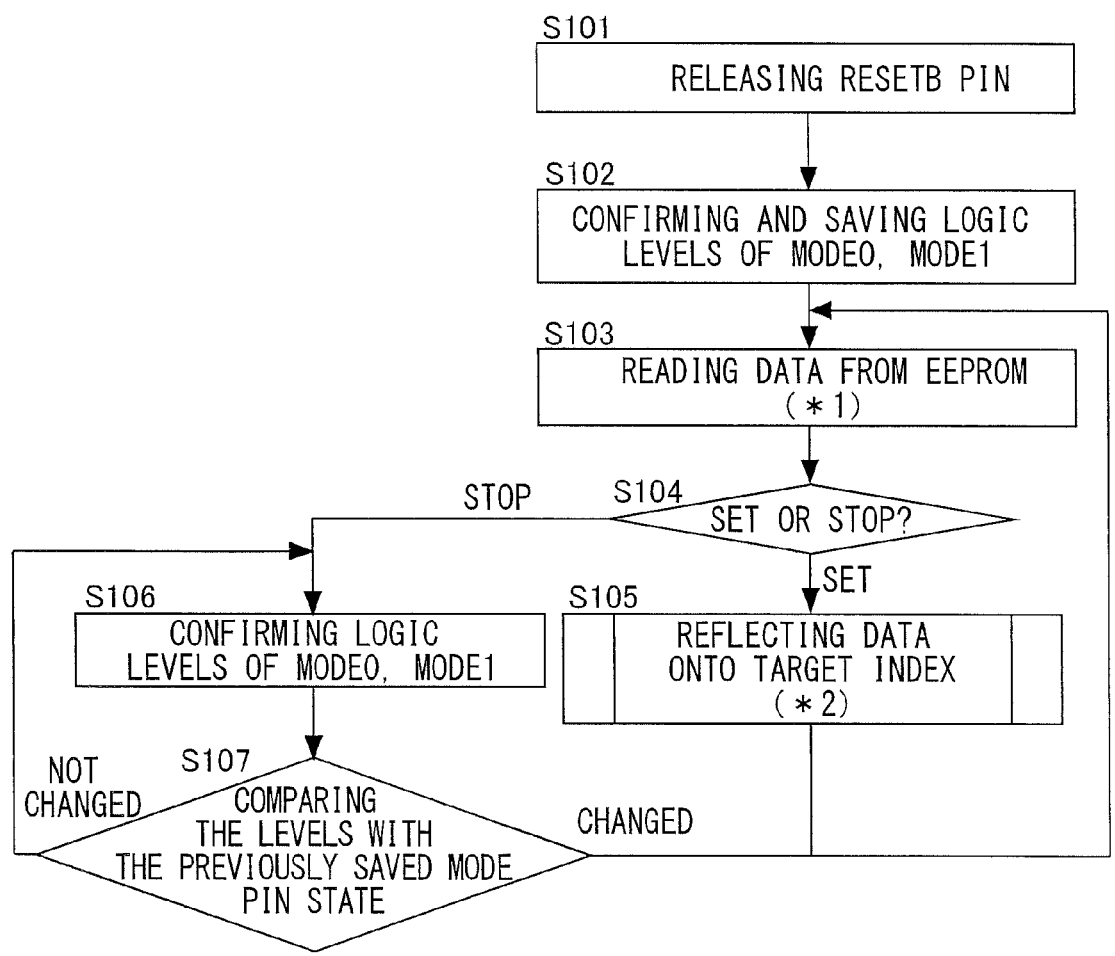
FIG. 13 is a flow chart showing an automatic data reading sequence.

FIG. 13 is a flow chart showing the automatic data reading sequence. In a step S101, a RESETB pin is released. In a step S102, logic levels of MODE0 and MODE1 are confirmed and the confirmation results are saved. In a step S103, the data reading from the EEPROM is performed. In a step S104, it is determined whether the operation state is a set state or a stop state. In a case where it is determined in the step S104 that the state is the set state, the data are reflected onto a target index in a step S105. On the other hand, in a case where it is determined in the step S104 that the state is the stop state, the logic levels of MODE0, MODE1 are confirmed in a step S106. In a step S107, the state of the MODE pin saved in the step S102 and the confirmation result in the step S106 are compared with each other. Here, in a case where there is a change, the flow is returned to the step S103, while in a case where there is not a change, the flow is returned to the step S106.

Here, in the step S103 of FIG. 13, when reading the data from the EEPROM, as for the read start address ST_ADR of the EEPROM follows the setting of the MODE0 pin and the MODE1 pin as follows:

[MODE1, MODE0]=[Low, Low]: ST_ADR=000h
[MODE1, MODE0]=[Low, High]: ST_ADR=080h
[MODE1, MODE0]=[High, Low]: ST_ADR=100h
[MODE1, MODE0]=[High, High]: ST_ADR=180h FIG. 14 is a waveform view for describing the flow of reading data from the EEPROM. Here, *A in the figure indicates an address bit 8 of the EEPROM and *B indicates address bits 7 to 0 of the EEPROM.

Besides, in the step S105 of FIG. 13, when reflecting the data onto the target index, following a data format in the inside of the EEPROM, the register values are reflected onto the IC. FIG. 15A and FIG. 15B are views showing data formats in the inside of the EEPROM. Here, FIG. 15A shows a data format in a set time (operation state in which the setting is performed into a register in the inside of the IC), while FIG. 15B shows a data format in a stop time (stop state of automatic reading).

Here, data contents shown in FIG. 15A are as follows:

S_CODE: 8' b0000_0001. The image process IC 100 (hereinafter, abbreviated to the present IC if necessary) receives this code and determines that subsequent data are valid register values.

Index: A setting start index address of the present IC
Size: Set size (byte)
Data: set data. The number of data is a Size byte.
Besides, data contents shown in FIG. 15B are as follows:
P_CODE [3:0]: 4' b0100. The present IC receives this code and stops the automatic reading function.

PER [3:0]: sets a polling interval for MODE0, MODE1.

If it is determined that the operation is in the set state, the automatic reading function determines that the index value is the setting start address of the present IC and consecutively performs the setting for the Size. If the setting for the Size is completed, it is determined again whether the operation is in the set state or the stop state; if it is in the set state, the setting for the Size is performed from the index used as the setting start address. This operation is performed until the stop is identified. If the stop is identified, the automatic reading function is stopped. Thereafter, the polling for the MODE0, MODE1 is performed every time set as the polling interval; and at a time a pin-level change is confirmed, the operation is restarted. Besides, if MODE0, MODE1 are changed during the operation of the automatic reading function, the setting is performed again immediately after completion of the automatic reading operation.

Next, registers incorporated in the image process IC 100 are described. FIG. 16 is a register map of the image process IC 100. Here, access to Empty- and Reserved-notation registers is prohibited.

FIG. 17 is a detailed table of a polarity set register POL. IDX_ADDRESS is 10h.

CKPOL sets a polarity of CAMCKI for CAMDI [7:0]. The set contents are as follows:

0: a data change at a falling edge of CAMCKI, and data fetching at a rising edge (see FIG. 18A).

1: a data change at a rising edge of CAMCKI, and data fetching at a falling edge (see FIG. 18B).

HSPOL sets a polarity of a horizontal synchronous signal (CAMHSI). A HIGH section contains valid data (LOW is a sink section). 0 is set into HSPOL.

VSPOL sets a polarity of a vertical synchronous signal (CAMVSI). A HIGH section contains valid data (LOW is a sink section). 0 is set into VSPOL.

0 may be written into a bit of RESERVED.

FIG. 19 is a detailed table of a parameter update register PARAMSET. IDX_ADDRESS is 11h.

1 is written into PARAMSET_FR to apply a parameter update to a register of a fog erasure block (IDX_ADDRESS: 30h to 37h). An internal parameter is updated at the head of a frame after the writing. This bit is automatically cleared after the update.

1 is written into PARAM SET to update a parameter. An internal parameter is updated at the head of the frame after the writing. This bit is automatically cleared after the update.

0 may be written into a bit of RESERVED.

FIG. 20 is a detailed table of a mode register MODE. IDX_ADDRESS is 12h.

The MODE [1:0] sets an image enhance operation mode of the present IC (see FIG. 21).

TH_TYPE sets a through-mode operation type. During a through-mode time, data and a synchronous signal are delayed by the same number of cycles as in the image enhance mode and are output. 1 is set into TH_TYPE.

SUSP sets IO suspend modes. In a suspend mode, the respective signals of CAMI0-7, CAMHSI, CAMVSI, CAMCKI are not transmitted to the inside of the IC.

The set contents are as follows:
0: suspend mode released
1: suspend mode

PD_OFF controls pull-down setting of AUTO, MODE0, and MODE1 of the present IC. The set contents are as follows:

0: An incorporated pull-down resistor is connected to each of AUTO, MODE0, and MODE1.

1: The incorporated pull-down resistor is separated form each of AUTO, MODE0, and MODE1.

DOUT_OFF controls digital output setting of the present IC. The set contents are as follows:
 0: Image data are output from a digital terminal.
 1: CAMDO0-7, CAMHS0, CAMHS0, and CAMCK0 are output at a low level.

FR_OUT_SEL selects to output CAMHS0 which undergoes a timing adjustment in the inside or FR_EN (IDX_ADDRESS: 30h bit [0]) from CAMHSI to a CAMHS0 terminal. The set contents are as follows:
 0: CAMHS0 is output.
 1: FR_EN is output.

FIG. 22 is a detailed table of an input interface format specification register YUVIFSET. IDX_ADDRESS is 13h.

YUV_XST [1:0] sets a delay from valid Hsync to valid data. 0 is set into YUV_XST [1:0].

YUVORD [1:0] sets an input format of YCbCr. 10b (CbYCrY . . . ) may be set into YUVORD [1:0].

ITU601R selects a data range for a digital interface. Here, the setting other than the following is prohibited.
 00b: Data input/output are performed in a full range.
 11b: Data input/out are performed in an ITU601 range.

ITU656EN sets a digital interface for input and output. The set contents are as follows:
 0: Separate signals for Hsync, Vsync
 1: ITU656 format FIG. 22 is a detailed table of an output range conversion register TRAM_LIM. IDX_ADDRESS is 49h.

TRAN_LIM applies a color space conversion (YUV→RGB→YUV conversion) to a digital output signal CAMDO7-0. If the color space conversion is performed, an output chroma component is limited to a value that is representable in an RGB space. The set contents are as follows:
 0: Color space converted
 1: Color space not converted
 0 may be written into RESERVED.

FIG. 24 is a detailed table of a monitor X-direction pixel size set register DXSIZE. IDX_ADDRESS is 14h and 15h. XSIZE [10:0] sets the number of pixels in the X direction of a utilized camera. An even number may be set. It is possible to set 320 to 1280.

FIG. 25 is a detailed table of a monitor Y-direction pixel size set register DYSIZE. IDX_ADDRESS is 16h and 17h. YSIZE [10:0] sets the number of pixels in the Y direction of a utilized camera. It is possible to set 240 to 960.

FIG. 26 is a detailed table of a foggy-image correction and image enhance valid X-direction start position set register ICXST. IDX_ADDRESS is 18h and 19h. ICXST [9:0] sets an X-direction start position of a valid area for the foggy-image correction and the image enhance correction. An even number may be set. It is possible to set 0 to (XSIZE−ICXSIZE).

FIG. 27 is a detailed table of a foggy-image correction and image enhance valid Y-direction start position set register ICYST. IDX_ADDRESS is 1Ah and 1Bh. ICYST [9:0] sets a Y-direction start position of a valid area for the foggy-image correction and the image enhance correction. It is possible to set 0 to (YSIZE−ICYSIZE).

Figures 28, 29, 30:
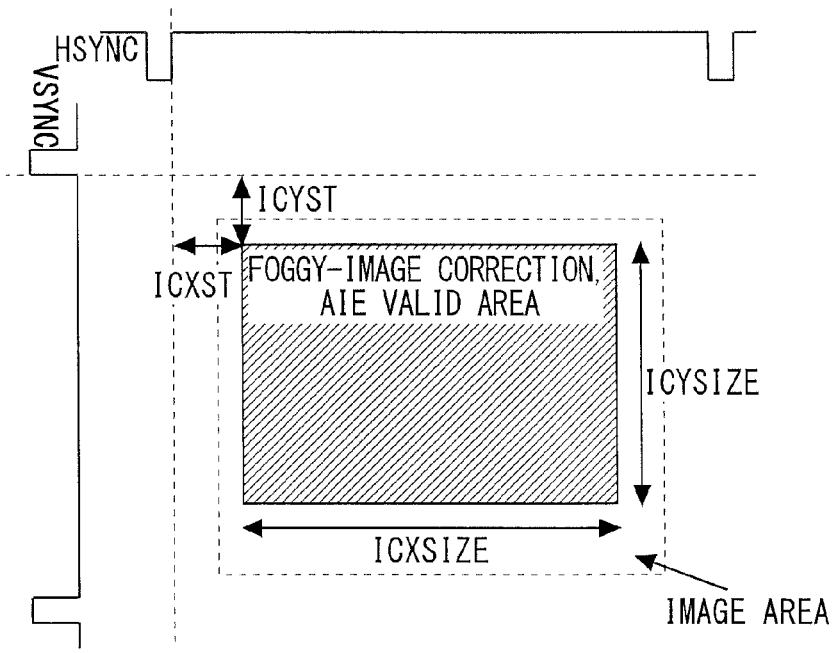
FIG. 28 is a detailed table of a foggy-image correction, image enhance valid X-direction size set register ICXSIZE.
FIG. 29 is a detailed table of a foggy-image correction, image enhance valid Y-direction size set register ICYSIZE.
FIG. 30 is a schematic view showing a valid area of a foggy-image correction and an image enhance correction.

FIG. 28 is a detailed table of a foggy-image correction and image enhance valid X-direction size set register ICXSIZE. IDX_ADDRESS is 1Ch and 1Dh. ICXSIZE [10:0] sets an X-direction size (the number of pixels) of a valid area for the foggy-image correction and the image enhance correction. It is possible to set 320 to XSIZE.

FIG. 29 is a detailed table of a foggy-image correction and image enhance valid Y-direction size set register ICYSIZE. IDX_ADDRESS is 1Eh and 1Fh. ICYSIZE [10:0] sets a Y-direction size (the number of pixels) of a valid area for the foggy-image correction and the image enhance correction. It is possible to set 240 to YSIZE.

FIG. 30 is a schematic view showing a valid area of the foggy-image correction and the image enhance correction.

FIG. 31 is a detailed table of a pre-gamma set register PREGAMMA. IDX_ADDRESS is 20h. In the present IC, a pre-gamma filter is incorporated. This pre-gamma filter has 15 kinds of set values; the set values are selected by PREG [3:0]. PREG [3:0] is able to set 0 to 14; the smaller the number becomes, the larger the output luminance for a low luminance area becomes. Here, the setting of 15 into PREG [3:0] is prohibited.

FIG. 32 is a detailed table of a luminance correction strength set register STRENGTH. IDX_ADDRESS is 21h. STR [6:0] sets the strength of the image enhance correction. STR [6:0] is able to set values of 0 to 127.

FIG. 33 is a detailed table of a color difference correction strength set register UV_STRENGTH. IDX_ADDRESS is 22h.

UV_STR [3:0] sets the correction strength of the image enhance correction of a color difference component. UV_STR [3:0] is able to set 0 to 13; the larger the number becomes, the deeper the color becomes. The setting of 14, 15 is prohibited. Besides, in a case where the setting is FR_AT=1, UV_STR_AT=1 and FR_EN=1 (IDX_ADDRESS: 30h FRCTL [4:3], [0]), the UV_STRENGTH for an image enhance correction block is not set into the present register but into UV_STR_AT (IDX_ADDRESS: 07h UV_STR_AT [3:0]).

The larger the number in V_ENHANCE [3:0] becomes, the deeper the red color becomes. An enhancement by +about 3%×the set number is performed.

FIG. 34 is a detailed table of a noise curb set register NOISE_SUP. IDX_ADDRESS is 23h. NOISE_SUP [6:0] sets a noise curb value. It is possible to set 10 to 127. If the number is increased, noise is curbed. The setting of 0 to 9 is prohibited.

FIG. 35 is a detailed table of an edge enhancement filter set register EDG_CNT. IDX_ADDRESS is 24h.

EDG_ST [3:0] sets the strength of an edge enhancement filter. It is possible to set 0 to 15. If the value is increased, the edge enhancement becomes strong.

EDG_EN sets an enable state of the edge enhancement filter. The set contents are as follows:
 0: Disable
 1: Enable FIG. 36 is a detailed table of a response time set register RESP_SET. IDX_ADDRESS is 25h. RESP_SET sets a response time for an image enhance effect. 0 gives the fastest response time, while 15 gives the latest response time.

FIG. 37 is a detailed table of a post-filter enable register PELT_EN. IDX_ADDRESS is 26h. POFLT_EN sets an enable state of an output gamma filter. A characteristic set by an output gamma characteristic register is used. The gamma filter works on an image after the image enhance correction process. The set contents are as follows:
 0: Disabled
 1: Enabled FIG. 38 is a detailed table of output gamma characteristic registers POELT0 to POFLT8. IDX_ADDRESS is 27h to 2F. POFLT0 to POFLT8 each set an output gamma characteristic.

Figure 39:
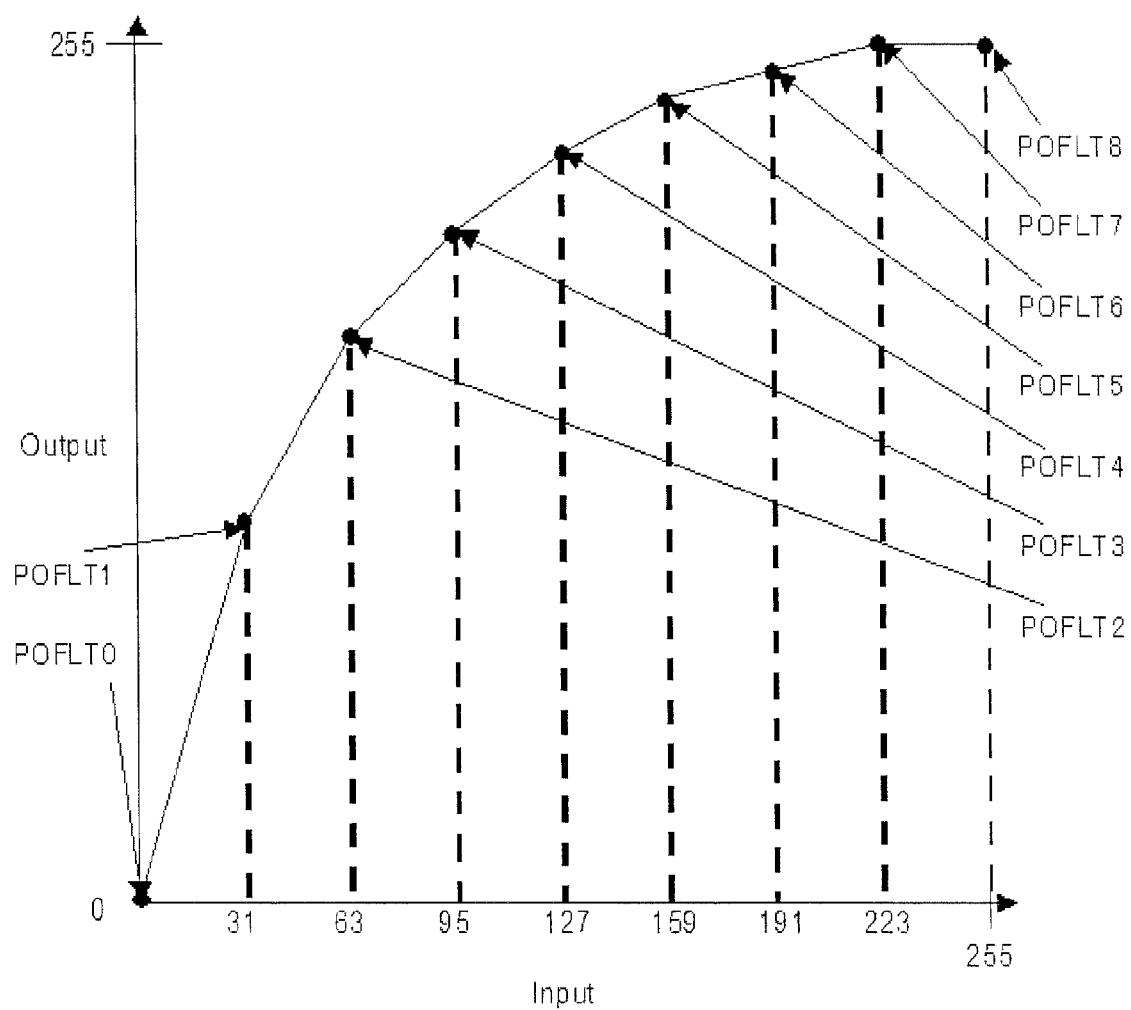
FIG. 39 is a view showing an output gamma characteristic.

FIG. 39 is a view showing an output gamma characteristic.

FIG. 40 is a detailed table of a foggy-image correction control register FRCTL. IDX_ADDRESS is 30h.

FRCLK_EN supplies a clock to a foggy-image correction block. The set contents are as follows:

0: Clock stopped
1: Clock supplied

FR_SLOP, during an automatic control time of the foggy-image correction (a time the setting is FR_AT=1), sets a slope time for a change in an S-curve range adjustment value (ACR-VADJ register). A slope width always changes in units of ±1 in accordance with the SCRVADJ value. The set contents are as follows:

0: Slope control disabled
1: Slope control enabled

FR_AT sets a foggy-image correction method. During a time the automatic control is selected, the present IC controls the FR_EN bit. The set contents are as follows:

0: The foggy-image correction is manually set.
1: The foggy-image correction is automatically performed (the present IC performs the control).

UV_STR_AT_EN, during a time the automatic control is in an on state and the foggy-image correction function is valid, selects one of UV_STR (IDX_ADDRESS: 22h [3:0]) and UV_STR_AT (IDX_ADDRESS: 07h [3:0]) which are to be valid as the UV_STR setting for an image enhance correction function. The set contents are as follows:

0: The set value in UV_STR is always valid.
1: During a time the automatic control is in the on state and the foggy-image correction function is valid, the set value in UV_STR_AT is valid.

If 1 is written into REP_REQ, data of the next frame image are fetched. After 1 is written, it is possible to read data in 36h to 37h after the value becomes 0 (automatic clear). The set contents are as follows:

0: Not fetched (the data in 36h, 37h are invalid)
1: Fetching completed (the data in 36h, 37h are valid)

FR_TH performs through-operation control of the foggy-image correction block. A synchronous signal and data are delayed by the same number of cycles as in the foggy-image correction process time and are output. 1 may be set into FR_TH.

FR_EN performs operation control (during a time the setting is RF_AT=0) of the foggy-image correction process or operation confirmation (during a time the setting is FR_AT=1) of the foggy-image correction process. The set contents are as follows. Here, the writing of 1 into the bit of RESERVED is prohibited.

<during the time the setting is FR_AT=0>
0: The foggy-image correction disabled
1: The foggy-image correction enabled
<during the time the setting is FR_AT=1>
0: The foggy-image correction in stop
1: The foggy-image correction in operation FIG. 41 is a detailed table of a foggy-image correction S-curve range adjustment register SCRVADJ. IDX_ADDRESS is 31h. SCRVADJ [3:0] performs an S-curve range adjustment of the foggy-image correction and sets the strength of the foggy-image correction. FIG. 42 is a table showing a relationship between the set value in SCRVADJ and the strength of the foggy-image correction.

FIG. 43 is a detailed table of a foggy-image correction γ-curve range adjustment register GCRVADJ. IDX_ADDRESS is 32h. GCRVADJ [3:0] performs a γ-curve range adjustment of the foggy-image correction and sets an offset of a γ value. FIG. 44 is a table showing a relationship between the set value in GCRVADJ and the offset of the γ value.

FIG. 45 is a detailed table of a histogram average luminance value register HAVGLUM. IDX_ADDRESS is 36h. HAVGLUM [3:0] is able to read a histogram average value. A range of 0 to 255 is used.

FIG. 46 is a detailed table of a histogram standard dispersion value register HSTDVRC. IDX_ADDRESS is 37h. HSTDVRC [3:0] is able to read a histogram dispersion value.

FIG. 47 is a detailed table of a between-fields low pass filter control register FR_LPF_CNT. IDX_ADDRESS is 3Eh. FR_LPF_EN makes a 5-tap low pass filter valid for a parameter that is calculated in the inside of the foggy-image correction block. The set contents are as follows. Here, the writing of 1 into RESERVED is prohibited.

0: Low pass filter OFF
1: Low pass filter ON

FIG. 48 is a detailed table of between-fields LPF coefficient registers FR_LPF_COEF0 to FR_LPF_COEF4. IDX_ADDRESS is C2h to C6h. FR_LPF_COEF0 [7:0] to FR_LPF_COEF4 [7:0] each set a coefficient of between-fields low pass filters. Each filter coefficient has 1 bit of an integer portion and 7 bits of a decimal fraction portion, 8 bits in total and may be set at a binary number. Accordingly, in a case where the value is expressed with a decimal number, the coefficient set value is as follows:

Coefficient=bit 7*20+bit 6*2−1+bit 5*2−2+bit 4*2−3+ . . . +bit 0*2−7

For example, in a case where 0.5 is set as a decimal number into FR_LPF_COEF0, 40 h is set in the same register. Besides, the calculation of LPF is as follows:

$P(n)'=P(n-2)*FR\_LPF\_COEF0+P(n-1)*$ $FR\_LPF\_COEF1+P(n)*FR\_LPF\_COEF2+$ $P(n+1)*FR\_LPF\_COEF3+P(n+2)*$ $FR\_LPF\_COEF4$

Here, the setting has to be done in such a way that the sum of the respective coefficients always becomes 1.

$FR\_LPF\_COEF0+FR\_LPF\_COEF1+FR\_LPF\_COEF2+FR\_LPF\_COEF3+FR\_LPF\_COEF4=80h$

FIG. 49 is a detailed table of an automatic control UV_STR adjustment register UV_STR_AT. IDX_ADDRESS is 07h. If UV_STR_AT_EN (IDX_ADDRESS: 30h [3])=1 and the foggy-image correction function is valid during a time the automatic control is in an on state, UV_STR_AT [3:0] replaces the UV_STR set value for the image enhance correction function with the present register value. Even during the time the automatic control is in the on state, if the foggy-image correction function is invalid, the present register becomes invalid, and the image enhance correction function follows the setting in UV_STR (IDX_ADDRESS: 22h [3:0]).

FIG. 50 is a detailed table of automatic control dispersion value threshold value set registers ACVRCTH1 to ACVRCTH3. IDX_ADDRESS is 08h to 0Ah. ACVRCTH1, 2, 3 [7:0], by means of ACVRCTH1, ACVRCTH2, and ACVRCTH3, determine whether the input image is a foggy image or not for an input histogram dispersion value. Details are described later with reference to FIG. 53 and FIG. 54. Here, ACVRCTH1, ACVRCTH2, and ACVRCTH3 should be so set as to meet the following relationship:

$ACVRCTH1+4 \leq ACVRCTH2 < ACVRCTH3$

FIG. 51 is a detailed table of automatic control average value threshold value set registers ACAVGTH1, ACAVGTH2. IDX_ADDRESS is 0Bh, 0Ch. In a case where the average luminance value of the histograms is larger than ACAVGTH1, ACAVGTH1, 2 [7:0] determine that the input image is a foggy image and the correction function becomes valid. After the foggy-image correction function becomes valid, if the average luminance value of the histograms becomes smaller than ACAVGTH2, the foggy-image correction function is made invalid. Details are described later with reference to FIG. 53 and FIG. 54. Here, ACAVGTH1 and ACAVGTH2 should be so set as to meet the following relationship. Here, in a case where ACAVGTH1=ACAVGTH2, the hysteresis function for the input-image luminance value determination is turned off.

$$ACAVGTH1 \geq ACAVGTH2$$

FIG. 52 is a detailed table of automatic control S-curve correction region set registers ACSCV11 to ACSCV13. IDX_ADDRESS is 0Dh to 0Fh.

ACSCV_ULIM [3:0], ACSCV_MH [3:0], ACSCV_MM [3:0], ACSCV_ML [3:0] and ACSCV_LLIM [3:0], during the automatic control time, performs the setting of a foggy-image correction amount: S-curve range adjustment for the input dispersion value. The strength of the set value is the same as the SCRVADJ register (IDX_ADDRESS: 31h). Details are described later with reference to FIG. 53 and FIG. 54. ACSCV_ULIM, ACSCV_MH, ACSCV_MM, ACSCV_ML and ACSCV_LLIM should be so set as to meet the following relationships:

$$ACSCV\_ULIM > ACSCV\_LLIM$$

$$ACSCV\_ULIM \geq ACSCV\_MH \geq ACSCV\_MM \geq ACSCV\_ML \geq ACSCV\_LLIM$$

Figure 53:
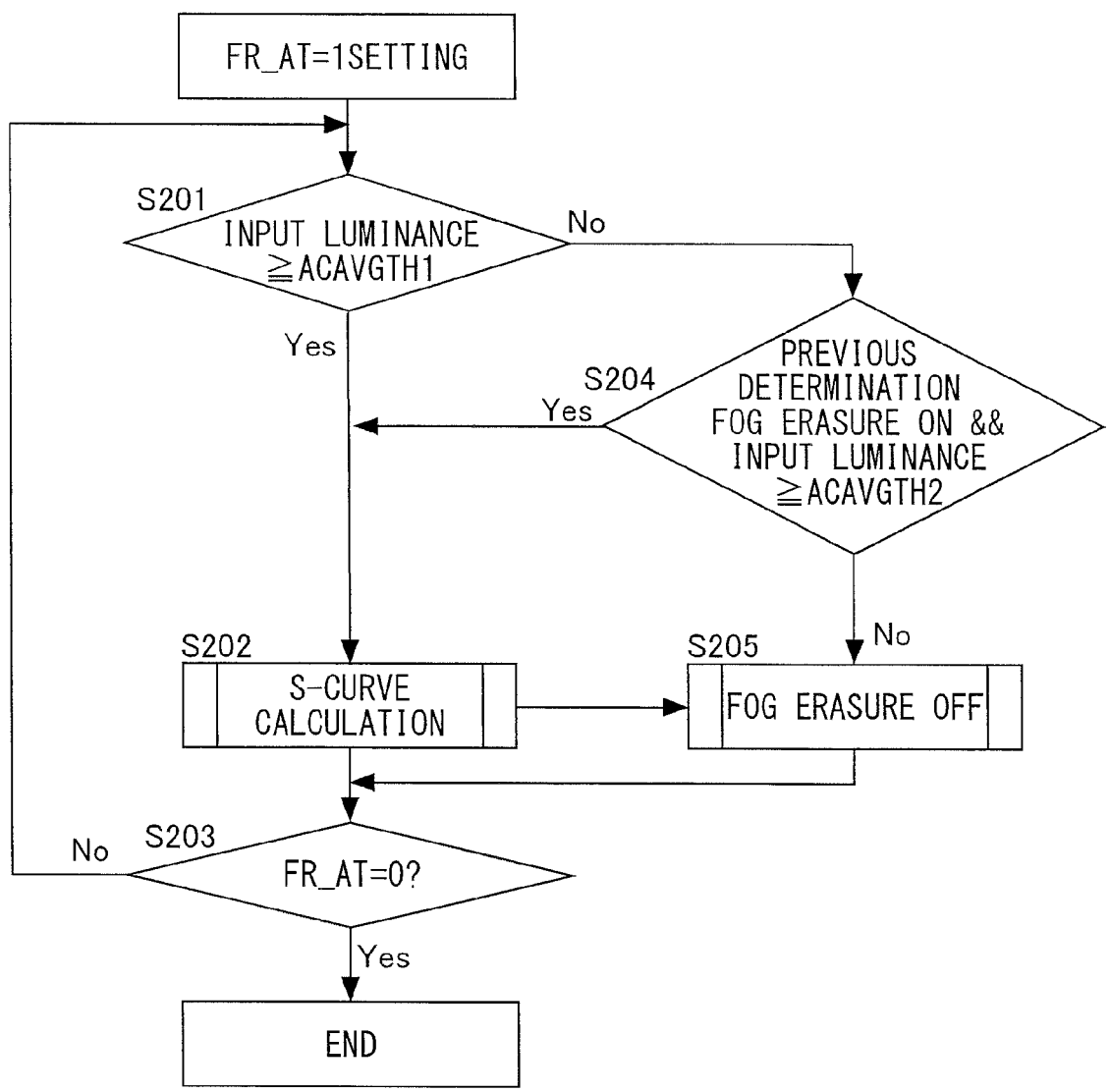
FIG. 53 is a flow chart for describing foggy-image correction automatic control.
Figures 54, 55, 56:
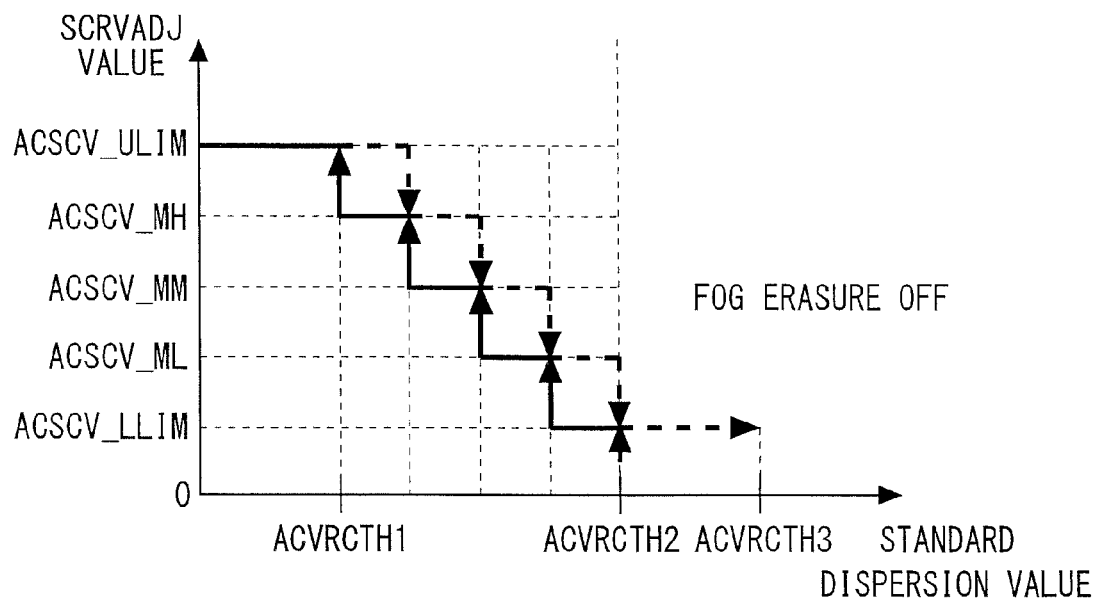
FIG. 54 is a view showing a schema of a foggy-image correction automatic control algorithm.
FIG. 55 is a detailed table of a TV encoder reset register PWD.
FIG. 56 is a detailed table of a TV encoder display mode register DISP.

FR_SLOP_CNT [1:0], during a time the slope setting (FR_SLOP) is valid in the automatic control, sets a slope time. The set contents are as follows:
  00b: Updated for every field
  01b: Updated for every 16 fields
  10b: Updated for every 32 fields
  11b: Updated for every 64 fields FIG. 53 is a flow chart for describing the foggy-image correction automatic control; FIG. 54 is a view showing a schema of a foggy-image correction automatic control algorithm. Here, because FIG. 53 and FIG. 54 respectively correspond to the above FIG. 4 and FIG. 6A, hereinafter, only an overview of them is described.

In the automatic control of the foggy-image correction, an S-curve range adjustment is performed in the following sequence.

(1) Comparison of the Input Luminance and the ACVRCTH1 Register Value

First, in a step S201, the average luminance value of the input image and the ACVRCTH1 register value are compared with each other. If the average luminance value of the input image is higher, the flow moves on to an S-curve range adjustment determination state (step S202). In the luminance determination, to prevent ON/OFF near the ACVRCTH1 register value from occurring, it is possible to set a hysteresis width. The foggy-image correction is turned on if the input luminance is larger than the ACVRCTH1 register value, and is turned off if the input luminance is smaller than the ACVRCTH1 register value, (2) S-Curve Range Adjustment In the S-curve range adjustment, a dispersion value of the input image is determined; and the SCRVADJ register value is calculated in accordance with the dispersion value. The set range specification for the S-curve range adjustment is performed with ACSCV_ULIM, ACSCV_MH, ACSCV_MM, ACSCV_ML and ACSCV_LLIM. The standard dispersion specification is performed with ACVRCTH1, ACVRCTH2 and ACVRCTH3; and the difference between ACVRCTH1 and ACVRCTH2 is equally divided into four sections. For example, if the input dispersion value has the same value as the ACVRCTH1 value, the SCRVADJ register value is set at the ACSCV_ULIM value. Like in the input luminance determination time, in the S-curve range adjustment as well, to prevent a deviation at the set boundary, as shown in FIG. 54, a hysteresis is present. In a case where the dispersion value of the input image gradually becomes large, the S-curve range adjustment is performed along a route represented by a broken line in FIG. 54; if the dispersion value of the input image becomes larger than ACVRCTH3, the foggy-image correction function is turned off. After being turned off, if the dispersion value of the input image becomes larger than ACVRCTH2, the foggy-image correction function is turned on to perform the S-curve range adjustment in accordance with the dispersion value.

Thereafter, the above (1) and (2) are repeated to control the foggy-image correction ON/OFF and the S-curve range adjustment.

FIG. 55 is a detailed table of a TV encoder reset register PWD. IDX_ADDRESS is 41h.

DAC_POW turns on/off a DAC operation in the present IC. The set contents are as follows:
  0: DAC operation ON
  1: DAC operation OFF LOGIC_POW performs clock on/off control of a TV-Encoder block. The set contents are as follows:
  0: The internal clock is turned off
  1: The internal clock is turned on.

FIG. 56 is a detailed table of a TV encoder display mode register DISP. IDX_ADDRESS is 43h.

LEVEL determines whether an input data range of the TV encoder incorporated in the present IC is a full range or an ITU_R 601 range. In accordance with the set value in ITU601R (IDX_ADDRESS: 13h YUVIFSET [3:2]), the register setting may be performed. The set contents are as follows:
  0: In a case of the setting ITU601R=2' b00, the setting LEVEL=0 should be performed.
  1: In a case of the setting ITU601R=2' b11, the setting LEVEL=1 should be performed.

DISPO selects an operation mode of the TV encoder in the inside of the present IC. In a square pixel mode, 640 pixels in the horizontal direction is increased to 720 pixels. In a case other than 27 MHz of the input clock, 0 should be written into this bit. The set contents are as follows:
  0: Equalization pixel mode
  1: Square pixel mode FIG. 57 is a detailed table of a TV encoder video mode register VIDEO. IDX_ADDRESS is 45h.

NTPAL selects a video output mode of the TV encoder incorporated in the present IC. The set contents are as follows:
  0: NTSC
  1: PAL Q_FSC selects a clock operation mode of the TV encoder in the inside of the present IC. A clock for the selected mode may be input. The set contents are as follows:
  0: 27 MHz clock operation
  1: 4 fsc clock operation (input clock is 8 fsc)

PAL28 is turned on (1) in a case where the clock operation mode of the TV encoder in the inside of the present IC is PAL and 28.375 MHz is used. The set contents are as follows:
  0: In a case where 28.375 MHz clock operation is not performed in PAL
  1: In a case where 28.375 MHz clock operation is performed in PAL 510H selects an operation mode of the TV encoder in the inside of the present IC. The set contents are as follows:
  0: Usual operation
  1: 510H mode C_OFF turns off output of Cb, Cr and a color burst signal. The set contents are as follows. Here, 0 should be written into RESERVED.

0: Usual operation (Cb, Cr and the color burst signal are summed and output)

1: Cb, Cr and the color burst signal are output without being summed.

FIG. 58 is a list showing usable setting of the TV encoder video mode register VIDEO. Setting other than the setting shown in this figure is prohibited.

FIG. 59 is a detailed table of a TV encoder video mode register CVBS. IDX_ADDRESS is 46h.

CVBS_OUT selectively turns on/off video output (DAC) from the TV encoder incorporated in the present IC. The set contents are as follows:

0: The DAC output is not performed.

1: CVBS (composite video signal) is output as the DAC output.

IMAGE_OUT [1:0] selects video output data of the TV encoder in the inside of the present IC. The set contents are as follows:

00b: RESERVED

01b: A color selected by a BGCOL register is output over the entire screen area.

10b: RESERVED

11b: An image is output. Besides, the color selected by BGCOL is output to a background area.

FIG. 60 is a detailed table of the background color register BGCOL. IDX_ADDRESS is 47h. BGCOL [3:0] selects a background color in the video output (DAC) from the TV encoder incorporated in the present IC. The set contents are as follows. Here, setting other than the following setting is prohibited.

00 (hex): BLUE background color [Default]
01 (hex): BLACK background color
02 (hex): RED background color
03 (hex): GREEN background color
04 (hex): YELLOW background color
05 (hex): CYAN background color
06 (hex): MAGENTA background color
07 (hex): GRAY background color
08 (hex): WHITE background color FIG. 61 is a detailed table of a TV encoder color bar test register COLBAR. IDX_ADDRESS is 48h. COLBAR specifies the output from the TV encoder incorporated in the present IC as a color bar output. The set contents are as follows:

0: The input data of the present IC is output.

1: A color bar is forcibly output.

FIG. 62 is a detailed table of a TV encoder setup register SETUP. IDX_ADDRESS is 55h.

BURST_LVL is able to adjust levels of a burst signal and a color carrier wave. The set contents are as follows:

0: Default setting

1: The levels of the burst signal and the color carrier wave are amplified from the 0 setting by about 0.8 IRE.

SETUP performs setting in accordance with NTSC or PAL. The set contents are as follows:

0: In a case of NTSC, 0 should be set.

1: In a case of PAL. 1 should be set.

FIG. 63 is a detailed table of a TV encoder setup2 register SETUP2. IDX_ADDRESS is 50h. SETUP2 sets an operation mode of the TV encoder. Here, setting other than the following setting is prohibited.

000b: In a case other than the 510H mode, 000b should be set.

011b: In a case of the 510H mode, 011b should be set.

FIG. 64 is a detailed table of TV encoder gamma correction registers GM_A0 to GM_A2, GM_X0 to GM_X3, and GM_Y0 to GM_Y3. IDX_ADDRESS is D0h to DAh.

Figure 65:
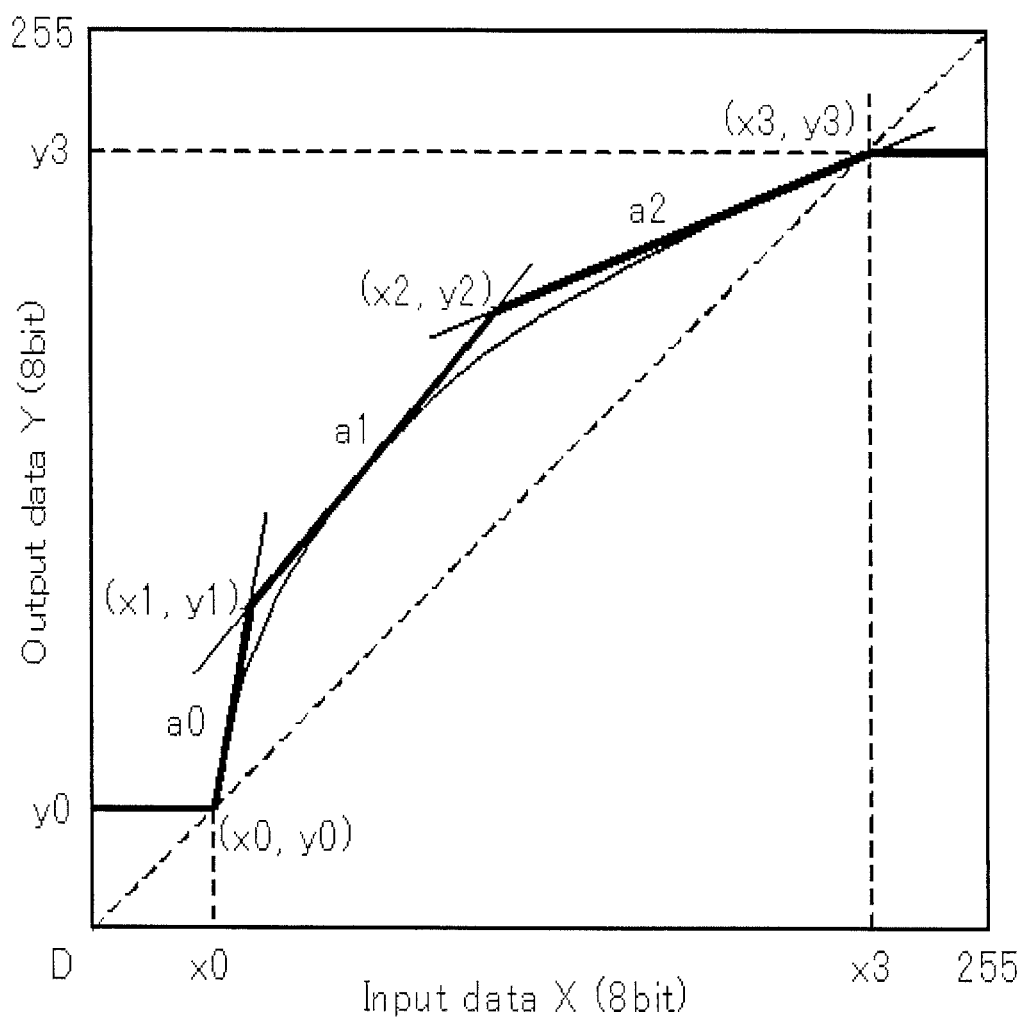
FIG. 65 is a view showing a gamma correction curve.

FIG. 65 is a view showing a gamma correction curve. The setting of the gamma correction curve is decided by four point coordinates (x0, y0), (x1, y1), (x2, y2), and (x3, y3) and three inclination coefficients a0, a1, and a2 that are shown in FIG. 65. In bit values GM_A0, GM_A1, and GM_A2 that correspond to the three inclination coefficients a0, a1, and a2, the four leftmost bits indicate an integer and the four rightmost bits indicate a decimal fraction.

A solid line shown in FIG. 65 represents a gamma curve that is approximated by the following conditions:

(1) When $X<x0$,
$$Y=y0$$

2) When $x0 \le X < x1$,
$$Y=a0*(X-x0)+y0$$

3) When $x1 \le x < x2$,
$$Y=a1*(X-x1)+y1$$

4) When $x2 \le X < x3$,
$$Y=a2*(X-x2)+y2$$

5) When $x3 \le X$,
$$Y=y3$$

FIG. 66 is a table showing setting examples of the gamma correction registers GM_A0 to GM_A2, GM_X0 to GM_X3, and GM_Y0 to GM_Y3. An output value 16 (10h) corresponds to 0IRE, and an output value 235 (EBh) corresponds to 100IRE. In a case of the setting shown in FIG. 66, the output is limited to the maximum value 235 (EBh), and a white level of the TV output is limited to 100IRE.

FIG. 67 is a detailed table of an input valid start pixel offset set register OFS. IDX_ADDRESS is E0h, E1h. H_POS sets a display offset during a TV encoder output time, while this register sets a valid data start pixel from HSYNC at the input.

FIG. 68 is a detailed table of a TV encoder valid data width set register WID_VD. IDX_ADDRESS is E2h, E3h. This register sets the number of valid pixels in a horizontal line. The initial value is 320 pixel. The set value should be an even number. Besides, the set range is between 100 pixels to 896 pixels. The set contents are as follows. Here, the WID_VD register should set a number that is a multiple of 4.

WID_VD [1:0]: 00b should be written into these two bits.
WID_VD [9:0]: 000 (hex) to 063 (hex): Setting prohibited
064 (hex): 100 pixels

|

|

140 (hex): 320 pixels [Default]

| ex.) At QVA image input

|

2D0 (hex): 720 pixels

|

|

3F0 (hex): 1008 pixels
3F1 (hex): to 3FF (hex): Setting prohibited

FIG. 69 is a detailed table of a TV encoder valid line width set register HT_VD. IDX_ADDRESS is E4h. This register sets the number of valid lines in a field. The initial value is 240. The number of lines that is output to a TV in actual use is a value that is obtained by attaching an offset of +64 to the HT_VD register value. The range of values that are able to be set into the register is from 100 to 254 lines. Accordingly, the range of set lines displayable on a TV is from 164 lines to 318 lines. The set contents are as follows:

HT_VD [0]: 0 should be set into this bit.
HT_VD [7:0]: 00 (HEX) to 63 (HEX): Setting prohibited
64 (HEX): 164 lines
|
|
F0 (HEX): 340 lines; Default
|
|
FE (HEX): 318 lines FIG. 70 is a detailed table of a TV encoder horizontal display position offset register H_POS. IDX_ADDRESS is E5h. This register sets an offset of a horizontal display position in a line. The initial value is 0. The range that is able to be set is 0 to 504 pixels. The offset of a displayed horizontal position is expressed by the following formula:

Offset value of a displayed horizontal position:
$H\_POS\ [7:0] \times 2$ [Pixel]

The set contents of the TV encoder horizontal display position offset register H_POS are as follows:

H_POS [1:0]: 00b should be written into these two bits.
H_POS [7:0]: 00 (HEX): Default position
04 (HEX): Displayed on a screen at a position that is obtained by shifting to the right by 8 pixels.
|
|
FC (HEX): Displayed on a screen at a position that is obtained by shifting to the right by 504 pixels.
FD (HEX) to FF (HEX): Setting prohibited FIG. 71 is a detailed table of a TV encoder vertical display position offset register V_POS. IDX_ADDRESS is E6h. This register sets an offset of a vertical display position in a field. The initial value is 0. The range that is able to be set is 0 to 120 lines. The offset of a displayed vertical position is expressed by the following formula:

Offset value of a displayed vertical position: $V\_POS\ [7:0]+4$ (line in a field)

(in a case of NTSC)

Offset value of a displayed vertical position: $V\_POS\ [7:0]+23$ (line in a field)

(in a case of PAL)

The set contents in the TV encoder vertical display position offset register V_POS are as follows:

V_POS [1:0]: 00b should be written into these two bits.

V_POS [7:0]: 00 (HEX): Default position 04 (HEX): Displayed on a screen at a postion that is obtained by shifting upward by 8 lines.

|

|

78 (HEX): Displayed on a screen at a position that is obtained by shifting upward by 240 lines.

79 (HEX) to 7F (HEX): Setting prohibited 80 (HEX): The same as the default position 84 (HEX): Displayed on a screen at a position that is obtained by shifting downward by 8 lines.

|

|

F8 (HEX): Displayed on a screen at a position that is obtained by shifting downward by 240 lines.

F9 (HEX) to FF (HEX): Setting prohibited

FIG. 72 is a detailed table of an input valid start line offset set register V_OFS. IDX_ADDRESS is E7h. V_POS sets a display offset during a TV encoder output time, while this register sets a valid data start line from VSYNC at the input.

Figures 73, 74, 75, 76:
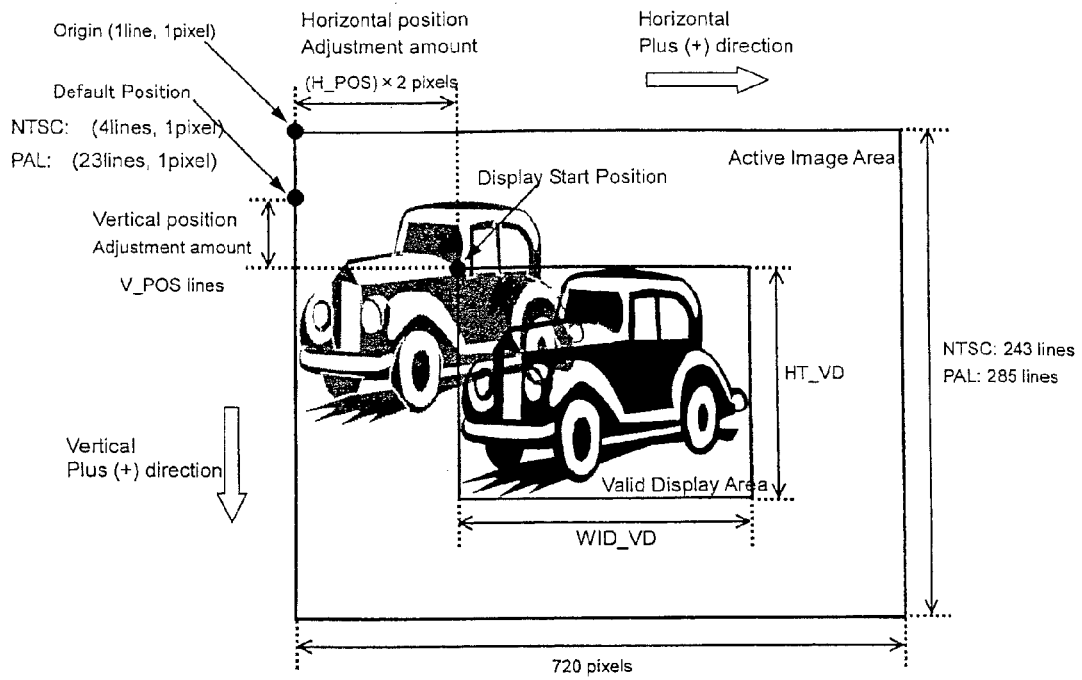
FIG. 73 is a schematic view showing set contents in a display position change register.
FIG. 74 is a detailed table of an SPI control register SPICNT.
FIG. 75 is a detailed table of an SPI operation clock frequency division register SPIDIV.
FIG. 76 is a detailed table of an SPI write data set register SPIWDATA.

FIG. 73 is a schematic view showing set contents of a display position change register.

FIG. 74 is a detailed table of an SPI control register SPICNT. IDX_ADDRESS is F0h. This register is a register that performs the SPI control. REG_WPB sets an output level of a WPB terminal (output value is directly reflected). REG_SCEB sets an output level of a SCEB terminal (output value is directly reflected). REG_SCK sets an output level of a SCK terminal before SPI operation (output value is directly reflected). REG_SDO sets an output level of a SDO terminal before the SPI operation (output value is directly reflected). SWRITE is a WDATA output enable bit for the SDO terminal during the SPI operation. If SWRITE is set at 0, the value of a REG_SDO bit continues to be output. 1 is read from SBUSY during the SPI operation; and when the SPI operation is completed, 0 is read. SACT is only for writing: only 0 is read. Besides, by writing 1 into SACT, clocks for 8-bit data are generated to execute the SPI operation.

FIG. 75 is a detailed table of an SPI operation clock frequency division register SPIDIV. IDX_ADDRESS is F1h. This register sets a frequency division ratio for the CAMCKI clock to decide a frequency of an SCK terminal clock during a time of the SPI operation. The frequency is decided by the following formula:

$$SCK \text{ frequency: } 1/(2\text{^}SPIPREDIV\ [2:0])/(SPIDIV\ [4:0]+1)$$

Initial value 35.5 MHz/$(2\text{^}4*(22+1))$=96.5 kHz; when a CAMCKI frequency is 35.5 MHz.

FIG. 76 is a detailed table of an SPI write data set register SPIWDATA. IDX_ADDRESS is F2h. This register sets output data to the SDO terminal during the SPI operation.

FIG. 77 is a detailed table of an SPI read data register SPIRDATA. IDX_ADDRESS is F3h. This register stores input data from the SDI terminal during the SPI operation.

FIG. 78 is a detailed table of an SPI EEPROM read address set register 0: SPIADR0L. IDX_ADDRESS is F4h. This register sets the 8 rightmost bits of the EEPROM address during a time EEPROM automatic reading is executed when the MODE0, MODE1 terminals have 0, 0, respectively.

FIG. 79 is a detailed table of an SPI EEPROM read address set register 1: SPIADR1L. IDX_ADDRESS is F5h. This register sets the 8 rightmost bits of the EEPROM address during the time the EEPROM automatic reading is executed when the MODE0, MODE1 terminals have 1, 0, respectively.

FIG. 80 is a detailed table of an SPI EEPROM read address set register 2: SPIADR2L. IDX_ADDRESS is F6h. This register sets the 8 rightmost bits of the EEPROM address during the time the EEPROM automatic reading is executed when the MODE0, MODE1 terminals have 0, 1, respectively.

FIG. 81 is a detailed table of an SPI EEPROM read address set register 3: SPIADR3L. IDX_ADDRESS is F7h. This register sets the 8 rightmost bits of the EEPROM address during the time the EEPROM automatic reading is executed when the MODE0, MODE1 terminals have 1, 1, respectively.

FIG. 82 is a detailed table of an SPI EEPROM read address bit 8 set register: SPIADR1_H. IDX_ADDRESS is F8h. The set contents in this register are as follows:

SPIADR0H: The bit 8 of SPIADR0 is set with an EEPROM read address.

SPIADR1H: The bit 8 of SPIADR1 is set with an EEPROM read address.

SPIADR2H: The bit 8 of SPIADR2 is set with an EEPROM read address.

SPIADR3H: The bit 8 of SPIADR3 is set with an EEPROM read address.

FIG. 83 is a detailed table of an initialization register SRST. IDX_ADDRESS is FFh. This register is a software reset register. By writing 1, a related block is reset. Only writing 1 is valid. Access should not be performed for 100 ns after a software reset. After a hardware reset, it is unnecessary to perform the software reset. The contents in this register are as follows:

SRST_AIE: By writing 1, a reset of an image enhance block is performed. By writing 0, the reset is released.

SRST_TVE: By writing 1, a reset of a TV encoder block is performed. By writing 0, the reset is released.

SRST_REG: By writing 1, a reset of a register is performed. The register value becomes the initial value. The reset is automatically released.

SRST_FOG: By writing 1, a reset of a foggy-image correction block is performed. By writing 0, the reset is released.

Figure 84:
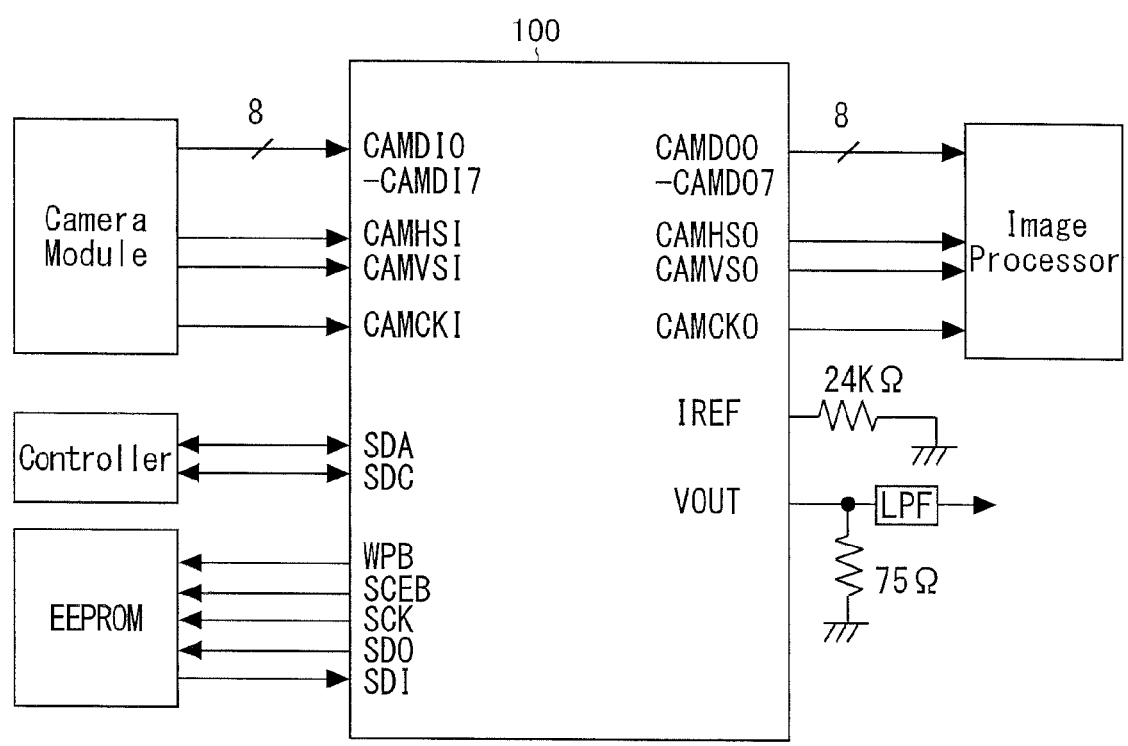
FIG. 84 is a connection diagram showing a system example that uses the image process IC 100.

FIG. 84 is a connection diagram showing a system example that uses the image process IC 100. As shown in this figure, a camera module, a controller, an EEPROM, an image processor and the like are externally connected to the image process IC 100.

Next, a method for curbing a color imbalance and a luminance dynamic range shortage after the image correction process is performed is described in detail.

Figure 85A:
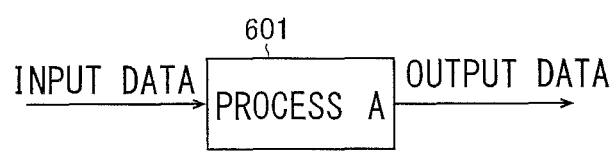
FIG. 85A is a block diagram showing an example of an image correction process device that includes a first image correction process portion only.

FIG. 85A is a block diagram showing an example of an image correction process device that includes a first image correction process portion only.

A first image correction process portion 601 applies a first image correction process to the digital input image data to generate digital output image data. Here, the first image correction process refers to an image correction process which is based on a luminance histogram, and besides an original purpose, is likely to bring a color-component imbalance or a luminance dynamic range shortage as a byproduct, and to which the above foggy-image correction process, for example, corresponds.

However, in the above structure in which only the first image correction process is performed, depending on the process method and the input-image data contents, besides the original purpose (e.g., removal of fog and haze), a color-component imbalance or a luminance dynamic range shortage occurs as a byproduct, so that there is a risk that an unnatural output image is generated.

Figure 85B:
FIG. 85B is a block diagram showing an example of an image correction process device that includes a second image correction process portion on a stage after the first image correction process portion.

FIG. 85B is a block diagram showing an example of an image correction process device that includes a second image correction process portion on a stage after the first image correction process portion.

The first image correction process portion 601 applies the first image correction process to the digital input image data to generate digital intermediate image data. Here, the first image correction process refers to an image correction process which as described above, is based on a luminance histogram, and besides an original purpose, is likely to bring a color-component imbalance or a luminance dynamic range shortage as a byproduct, and to which the above foggy-image correction process, for example, corresponds. In other words, the first image correction process portion 601 represented in FIG. 85B corresponds to the first image correction process portion 201 represented in the above FIG. 7. However, the contents of the first image correction process are not limited to the foggy-image correction process.

A second image correction process portion 602 applies a second image correction process to the digital intermediate image data input from the first image correction process portion 601 to generate digital output image data. Here, the second image correction process refers to an image correction process which resolves a color-component imbalance and a luminance dynamic range shortage that are caused by the first image correction process, and to which for example, the above image enhance process (luminance dynamic range correction process that includes a color-space correction process such as saturation curbing and the like) corresponds. In other words, the second image correction process portion 602 represented in FIG. 85B corresponds to the second image correction process portion 202 represented in the above FIG. 7. However, the contents of the second image correction process are not limited to the image enhance process.

As described above, the second image correction process, which resolves a color-component imbalance and a luminance dynamic range shortage, is applied to the intermediate image data obtained by the first image correction process, so that it becomes possible to improve the visibility of the finally obtained output image.

Next, a method for curbing a flicker after the foggy-image correction process is performed is described in detail.

In the above foggy-image correction process, luminance histogram distribution is prepared; and based on the maximum value, the minimum value, the central value, the standard deviation value and the like of the distribution, optimization (removal of fog and haze) of the luminance histogram is performed. As a result of this, in almost all scenes of still images and dynamic images, it is possible to obtain a good evaluation result.

Figure 86:
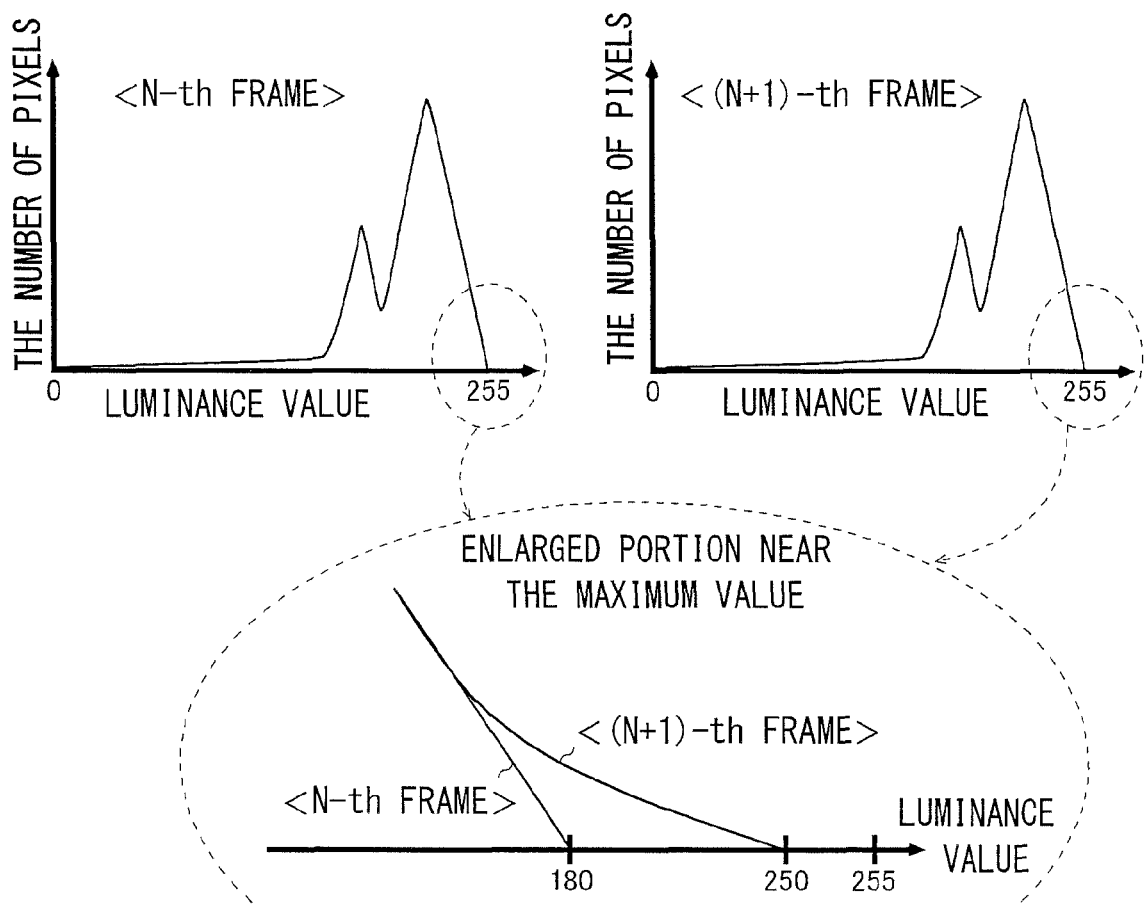
FIG. 86 is a view for describing a deviation in a luminance histogram.

However, when applying the foggy-image correction process to a dynamic image, it becomes a problem that because of influence of disturbance and the like, the input image data are uneven in every one frame in an invisible range. For example, as shown in FIG. 86, it seems at a glance that there is no deviation in the luminance histogram distribution between an N-th frame and an (N+1)-th frame; however, if the respective regions near the maximum values of the frames are enlarged, it is understood that there is a minute deviation in the luminance value distribution.

Figure 87:
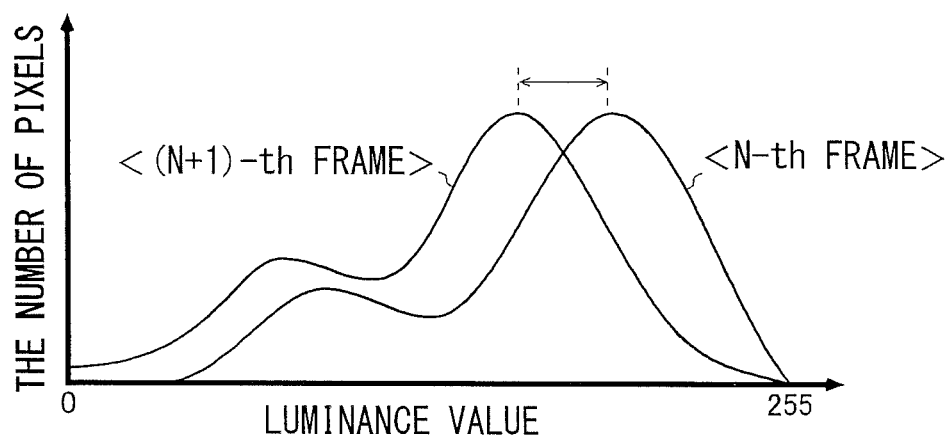
FIG. 87 is a view showing a cause of flicker occurrence due to an image correction process.

If the foggy-image correction process is applied to such input image data, the foggy-image correction amount changes for every frame, so that there is a risk that the above minute deviation is enhanced by the foggy-image correction process; in some cases, as shown in FIG. 87, an apparent difference in every frame appears over the entire luminance histogram distribution (especially, the luminance peak value) after the foggy-image correction process, so that there is a risk that screen unevenness (flicker) occurs.

It is conceivable that the above problems are caused because the foggy-image correction process is performed by means of the entire luminance histogram range (that is, all the luminance range that includes the maximum value and its nearby region where a minute change is likely to occur; and the minimum value and its nearby region where a minute change is likely to occur).

Accordingly, to solve the above problems, in the image correction device according to the present invention, the structure is employed, in which the first image correction process portion (to which the first image correction process portion 201 represented in FIG. 7 and the first image correction process portion 601 represented in FIG. 85B correspond) is structured in such a way that a valid luminance range of the luminance histogram that is referred to during a time of calculating the correction coefficient is variably set.

Figure 88:
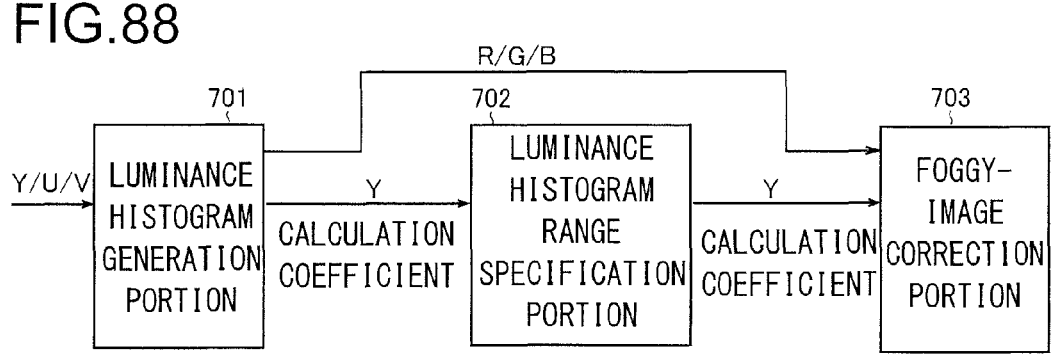
FIG. 88 is a block diagram showing a first structural example of the first image correction process portion.

FIG. 88 is a block diagram showing a first structural example of the first image correction process portion. The first image correction process portion in the present structural example includes: a luminance histogram generation portion 701; a luminance histogram range specification portion 702; and a foggy-image correction portion 703. Here, a sign Y in the figure represents a luminance component; and signs U, V represent color components. Besides, signs R, G, and B in the figure represent a red component, a green component, and a blue component, respectively.

The luminance histogram generation portion 701, based on the luminance component Y of the input image data, generates the luminance histogram distribution and outputs this to the luminance histogram range specification portion 702.

Figure 89:
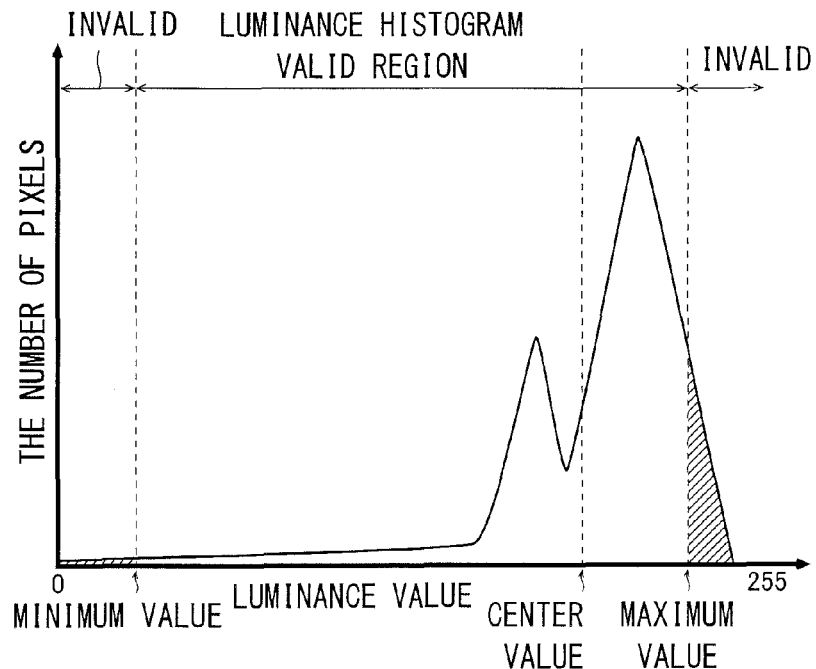
FIG. 89 is a view for describing a valid area specification of a luminance histogram.

The luminance histogram range specification portion 702 sets a valid range of the luminance histogram distribution generated by the luminance histogram generation portion 701. For example, the luminance histogram range specification portion 702, as shown in FIG. 89, sets the maximum value and the minimum value of the luminance histogram distribution into registers in such a way that during a time of calculation by the foggy-image correction portion 703, a predetermined luminance range from an upper limit value (255) of the luminance histogram and a predetermined luminance range from a lower limit value (0) of the luminance histogram are considered invalid and neglected.

The foggy-image correction portion 703, based on the luminance histogram distribution in the valid range set by the luminance histogram range specification portion 702, calculates a calculation coefficient (correction coefficient) for the foggy-image correction process; and uses this to apply the foggy-image correction process to the input image data. Here, in the structural example in FIG. 88, the input image data converted from a YUV form into an RGB form are input into the foggy-image correction portion 703.

As described above, according to the structure in which when calculating the calculation coefficient (correction coefficient) for the foggy-image correction process, the region near the maximum value of the luminance histogram and the region near the minimum value of the luminance histogram where a minute change is likely to occur are considered invalid, the risk that a minute deviation in the input image data is enhanced by the foggy-image correction process is reduced, so that it becomes possible to curb unevenness (flicker) on the screen.

Here, the valid range of the luminance histogram distribution is limited, so that in the output image after the foggy-image correction process, under-exposure and over-exposure are likely to occur more or less; however, because these are traded off for a measure against the flicker, the valid range of the luminance histogram distribution may be adjusted if necessary.

However, even if the valid range of the luminance histogram distribution is limited, there is a case where more or less flicker is likely to remain. Accordingly, as a measure against the flicker, the following still another structure is effective.

Figure 90:
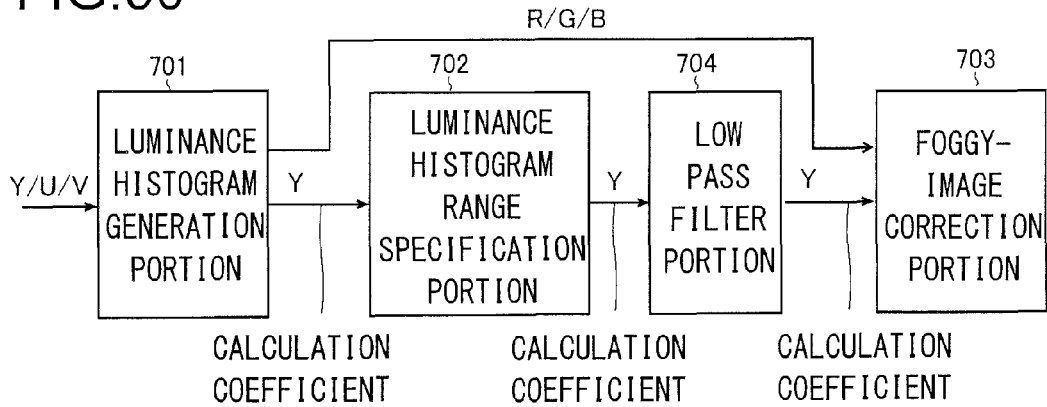
FIG. 90 is a block diagram showing a second structural example of the first image correction process portion.

FIG. 90 is a block diagram showing a second structural example of the first image correction process portion. The first image correction process portion in the present structural example, besides the first structural example shown in FIG. 88, includes a low pass filter portion 704 on a stage after the luminance histogram range specification portion 702.

The low pass filter portion 704 is a between-frames filter (between-fields filter) that when deciding a correction coefficient for a frame (field), uses the correction coefficient for the frame and a correction coefficient for at least one frame that is input before or after the frame, thereby applying a low pass filter process to the correction coefficient for the frame.

The low pass filter portion 704 has a function that applies a 5-tap low pass filter process to a calculation parameter (fog correction parameter) in the inside of the foggy-image correction block of the IC, thereby cutting a high-frequency component (sharp change) of the calculation parameter.

According to this function, even if a scene of a taken image rapidly changes and because of this, the calculation parameter for the foggy-image correction rapidly changes, the parameter is not immediately reflected onto the corrected image, so that the corrected image slowly changes over 5 fields. According to this, even in a scene where the input image changes for every field like a flicker and the calculation parameter for the fog correction changes for every field, the calculation parameter is smoothed by the low pass filter process portion 704, so that it is possible to curb the flicker.

The filtering process for the calculation parameter in the low pass filter portion 704 is executed in units of a field. By means of two fields before and after a calculation target field, the low pass filter process is performed.

Figure 91A:
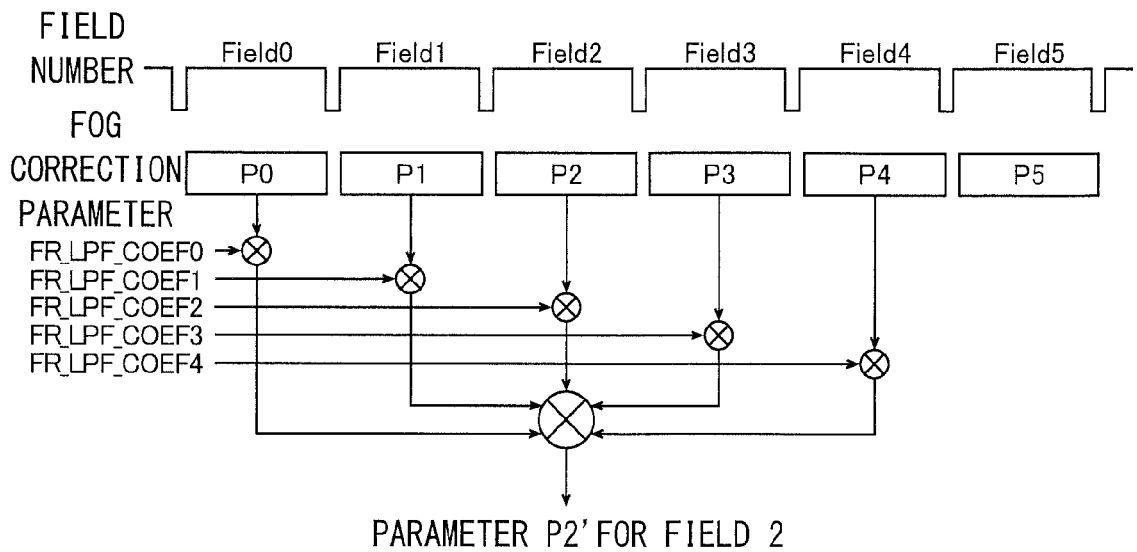
FIG. 91A is a schematic view for describing a low pass filter process (during a time of calculating an operation parameter for a field 2).
Figure 91B:
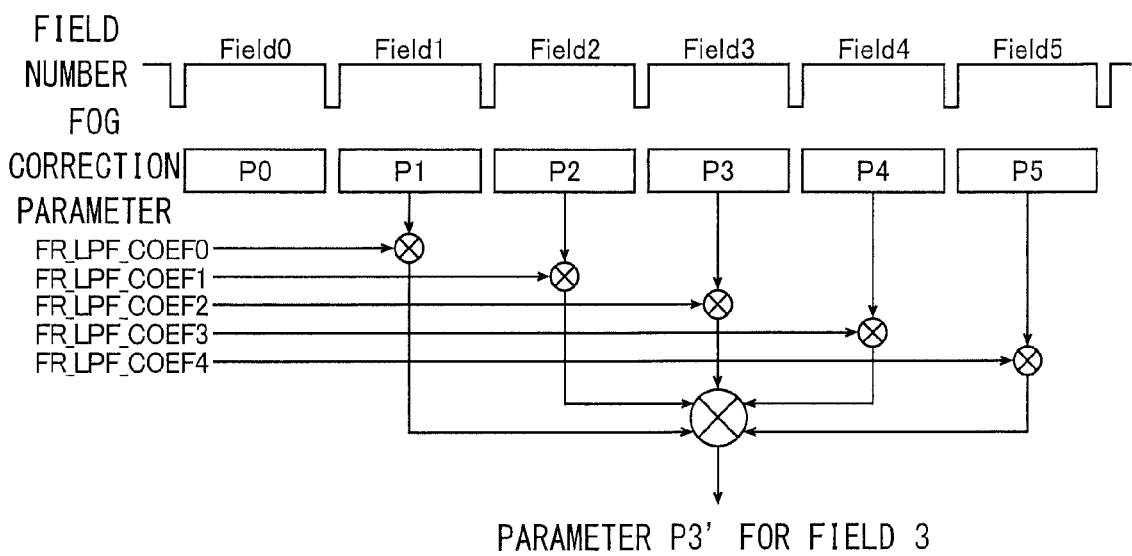
FIG. 91B is a schematic view for describing a low pass filter process (during a time of calculating an operation parameter for a field 3).

FIG. 91A and FIG. 91B both are schematic views for describing the low pass filter process. Here, FIG. 91A shows a way of calculating a calculation parameter for a field 2; FIG. 91B shows a way of calculating a calculation parameter for a field 3.

Meanings of the coefficients shown in FIG. 91A and FIG. 91B are described. Because the low pass filter process is 5-tap, there are 5 coefficient set registers and fields corresponding to the respective coefficients are as follows:

FR_LPF_COEF0: Coefficient setting for a parameter for a field (N−2)
FR_LPF_COEF1: Coefficient setting for a parameter for a field (N−1)
FR_LPF_COEF2: Coefficient setting for a parameter for a field N (field as a calculation target)
FR_LPF_COEF3: Coefficient setting for a parameter for a field (N+1)
FR_LPF_COEF4: Coefficient setting for a parameter for a field (N+2)

All the coefficient registers are composed of 8 bits: an integer portion may be expressed by 1 bit (MSB), while a decimal fraction portion may be expressed by 7 bits. Accordingly, the coefficient values corresponding to the respective register values (hexadecimal notation) are as follows:

80h:1.0000000
40h:0.5000000
20h:0.2500000
10h:0.1250000
08h:0.0625000
04h:0.0312500
02h:0.0156250
01h:0.0078125

For example, a coefficient value 0.75 is expressed 60h in the hexadecimal notation. Here, the setting needs to be performed in such a way that the set values in the respective coefficient registers are 00h to 80h, and the sum of the five register values is 80h. This is because it is necessary to set the sum of the respective coefficients at 1.00.

Next, the setting of the above coefficients is described. As for the strength of the low pass filter process, as the coefficient for the calculation target field, that is, the set value in FR_LPF_COEF2 becomes larger, the strength becomes weaker, while as the set value in FR_LPF_COEF2 becomes smaller (as the coefficient values for the fields before and after the field become larger), the strength becomes stronger.

For example, in a case where the following setting is performed as the setting for the low pass filter process, the parameter for the field 2 becomes a parameter as it is after the low pass filter process, which in effect brings the same operation as the operation in a case where the low pass filter function is turned off.

FR_LPF_COEF0: 00h
FR_LPF_COEF1: 00h
FR_LPF_COEF2: 80h
FR_LPF_COEF3: 00h
FR_LPF_COEF4: 00h

In contrast, as the parameter value in FR_LPF_COEF2 becomes smaller, the strength of the low pass filter becomes stronger. A setting example is as follows:

<Low Pass Filter: Strong Setting>
FR_LPF_COEF0: 10h
FR_LPF_COEF1: 20h
FR_LPF_COEF2: 20h
FR_LPF_COEF3: 20h
FR_LPF_COEF4: 10h
<Low Pass Filter: Weak Setting>
FR_LPF_COEF0: 08h
FR_LPF_COEF1: 18h
FR_LPF_COEF2: 40h
FR_LPF_COEF3: 18h
FR_LPF_COEF4: 08h Here, the above low pass filter process serves as a trade-off between the flicker curbing and the improvement of dynamic-image following. Accordingly, it is important to design the optimum low pass filter for every application changing the number of taps and considering an influence on not only a scene where a flicker occurs but also other scenes.

Next, an electronic device (a set or a system is included) that incorporates the image correction IC according to the present invention is described.

As shown in the above FIG. 7, the image process IC 100 according to the present invention integrates: a first external terminal CAMDI [7:0] into which the digital input image data are input from outside of the IC; the image correction process circuit 200 that applies the predetermined image correction process to the digital input image data to generate the digital output image data; a second external terminal CAMDO [7:0] from which the digital output image data are output to the outside of the IC; the encoder circuit 300 that converts the digital output image data into the output image data in the analog composite video form; and a third external terminal VOUT from which the output image data in the analog composite video form are output to the outside of the IC.

If such image process IC 100 is incorporated into an existing electronic device, without requiring a dramatic design modification, it becomes possible to add the foggy-image correction function and the TV encoder function.

Figure 92A:
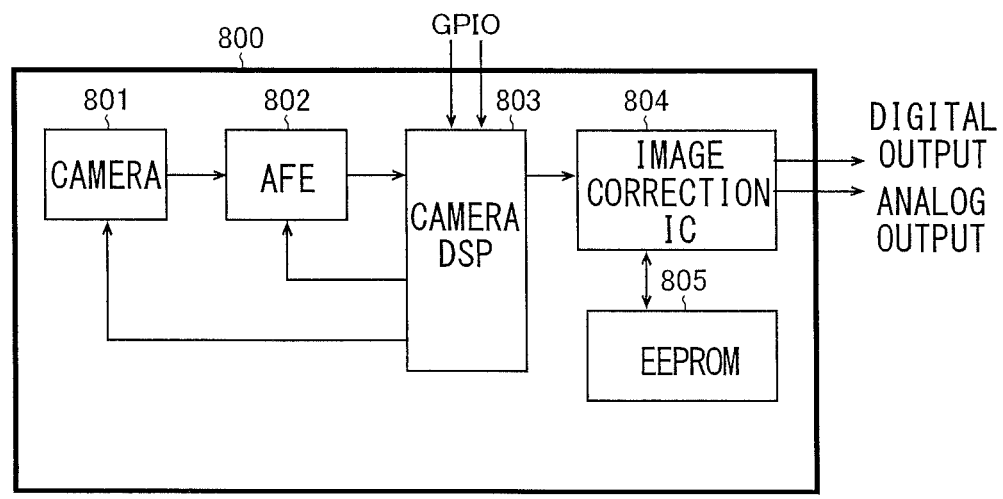
FIG. 92A is a view showing a structural example of an electronic device that incorporates the image process IC according to the present invention.
Figure 92B:
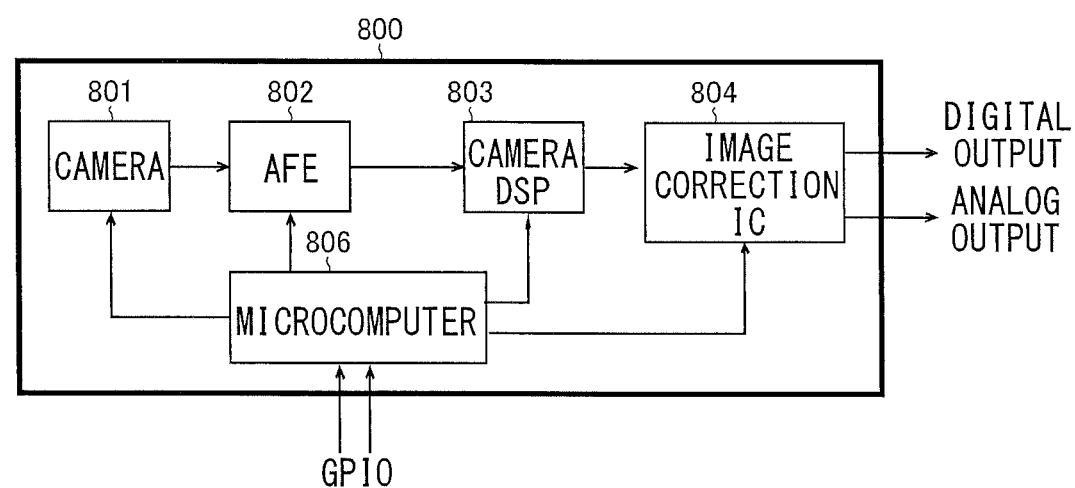
FIG. 92B is a view showing another structural example of an electronic device that incorporates the image process IC according to the present invention.
Figure 93A:
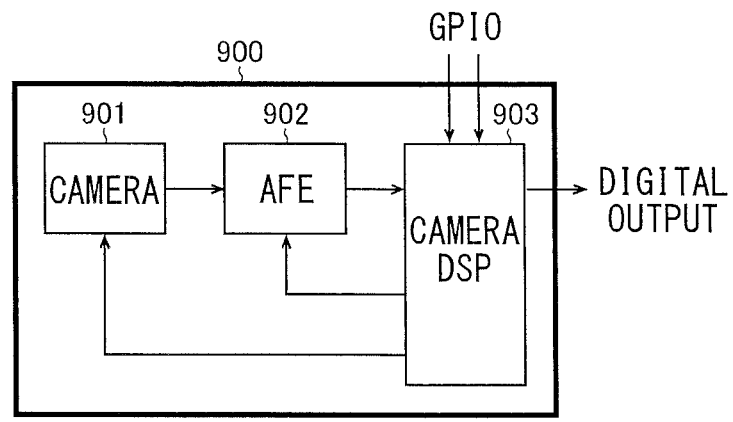
FIG. 93A is a block diagram showing a first conventional example of an electronic device that processes image data.
Figure 93B:
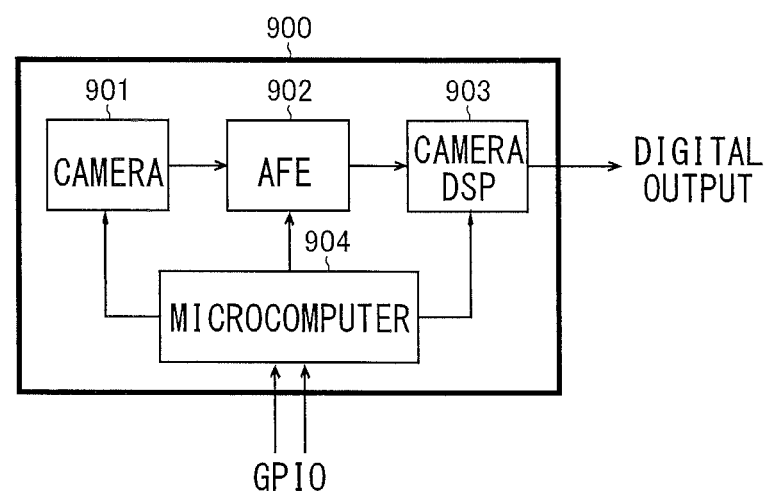
FIG. 93B is a block diagram showing a second conventional example of an electronic device that processes image data.

FIG. 92A and FIG. 92B each are views showing structural examples of electronic devices (indoor/outdoor monitor cameras, network cameras (IP cameras), Web cameras, vehicle cameras, intercoms and the like) that incorporate the image process IC according to the present invention.

Electronic devices 800 in both structural examples include: a camera 801; an AFE [Analog Front End] 802; and a camera DSP 803; and besides them, incorporates an image process IC 804 according to the present invention.

Here, FIG. 92A shows a structure in which the image process IC 804 is controlled by a program stored in an EEPROM 805. In a case of the present structural example, the camera 801 and the AFE 802 are controlled via the camera DSP 803 that is connected to a general-purpose interface (GPIO). On the other hand, FIG. 92B shows a structure in which the image process IC 804 is controlled by an instruction from a microcomputer 806 that is connected to the general-purpose interface (GPIO). In the case of the present structure, the camera 801 and the AFE 802 are also controlled via the microcomputer 806.

As described above, according to the electronic device 800 that incorporates the image process IC 804 according to the present invention, without applying a dramatic design modification to an exiting circuit, it becomes possible to apply a suitable image correction process (fog erasure process) to the input image data and to perform the analog composite video output.

Here, besides the above embodiments, it is possible to make various modifications to the structure of the present invention without departing from the spirit of the present invention. In other words, it should be understood that the embodiments are examples in all respects and are not limiting; the technical scope of the present invention is not indicated by the above description of the embodiments but by the claims; and all modifications within the scope of the claims and the meaning equivalent to the claims are covered.

INDUSTRIAL APPLICABILITY

The present invention is a useful technology for improving visibility of an output image in the fields of: an image correction process circuit which applies various image correction processes to an input image to generate a desired output image; and a semiconductor device which integrates the image correction process circuit.

Besides, the image correction device according to the present invention is generally applicable to electronic devices (indoor/outdoor monitor cameras, security cameras, network cameras (IP cameras), Web cameras, vehicle cameras, drive recorders, intercoms and the like) that process image data.

REFERENCE SIGNS LIST

10 image process IC (semiconductor device)
11 foggy-image correction portion
12 luminance histogram calculation portion
13 correction control portion
131 first comparison portion
132 second comparison portion
133 determination portion
14 register
20 image source (image taking device and the like)
30 display device (liquid crystal display and the like)
40 microcomputer
100 image process IC (semiconductor device)
200 image correction process circuit
201 first image correction process portion (foggy-image correction portion)
202 second image correction process portion
202a color correction portion
202b luminance determination portion
202c image enhance portion
202d calculation process portion
300 encoder circuit
301 memory controller
302 line memory
303 complement portion
304 gamma correction portion
305 low pass filter portion
306 trap filter portion
307, 308 low pass filter portions
309 to 312 calculation process portions
313 digital/analog conversion portion
314 timing signal generation portion
315 sub-carrier signal generation portion
316 color bar signal generation portion
400 first serial interface circuit (I2C)
500 second serial interface circuit (SPI)
601 first image correction process portion
602 second image correction process portion
701 luminance histogram generation portion
702 luminance histogram range specification portion
703 foggy-image correction portion
704 low pass filter portion
800 electronic device
801 camera
802 AFE
803 camera DSP
804 image process IC
805 EEPROM
806 microcomputer

What is claimed is:

1. An image correction process circuit, comprising:
an image correction portion that applies a predetermined image correction process to an input image to generate an output image;
a calculation portion that obtains a luminance histogram for every one field of the input image and calculates two values or all three values of an average luminance value, a standard deviation value and an intermediate value; and
a correction control portion that based on two values or all the three values of the average luminance value, the standard deviation value and the intermediate value of the luminance histogram which are calculated by the calculation portion, determines whether or not the image correction process is necessary for the input image and a correction amount for the image correction process, and performs control of the image correction portion, wherein
the image correction portion applies a foggy-image correction process to the input image; and
the correction control portion, based on the average luminance value and the standard deviation value of the luminance histogram, determines whether the foggy-image correction process is necessary or not for the input image and the correction amount for the image correction process.

2. The image correction process circuit according to claim 1, wherein the correction control portion determines that the foggy-image correction process is necessary when the average luminance value of the luminance histogram is larger than a first threshold value and the standard deviation value of the luminance histogram is smaller than a second threshold value.

3. The image correction process circuit according to claim 2, wherein when the correction control portion determines that the foggy-image correction process is necessary, the correction control portion sets a larger correction amount for the foggy-image correction process in a stepwise way or a continuous way when the standard deviation value of the luminance histogram is smaller.

4. The image correction process circuit according to claim 2, wherein a hysteresis width is set in at least one of the first threshold value and the second threshold value.

5. A semiconductor device that integrates the image correction process circuit according to claim 1.

6. An image correction process device, integrating and comprising:
a first external terminal into which digital input image data are input from outside of the device;
an image correction process circuit that is connected to the first external terminal and applies a predetermined image correction process to the digital input image data input from the outside of the device to generate digital output image data;
a second external terminal which is connected to the image correction process circuit and from which the digital output image data generated by the image correction process circuit are output to the outside of the device;
an encoder circuit that is connected to a connection node between the image correction process circuit and the second external terminal and converts the digital output image data generated by the image correction process circuit into output image data in an analog composite video form; and
a third external terminal which is connected to the encoder circuit and from which the output image data in the analog composite video form generated by the encoder circuit are output to the outside of the device
wherein the image correction process circuit includes:
a first image correction process portion that applies a first image correction process, which is an image correction process based on a luminance histogram, and besides an original purpose, is likely to bring a color-component imbalance or a luminance dynamic range shortage, to the digital input image data to generate digital intermediate image data; and a second image correction process portion that applies a second image correction process, which eliminates a color-component imbalance or a luminance dynamic range shortage caused by the first image correction process, to the digital intermediate image data, thereby generating the digital output image data.

7. The image correction process device according to claim 6, wherein the first image correction process is a foggy-image correction process, and the second image correction process is a color correction process or a luminance dynamic range correction process.

8. The image correction process device according to claim 6, wherein in the first image correction process portion, a valid luminance range of the luminance histogram, which is referred to during a time of calculating a correction coefficient, is variably set.

9. The image correction process device according to claim 8, wherein the first image correction process portion, when deciding a correction coefficient of a frame, uses the correction coefficient of the frame and a correction coefficient of at least one of frames which are input before and after the frame, to apply a low pass filter process to the correction coefficient of the frame.

10. The image correction process circuit according to claim 3, wherein a hysteresis width is set in at least one of the first threshold value and the second threshold value.

11. The image correction process circuit according to claim 1, further comprising a register for externally setting various parameters that are referred to by the correction control portion when the correction control portion determines whether the image correction process is necessary or not for the input image and the correction amount.

12. The image correction process circuit according to claim 2, further comprising a register for externally setting various parameters that are referred to by the correction control portion when the correction control portion determines whether the image correction process is necessary or not for the input image and the correction amount.

13. The image correction process circuit according to claim 3, further comprising a register for externally setting various parameters that are referred to by the correction control portion when the correction control portion determines whether the image correction process is necessary or not for the input image and the correction amount.

14. The image correction process circuit according to claim 4, further comprising a register for externally setting various parameters that are referred to by the correction control portion when the correction control portion determines whether the image correction process is necessary or not for the input image and the correction amount.

15. The image correction process device according to claim 7, wherein in the first image correction process portion, a valid luminance range of the luminance histogram, which is referred to during a time of calculating a correction coefficient, is variably set.

16. An image correction process circuit, comprising:
a first external terminal into which digital input image data are input from outside of the device;
an image correction process circuit that applies a predetermined image correction process to the digital input image data to generate digital output image data;
a second external terminal from which the digital output image data are output to the outside of the device;
an encoder circuit that converts the digital output image into output image data in an analog composite video form;
a third external terminal from which the output image data in the analog composite video form are output to the outside of the device;
the image correction process device includes:
a first image correction process portion that applies a first image correction process, which is an image correction process based on a luminance histogram, and besides an original purpose, is likely to bring a color-component imbalance or a luminance dynamic range shortage, to the digital input image data to generate digital intermediate image data; and
a second image correction process portion that applies a second image correction process, which eliminates a color-component imbalance or a luminance dynamic range shortage caused by the first image correction process, to the digital intermediate image data, thereby generating the digital output image data, wherein
the first image correction process is a foggy-image correction process, and the second image correction process is a color correction process or a luminance dynamic range correction process; and
in the first image correction process portion, a valid luminance range of the luminance histogram, which is referred to during a time of calculating a correction coefficient, is variably set.

* * * * *